US012241800B2

(12) United States Patent
Cheng et al.

(10) Patent No.: US 12,241,800 B2
(45) Date of Patent: *Mar. 4, 2025

(54) MINIATURIZATION OF FIBER Bragg GRATING INTERROGATION FOR INTEGRATION INTO IMPLANTABLE DEVICES

(71) Applicant: Chelak Medical Solutions Inc., Houston, TX (US)

(72) Inventors: Jie Cheng, Bellaire, TX (US); Siu Chun M. Ho, Pearland, TX (US); Dhanunjaya R. Lakkireddy, Leawood, KS (US); Chen Chen, New Haven, CT (US)

(73) Assignee: Chelak Medical Solutions Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,813

(22) Filed: Nov. 21, 2023

(65) Prior Publication Data

US 2024/0272023 A1 Aug. 15, 2024

Related U.S. Application Data

(63) Continuation of application No. 18/141,957, filed on May 1, 2023, now Pat. No. 11,874,187.
(Continued)

(51) Int. Cl.
*G01L 1/24* (2006.01)
*G01D 5/26* (2006.01)

(52) U.S. Cl.
CPC .............. *G01L 1/246* (2013.01); *G01D 5/268* (2013.01)

(58) Field of Classification Search
None
See application file for complete search history.

(56) References Cited

U.S. PATENT DOCUMENTS 7,925,335 B2 4/2011 Feldman et al.
8,075,498 B2 12/2011 Leo et al.
(Continued)

FOREIGN PATENT DOCUMENTS

DE 19836496 2/2000
WO WO1996008197 A1 3/1996
(Continued)

OTHER PUBLICATIONS

Flockhart et al., "Two-axis bend measurement with Bragg gratings in multicore optical fiber", Optics Letters, 20030315, Optical Society of America, US, vol. 28, Nr: 6, p. 387.
(Continued)

*Primary Examiner* — Brandi N Hopkins
*Assistant Examiner* — Nigel H Plumb
(74) *Attorney, Agent, or Firm* — Dority & Manning, P.A.

(57) ABSTRACT

A miniaturized fiber Bragg grating (FBG) interrogation system may comprise a light source, a FBG sensor, and a photodetector. The FBG sensor may be configured to receive an optical signal from the light source, interact with a transmitted spectrum of the light source over a discriminating spectral domain, and generate a reflected optical signal representative of a change in a physical signal sensed by the FBG sensor. Additionally, the system may include a power management unit configured to reduce power consumption in order to prolong the lifespan of the system.

17 Claims, 13 Drawing Sheets

Related U.S. Application Data

(60) Provisional application No. 63/336,909, filed on Apr. 29, 2022.

(56) References Cited

U.S. PATENT DOCUMENTS

| | | | |
|---|---|---|---|
| 8,706,219 | B2 | 4/2014 | Feldman et al. |
| 8,929,976 | B2 | 1/2015 | Feldman et al. |
| 8,932,288 | B2 | 1/2015 | Leo et al. |
| 9,154,235 | B2* | 10/2015 | Scherer .................. H02J 50/80 |
| 9,295,404 | B2 | 3/2016 | Vano et al. |
| 9,297,691 | B2* | 3/2016 | Song ...................... G01H 9/004 |
| 11,206,999 | B2 | 12/2021 | 'T Hooft et al. |
| 11,874,187 | B2* | 1/2024 | Cheng .................... G01D 5/268 |
| 2006/0247702 | A1 | 11/2006 | Stegemann et al. |
| 2008/0255629 | A1 | 10/2008 | Jenson et al. |
| 2009/0005829 | A1 | 1/2009 | Mi et al. |
| 2009/0299427 | A1 | 12/2009 | Liu et al. |
| 2010/0114196 | A1 | 5/2010 | Burnes et al. |
| 2011/0098533 | A1 | 4/2011 | Onoda et al. |
| 2012/0026482 | A1* | 2/2012 | Dailey ..................... G01L 1/242 356/43 |
| 2014/0131562 | A1* | 5/2014 | Song ...................... G01H 9/004 250/227.18 |
| 2014/0357997 | A1 | 12/2014 | Hartmann et al. |
| 2016/0302691 | A1 | 10/2016 | Feldman et al. |
| 2016/0320555 | A1* | 11/2016 | Tsai ...................... G02B 6/0218 |
| 2016/0331980 | A1 | 11/2016 | Strommer et al. |
| 2017/0196479 | A1 | 7/2017 | Liu et al. |
| 2017/0224271 | A1 | 8/2017 | Lachenbruch et al. |
| 2018/0103899 | A1 | 4/2018 | Cahan et al. |
| 2018/0206752 | A1 | 7/2018 | Bardy et al. |
| 2019/0030349 | A1 | 1/2019 | Hoffman et al. |
| 2020/0037895 | A1 | 2/2020 | Cheng et al. |

FOREIGN PATENT DOCUMENTS

| | | |
|---|---|---|
| WO | WO2014143387 A1 | 9/2014 |
| WO | WO2015164568 A1 | 10/2015 |
| WO | WO2015164571 A2 | 10/2015 |

OTHER PUBLICATIONS

De Haines, et al., "Validation of a Defibrillation Lead Ventricular vol. Measurement Compared to Three-Dimensional Echocardiography" (Abstract), Clinical Trial, Heart Rhythm, Oct. 2017.

Larson, Eric R. et al.; Analysis of the Spatial Sensitivity of Conductance / Admittance Catheter Ventricular Volume Estimation; IEEE vol. 60 Issue 8; Aug. 2013, pp. 2316-2324.

Van Rees, J.B. et al. (2011). "Inappropriate implantable cardioverter-defibrillator shocks: incidence, predictors, and impact on mortality," Journal of American College Cardiology 57:556-562.

Abbott (2022). Pulmonary Artery Pressure Monitoring: CardioMEMS™ HF System, 6 pages.

Cardiac Rhythm News (2021). "Trial underway to evaluate "modular" cardiac rhythm management system," 2 total pages.

Guo, H. et al. (2011). "Fiber optic sensors for structural health monitoring of air platforms," Sensors 11:3687-3705.

Hofer, D. et al. (2017). "Long-term incidence of inappropriate shocks in patients with implantable cardioverter defibrillators in clinical practice-an underestimated complication?" J. Interv. Card. Electrophysiol. 50:219-226.

Zhong, Y. et al. (2017). "Helical nanoribbons for ultra-narrowband photodetectors," J. Am. Chem. Soc. 139:5644-5647.

Cranch et al., "Ultra-high-sensitivity two-dimensional bend sensor", Electronic Letters, Apr. 27, 2006, vol. 42, No. 9, 2 pages.

Non-Final Office Action for corresponding U.S. Appl. No. 18/141,957, mailed Jul. 20, 2023, 9 pages.

US Notice of Allowance for corresponding U.S. Appl. No. 18/141,957, mailed Aug. 25, 2023, 9 pages.

International Search Report and Written Opinion mailed on Jul. 26, 2023, for PCT Application No. PCT/US2023/066461, filed on May 1, 2023, 7 pages.

International Search Report dated Oct. 14, 2019, corresponding to Application No. PCT/US2019/045135, 3 pages.

Written Opinion of the International Searching Authority dated Oct. 14, 2019, for PCT Application No. PCT/US2019/045135, filed on Aug. 5, 2019, 7 pages.

Second Written Opinion of the International Preliminary Examining Authority corresponding to Application No. PCT/US2019/045135, mailed Jun. 26, 2020, 7 pages.

Non-Final Office Action dated Sep. 30, 2021, for U.S. Appl. No. 16/532,112, filed Aug. 5, 2019, 16 pages.

Final Office Action dated Jul. 22, 2022, for U.S. Appl. No. 16/532,112, filed Aug. 5, 2019, 22 pages.

Non-Final Office Action dated Jan. 3, 2023, for U.S. Appl. No. 16/532, 112, filed Aug. 5, 2019, 28 pages.

Final Office Action dated Jun. 20, 2023, for U.S. Appl. No. 16/532, 112, filed Aug. 5, 2019, 26 pages.

Written Opinion of the International Searching Authority mailed Jul. 26, 2023, for PCT Application No. PCT/US2023/066461, filed on May 1, 2023, 5 pages.

US Office Action for corresponding U.S. Appl. No. 18/410,888, dated Oct. 17, 2024, 13 pages.

International Preliminary Report on Patentability for corresponding Application No. PCT/US2023/066461, mailed Nov. 7, 2024, 7 pages.

* cited by examiner

MINIATURIZATION OF FIBER Bragg GRATING INTERROGATION FOR INTEGRATION INTO IMPLANTABLE DEVICES

CROSS-REFERENCE TO RELATED APPLICATIONS

This application is a continuation of U.S. patent application Ser. No. 18/141,957, filed on May 1, 2023, which claims priority to U.S. Provisional Application No. 63/336,909, filed on Apr. 29, 2022, each of which is hereby incorporated by reference in its entirety.

TECHNICAL FIELD

This invention relates generally to the field of fiber Bragg grating interrogation. Specifically, this invention relates to miniaturization of fiber Bragg grating interrogation for integration into implantable devices.

BACKGROUND

Fiber Bragg Grating (FBG) sensors are popularly used to measure physical signals that represent parameters such as temperature, pressure, and strain, and can be used in a wide range of industries, for example, from civil to aerospace engineering. However, despite their ubiquity and compactness, adoption of FBG sensor technology into small-sized has been challenging, especially for its integration into such devices to measure physical signals of lower measurement frequencies and with greater range of values.

Challenges associated with adopting FBG sensor technology into small-sized devices (e.g., implantable devices) are usually associated with, but not limited to, the physical size and power limitations (e.g., devices powered by battery) of FBG interrogators. FBG interrogators are optoelectrical measurement units that provide light source to and transduce the optical signal received from an FBG sensor into an electrical signal, thereby enabling the measurement of physical signals that are sensed by the FBG sensors.

Some implantable medical devices are configured to monitor physiological or pathophysiological conditions, and thus may need to measure physical signals associated with those conditions. Often such physical signals fall within a low measurement frequency range (e.g., less than 100 Hz). For example, movement measurement of the heart during cardiac cycles may occur at less than 5 Hz. For low measurement frequency applications, conventional FBG interrogators commonly utilize a Fabry-Perot interferometer, broadband light source, and other optical components to acquire sensor data and measure the physical signals. While the Fabry-Perot interferometer may provide reliable and accurate measurements of physical signals of lower measurement frequencies and with greater range of values, they are bulky in size. Additionally, broadband light sources utilized by these low measurement frequency FBG interrogators may add to the physical size of the FBG interrogator and may increase power consumption.

Some FBG interrogators exist for high frequency measurement applications such as hydrophone and seismology applications. However, high frequency measurement FBG interrogators are specifically designed to measure physical signals with high measurement frequency but typically with narrow range of values. More specifically, such FBG interrogators are not usually expected to measure a large range of values, such as a large range of strain values. Typically, mechanical events in a biological subject or system have a low measurement frequency range and relatively large values. For example, movement measurement of a part of the heart such as the movement of the ventricular walls during cardiac cycles may occur at less than 5 Hz with a relatively large range of value in a few millimeters to a few centimeters.

Accordingly, there is a need for FBG interrogators that are small in physical size such that they may be integrated into implantable medical devices (e.g., battery powered implantable medical devices). Furthermore, there is a need for FBG interrogators that consume low power. It would be useful for the FBG interrogators of these implantable medical devices to have reduced heat generation and a long lifespan after implantation (e.g., at least 5 years or even beyond a decade). Additionally, low power consumption is essential for making the FBG interrogator small in physical size because the battery is the largest component by volume in an implantable medical device. For instance, the battery may represent up to 30-40% in volume of an implantable cardiovert/defibrillator (ICD).

SUMMARY

Described herein are fiber Bragg grating (FBG) interrogation systems that are small in physical size ("miniature"). The physical size may be reduced by excluding bulky optical filters from the systems, and instead using a light source and a FBG sensor that are conformed in both a spectral range and width within a discriminating spectral domain. Without the bulky optical filters, the interrogator parts of the system, for example, the light source, photodetector, optoelectrical coupler, and associated components (e.g., processors, power supply, power management units) may then have a size capable of being implanted within the body of a subject. For example, the FBG interrogation systems may be included in various implantable devices such as implantable cardioverter/defibrillators. A power management unit may also be included in the FBG interrogation systems to control power usage in order to prolong the lifespan of the systems. For example, the power management unit may be configured to operate in an event-triggered mode, in which the light source and/or powered components of the system may be turned on (e.g., automatically) by a triggering event (e.g., an arrythmia).

The FBG interrogation systems may include at least one light source having a transmitted spectrum and at least one FBG sensor having a reflected spectrum that is configured to receive an optical signal from the at least one light source. The at least one light source and the at least one FBG sensor may be configured such that the transmitted spectrum and the reflected spectrum interact over a discriminating spectral domain. In some instances, and in response to a shift in the reflected spectrum of the at least one FBG sensor, a power of the reflected optical signal may change monotonically over the discriminating spectral domain.

The FBG sensor may be further configured to generate a reflected optical signal representative of a change in a physical signal sensed by the at least one FBG sensor. Additionally, the FBG interrogation systems may include a photodetector optically coupled to the at least one FBG sensor that is configured to transform the reflected optical signal into an electrical signal. A change in the electrical signal may be indicative of a change in the physical signal. The physical signal may be strain, temperature, pressure, or a combination thereof.

A power management unit (PMU) to control activation (e.g., turning on/off) of the light source and/or other powered component may also be included in the FBG interrogation systems. The PMU may be electrically coupled to the at least one light source and optionally, at least one powered component of the system. Put another way, the PMU may be electrically coupled to the at least one light source, at least one powered component of the system, or both the at least one light source and at least one powered component of the system. Exemplary powered components may be preamplification components, amplification components, and/or analog-to-digital conversion components. In one variation, the PMU may be configured to automatically control the light source and/or other powered components. In another variation, the PMU may be manually controlled and configured to turn on the at least one light source in response to a request from a user. In yet further variations, the PMU may be configured for both automatic and manual control. In some variations, the PMU may include one or more processors configured to operate in an event-triggered mode, an event-gated mode, a pulse width modulation mode, an adaptive power mode, or a combination thereof. When in an event-triggered mode, one or more processors may be configured to automatically turn on the at least one light source in response to a detected arrythmia.

The light sources that may be included in the FBG interrogation systems may have a bandwidth ranging from about 0.1 nm to about 1.5 nm, including all values and sub-ranges therein. For example, the bandwidth of the light source may be about 0.1 nm, about 0.2 nm, about 0.25 nm, about 0.50 nm, about 0.75 nm, about 1.0 nm, about 1.25 nm, or about 1.5 nm. In some variations, the length of the light source may be less than about 10 mm and the diameter of the light source may be less than about 6 mm. Various light sources may be employed. For example, the light source may be a doped semi-conductor, a narrowband laser diode, a quantum dot, or a vertical cavity surface emitting laser. The narrowband laser diode may be a distributed feedback diode or a distributed Bragg reflection laser diode.

The FBG sensors that may be included in the FBG interrogation systems may have a bandwidth between about 0.1 nm and about 15.25 nm, including all values and sub-ranges therein. For example, the bandwidth of the FBG sensors may be about 0.25 nm, about 0.75 nm, about 1.25 nm, 1.75 nm, about 2.25 nm, about 2.75 nm, about 3.25 nm, about 3.75 nm, about 4.25 nm, about 4.75 nm, about 5.25 nm, about 5.75 nm, about 6.25 nm, about 6.75 nm, about 7.25 nm, about 7.75 nm, about 8.25 nm, about 8.75 nm, about 9.25 nm, about 9.75 nm, about 10.25 nm, about 10.75 nm, about 11.25 nm, about 11.75 nm, about 12.25 nm, about 12.75 nm, about 13.25 nm, about 13.75 nm, about 14.25 nm, about 14.75 nm, or about 15.25 nm. In some variations, the diameter of the FBG sensor is less than about 250 µm. In another variation, the FBG sensor may be a non-uniform FBG sensor. In one variation the FBG sensor may be a chirped FBG sensor.

As further described herein, the discriminating spectral domain may be a region defined by at least one of a first portion of the transmitted spectrum of the at least one light source and a second portion of the reflected spectrum of the at least one FBG sensor. When the discriminating spectral domain is the region defined by the first portion of the transmitted spectrum of the at least one light source, the at least one light source may be a vertical cavity surface emitting laser.

A width of the discriminating spectral domain may be based at least in part on a range of operation of the at least one FBG sensor. The range of operation of the at least one FBG sensor may between about 0.5 nm to about 15 nm, including all values and sub-ranges therein. For example, the range of operation of the at least one FBG sensor may be about 0.5 nm, about 1.0 nm, about 1.5 nm, about 2.0 nm, about 2.5 nm, about 3.0 nm, about 3.5 nm, about 4.0 nm, about 4.5 nm, about 5.0 nm, about 5.5 nm, about 6.0 nm, about 6.5 nm, about 7.0 nm, about 7.5 nm, about 8.0 nm, about 8.5 nm, about 9.0 nm, about 9.5 nm, about 10 nm about 10.5 nm, about 11 nm, about 11.5 nm, about 12 nm, about 12.5 nm, about 13 nm, about 13.5 nm, about 14 nm, about 14.5 nm, or about 15 nm. When the discriminating spectral domain is the region defined by the second portion of the reflected spectrum, a width and a monotonic gradient of the discriminating spectral domain may be based at least in part on an arrangement of the plurality of Bragg gratings of the at least one FBG sensor. The arrangement may comprise an increase in the number of Bragg gratings of the FBG sensor, a decrease in the number of Bragg gratings of the FBG sensor, or a gradual change in the periodicity of the Bragg gratings.

The FBG interrogation systems described herein may be coupled to various devices that are suitable for implantation into a subject. For example, the FBG interrogation systems may be coupled to an implantable cardioverter/defibrillator (ICD). The FBG sensor may be coupled to a leadless ICD or embedded in a lead of the ICD. In some variations, the ICD may include at least one processor that is configured to receive an electrocardiogramal from at least one electrode disposed in a subject and detect an arrhythmia in the subject based on the electrocardiogra signal.

Various implantable cardiac devices including the FBG interrogation systems are also described herein. In one instance, the implantable cardiac device may include a lead configured for cardioversion, defibrillation or pacing, wherein the lead is embedded with at least one fiber Bragg grating (FBG) sensor. The at least one FBG sensor may be configured to receive an optical signal from a light source, interact with a transmitted spectrum of the light source over a discriminating spectral domain, and generate a reflected optical signal representative of a change in a physical signal sensed by the FBG sensor. Additionally, the implantable cardiac device may include an interface unit coupled to the lead, and an optoelectrical coupler disposed within the interface unit. The optoelectrical coupler may include the light source, a photodetector to transform a reflected optical signal into an electrical signal, and a processor configured to analyze the electrical signal received from the photodetector and control a function of the implantable cardiac device based on the analysis. The processor may be coupled to a power management unit (PMU). The PMU may be configured to operate in an event-triggered mode, an event-gated mode, a pulse width modulation mode, an adaptive power mode, or a combination thereof, as further described herein. In some variations, it may be useful for the PMU to operate in the event-triggered mode and automatically turn on the light source and/or other powered components in response to a detected arrhythmia, e.g., a ventricular tachyarrhythmia. The arrhythmia may be detected based on the analysis of an electrogram and optionally, a myocardial strain sensed by the at least one FBG sensor, as further described below. Stated differently, the arrhythmia may be detected based on the analysis of an electrogram, on a myocardial strain sensed by the at least one FBG sensor, or both.

In some variations, a miniaturized fiber Bragg grating (FBG) interrogation system may comprise: at least one light source, at least one FBG, and a photodetector. The at least one FBG may be configured to: receive an optical signal from the at least one light source, interact with a transmitted spectrum of the at least one light source over a discriminating spectral domain, and generate a reflected optical signal representative of a change in a physical signal sensed by the at least one FBG. The discriminating spectral domain may be a region defined by at least one of a first portion of the transmitted spectrum of the at least one light source and a second portion of a reflected spectrum of the at least one FBG. A width of the discriminating spectral domain may be based at least in part on a range of operation of the at least one FBG. In response to a shift in the reflected spectrum of the at least one FBG, the power of the reflected optical signal may change monotonically over the discriminating spectral domain. The photodetector may be optically coupled to the at least one FBG to transform the reflected optical signal into an electrical signal. A measurement of the electrical signal may be indicative of a change in the physical signal.

In some variations, the discriminating spectral domain may be defined by the second portion of the reflected spectrum of the at least one FBG. The width and a monotonic gradient of the discriminating spectral domain may be based at least in part on an arrangement of Bragg gratings of the at least one FBG. In some variations, the arrangement may include an increase in a number of Bragg gratings of a first periodicity for an increase in the power of the reflected optical signal at a first wavelength and a decrease in the number of Bragg gratings of a second periodicity for a decrease in the power of the reflected optical signal at a second wavelength, thereby expanding the width of the discriminating spectral domain of the reflected spectrum of the at least one FBG.

In some variations, the discriminating spectral domain may be defined by the second portion of the reflected spectrum of the at least one FBG. A periodicity of Bragg gratings of the at least one FBG may change gradually. In some variations, the discriminating spectral domain may be defined by the first portion of the transmitted spectrum of the at least one light source. The at least one light source may be a vertical cavity surface emitting laser.

In some variations, the physical signal may be at least one of strain, temperature, and pressure. In some variations, the miniaturized FBG interrogation system may be configured for low frequency measurements. In some variations, a length of the at least one light source may be less than 10 mm and a diameter of the at least one light source is less than 6 mm. In some variations, a size of the at least one FBG may be less than 250 μm. In some variations, the lifespan of the miniaturized FBG interrogation system may be at least 5 years or at least 10 years.

In some variations, the miniaturized FBG interrogation system may be coupled to a processor configured to automatically turn on the at least one light source in response to a physical condition meeting at least one threshold criterion. In some variations, the miniaturized FBG interrogation system may be coupled to a processor configured to automatically turn on the at least one light source at predetermined intervals. In some variations, the miniaturized FBG interrogation system may be coupled to a processor configured to turn on the at least one light source in response to a request from a user.

In some variations, the miniaturized FBG interrogation system may be coupled to an implantable cardioverter/defibrillator (ICD). For instance, the miniaturized interrogation system may be coupled to a leadless ICD. The at least one FBG may be embedded in a lead of the ICD. In some variations, the ICD may include at least one processor to: receive an electrocardiogra signal from at least one electrode disposed in a subject, and detect an arrhythmia in the subject based on the electrocardiogramaignal. In response to detection of a tachyarrhythmia in the subject, the at least one processor may be further configured to transmit instructions to turn on the at least light source. In some variations, the ICD may include at least one processor to: receive an impedance signal representative of at least one of a measurement of pulmonary water content and pressure in a blood vessel of a subject and detect a possibility of heart failure based on the impedance signal. In response to detecting the possibility of heart failure, the at least one processor may be further configured to transmit instructions to turn on the at least light source.

In some variations, the at least one FBG may be a first FBG, the miniaturized FBG interrogation system may further comprise: a second FBG optically coupled to the at least one light source. The second FBG may be configured to condition the at least one light source such that the transmitted spectrum includes a plurality of spectral segments. In some variations, the at least one FBG may include a plurality of FBGs. In some variations, the plurality of FBGs may be formed on a single optical fiber. In some variations, the transmitted spectrum of the at least one light source may include a plurality of spectral segments. In some variations, each spectral segment of the plurality of spectral segments may comprise a respective first end with a first declining slope and a respective second end with a second declining slope. In some variations, each spectral segment of the plurality of spectral segments may be configured to interact with a respective reflected spectrum of each FBG of the plurality of FBGs over a corresponding discriminating spectral domain. In some variations, the at least one light source may include a plurality of light sources. In some variations, each FBG of the plurality of FBGs may receive a respective optical signal from a respective light source of the plurality of light sources.

In some variations, the at least one light source may be a doped semiconductor. In some variations, the at least one light source may include a wavelength filter. In some variations, the at least one light source may be a narrowband laser diode. The narrowband laser diode may be a distributed feedback diode. The narrowband laser diode may be a distributed Bragg reflection laser diode. In some variations, the at least one light source may be a quantum dot. In some variations, the at least one light source may be a vertical cavity surface emitting laser.

In some variations, the miniaturized FBG interrogation system may be coupled to a processor configured to operate the miniaturized FBG interrogation system in at least a first mode of power management, a second mode of power management, a third mode of power management, a fourth mode of power management and a fifth mode of power management. In the first mode of power management, a power delivered to the light source and, optionally, the powered component(s) may be continuous. In the second mode of power management, the processor may be configured to automatically turn on the at least one light source and, optionally, the powered component(s): in response to a physical condition meeting at least one threshold criterion, at predetermined intervals, or in response to a request from a user. In the third mode of power management, the at least one light source and, optionally, the powered component(s) may be configured to turn on and turn off based at least in part on a recurring physical event. In the fourth mode of power management, a power transmitted to the light source and, optionally, the powered component(s) may be in the form of discrete pulses. In the fifth mode of power management, the amount(s) of the power transmitted to the light source and, optionally, the powered component(s) may be adaptively adjusted to optimize power consumption.

In some variations, an implantable cardiac device may comprise: a lead for cardioversion, defibrillation or pacing and for sensing cardiac electrical (EGM) signal, a pulse generator, and a lead-generator interface unit coupled to the lead and the pulse generator. The lead may be embedded with at least one fiber Bragg grating (FBG) sensor. The FBG sensor may be configured to receive an optical signal from a light source, interact with a transmitted spectrum of the light source over a discriminating spectral domain, and generate a reflected optical signal representative of a change in a physical signal sensed by the FBG sensor. The lead-generator interface unit may comprise: an optoelectrical coupler including: the light source, and a photodetector to transform a reflected optical signal into an electrical signal, and a processor to analyze the electrical signal received from the photodetector, reduce and/or optimize the power consumption via a power management unit (PMU) according to the at least five modes of power management described herein above, and control a function of the implantable cardiac device based on the analysis.

In some variations, the discriminating spectral domain may be a region defined by at least one of a first portion of the transmitted spectrum of the at least one light source and a second portion of a reflected spectrum of the at least one FBG, a width of the discriminating spectral domain may be based at least in part on a range of operation of the FBG, and in response to a shift in the reflected spectrum of the FBG, a power of the reflected optical signal may change monotonically over the discriminating spectral domain.

In some variations, the implantable cardiac device may further comprise a pulse generator coupled to the interface unit and the lead to deliver the electrical current or energy for the cardioversion, defibrillation and/or pacing. In some variations, at least a portion of the optoelectrical coupler may be disposed in the pulse generator. In some variations, the processor may be disposed in the pulse generator. In some variations, the interface unit may be integrated into the pulse generator.

In some variations, the processor may be configured to: assess a hemodynamic status of a subject based on the electrical signal from the photodetector, and in response to determining that the status is stable, block discharge of electrical energy from a capacitor included in the generator through the lead to the subject. In some variations, the processor may be configured to: assess a hemodynamic status of a subject based on the electrical signal from the photodetector, and in response to determining that the status is stable, prevent transmission of electrical energy to a capacitor from a battery included in the generator.

In some variations, the processor may be configured to: in response to detecting at least one of a tachyarrhythmia, a possibility of heart failure, and an ischemia in a subject, automatically turn on the light source, and assess a hemodynamic status of the subject based on the electrical signal from the photodetector. In some variations, the processor may be configured to: receive an electrocardiogramal from an electrode disposed in a subject, and automatically turn on the light source based at least in part on the electrocardiogramal. In some variations, the processor may be configured to automatically turn on the light source in response to a physical condition meeting at least one threshold criterion. In some variations, the processor may be configured to automatically turn on the light source at predetermined time intervals. In some variations, the processor may be configured to automatically turn on the light source in response to a request from a user.

Methods that employ the FBG interrogation systems are also described herein. In general, the method may include selecting a light source and a FBG sensor such that a first portion of a transmitted spectrum of the light source is configured to interact with a second portion of a reflected spectrum of the FBG sensor over a discriminating spectral domain, transmitting, via the light source, an optical signal, receiving, from the FBG sensor, a reflected optical signal representative of a change in a physical signal sensed by the FBG sensor, and transforming, at a photodetector, the reflected optical signal into an electrical signal, wherein a measurement of the electrical signal is indicative of the change in the physical signal. A width of the discriminating spectral domain may be based at least in part on a range of operation of the FBG. In response to a shift in the reflected spectrum of the FBG, a power of the reflected optical signal may change monotonically over the discriminating spectral domain. The method may further include reducing power consumption of the FBG interrogation system using a power management unit (PMU).

In some variations, a method may comprise: selecting at least one of a light source and a fiber Bragg grating (FBG) such that a first portion of a transmitted spectrum of the light source is configured to interact with a second portion of a reflected spectrum of the FBG over a discriminating spectral domain, transmitting, via the light source, an optical signal, receiving, from the FBG optically coupled to the light source, a reflected optical signal representative of a change in a physical signal sensed by the FBG, and transforming, at a photodetector, the reflected optical signal into an electrical signal. A measurement of the electrical signal may be indicative of the change in the physical signal. The discriminating spectral domain may be a region defined by at least one of a first portion of the transmitted spectrum of the at least one light source and a second portion of a reflected spectrum of the at least one FBG. The width of the discriminating spectral domain may be based at least in part on a range of operation of the FBG. In response to a shift in the reflected spectrum of the FBG, a power of the reflected optical signal may change monotonically over the discriminating spectral domain.

DETAILED DESCRIPTION

Figure 1:
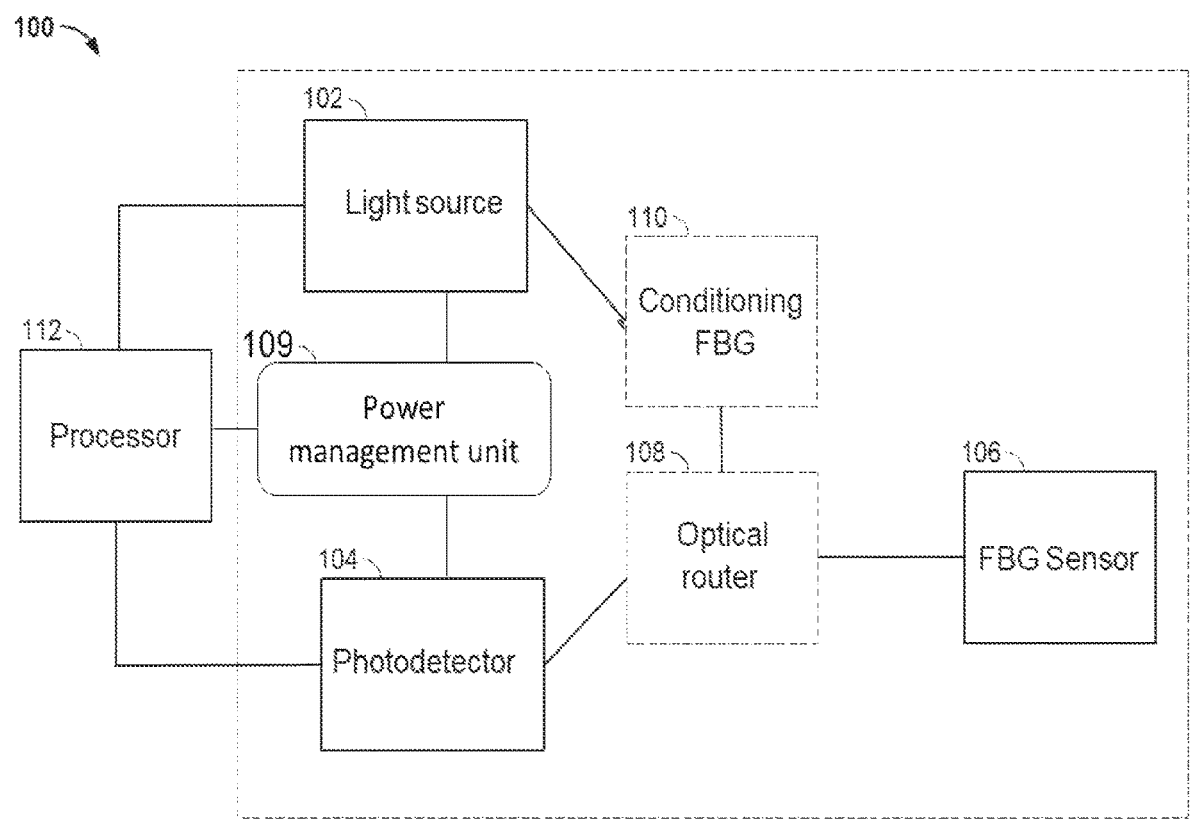
FIG. 1 illustrates an exemplary variation of a miniaturized FBG interrogation system.

Non-limiting examples of various aspects and variations of the invention are described herein and illustrated in the accompanying drawings. A "subject" or "subjects" as disclosed herein may include a human subject or patient in whom an implantable medical device has been or is indicated to be implanted. An "implantable medical device" as disclosed herein may be a small-sized device that may either wholly or partially be introduced into a biological subject (e.g., human subject). An "implantable medical device" as described herein may be used for diagnostic and/or monitoring and/or therapeutic purpose. A "miniaturized fiber Bragg grating (FBG) interrogation system" as disclosed herein may refer to FBG sensor(s) and the associated miniaturized FBG interrogator collectively.

Systems, devices, and methods for miniaturization of fiber Bragg grating (FBG) interrogators are described herein. The technology disclosed herein may be used in any suitable application, especially where available space is limited. For example, the technology disclosed herein may be used in implantable medical devices (IMD) such as an implantable pacemaker (IPM), an implantable cardioverter/defibrillator (ICD), implantable cardiac monitors (ICMs), implantable drug pumps, implantable pressure monitor, implantable strain monitor, implantable temperature monitor, and the like. In some variations, the miniaturized FBG interrogation system is integrated into an implantable medical device such as a lead-based ICD or a leadless ICD. In some variations, the miniaturized FBG interrogation system is integrated into an implantable medical device such as a lead-based IPM or a leadless IPM.

FBG sensors may be used to sense physical signals that represent parameters such as temperature, pressure, strain, and the like. An FBG sensor may be formed within an optical fiber by introducing periodic variations (i.e., gratings) in the refractive index of the optical fiber's core. When light is transmitted to the optical fiber, the gratings reflect specific wavelengths of light. The rest of the wavelengths of light may be transmitted through the optical fiber unhindered. On exposing the optical fiber to a change in a physical parameter (e.g., a change in a physical signal), the change causes a shift in the reflected wavelength of light. This shift may be used to measure and/or quantify the amount of change in the physical signal sensed by the FBG sensor (e.g., also referred to as "sensed physical signal").

As discussed above, conventional FBG interrogators for low measurement frequency and large range of values of the physical signal may include broadband light source(s), optical filters, interferometer(s) and the like that make conventional FBG interrogators bulky. Additionally, conventional FBG interrogators consume a lot of power (e.g., at least in part owing to the inclusion of broadband light source(s)). Therefore, FBG sensors have not been integrated into implantable medical devices such as ICDs which are typically small in size with limited power supply (e.g., provided by battery).

Disclosed herein is a miniaturized FBG interrogation system that may be integrated into small-sized devices. For example, the miniaturized FBG interrogation system may be integrated into an implantable medical device as further described herein. For instance, the miniaturized FBG interrogation system may be integrated into an ICD to determine hemodynamic status of a subject during cardiac arrhythmias, to provide a reliable way to eliminate and/or to reduce the incidence of inappropriate and/or premature ICD shocks in a subject, and to guide medical therapy based on long-term ambulatory monitoring of hemodynamic status in a subject. Inappropriate ICD shocks may refer to ICD discharges due to erroneously interpreted cardiac electrographic signals of nonfatal arrythmias or electrical/electromagnetic noises imitative of fatal or potentially fatal cardiac arrhythmias such ventricular tachycardia and ventricular fibrillation. Premature ICD shocks may refer to ICD discharges during ventricular tachycardia while the subject is hemodynamically stable, in which case alternative therapy such as antitachycardia pacing (ATP) may be the more appropriate treatment than ICD shock. The miniaturized FBG interrogation system described herein may be energy efficient. In particular, the miniaturized FBG interrogation system may be configured to consume less power. Additionally or alternatively, the miniaturized FBG interrogation system may be configured to generate minimum heat and may therefore be suitable for implantation in a subject.

A miniaturized FBG interrogation system may include a light source to transmit an optical signal, an FBG sensor to generate a reflected optical signal representative of a change in a physical signal, and a photodetector to transform the reflected optical signal to an electrical signal indicative of the change in the physical signal. The light source may be sized for integration into implantable medical devices as further described herein. At a high level, the light source and/or the FBG sensor of the miniaturized FBG interrogation system may be configured to interact such that the miniaturized FBG interrogation system is sensitive to changes in the physical signal sensed by the FBG sensor over a range of operation of the FBG sensor.

For example, the light source and/or the FBG sensor may be designed such that a transmitted spectrum of the light source may interact with a reflected spectrum of the FBG sensor over a discriminating spectral domain as further described herein. For instance, the transmitted spectrum of the light source may be configured to overlap and interact with the reflected spectrum of the FBG sensor over the discriminating spectral domain. The discriminating spectral domain may be a region defined by a portion of the transmitted spectrum of the light source and/or by a portion of the reflected spectrum of the FBG sensor. For example, the discriminating spectral domain may be a region within the transmitted spectrum of the light source and/or within the reflected spectrum of the FBG sensor. In the discriminating spectral domain, the power of the reflected optical signal from the FBG sensor may change monotonically in response to a shift in the reflected spectrum of the FBG sensor (such as in response to a change in the physical signal sensed by the FBG sensor). Simply put, the discriminating spectral domain may be a region in the transmitted spectrum of the light source and/or in the reflected spectrum of the FBG sensor that may be highly sensitive to changes in the physical signal sensed by the FBG sensor.

A width of the discriminating spectral domain may be determined based on a range of operation of the FBG sensor. In some variations, a width of the discriminating spectral domain may be conformed to a range of operation of the FBG sensor. For example, a minimum width for the discriminating spectral domain may be based on a range of operation of the FBG sensor. In some variations, the range of operation of the FBG sensor may in turn be determined based on a range of the physical signal that the FBG sensor is configured to sense. For instance, as a non-limiting example, if the miniaturized FBG interrogation system is configured to measure strain in a subject's heart, the myocardial strain at end diastole and that at end systole produced by the mechanical movements (i.e., contraction and relaxation) that may be experienced by a heart during a cardiac cycle, may dictate the boundaries for the range of values of the physical signal (myocardial strain) that the FBG sensor is configured to sense. The range of operation of the FBG sensor may be the response of the FBG sensor over this range of physical signal that the FBG sensor is configured to sense. For example, the range of operation of the FBG sensor may encompass the response of the FBG sensor to the myocardial strain at end diastole and the response of the FBG sensor to the myocardial strain at end systole. Therefore, the transmitted spectrum of the light source may be configured to interact with the reflected spectrum of the FBG sensor over the range of operation of the FBG such that the miniaturized FBG interrogation system may be highly sensitive to changes in the physical signal over the range of operation. The terms "myocardial strain" and "myocardial wall strain" are used interchangeably herein.

Example System

FIG. 1 illustrates an exemplary variation of a miniaturized FBG interrogation system 100. The miniaturized FBG interrogation system 100 may include one or more light sources 102, one or more FBG sensors 106, one or more photodetectors 104, optionally one or more optional conditioning FBGs 110, one or more optical routers 108, and a power management unit (PMU) 109. It should be readily understood that optical routers (e.g., optical router(s) 108) may relay or direct optical signals between or among different components in the FBG interrogation system 100 and may include components such as, optical coupler, optical splitter, optical circulator, optical switch, a combination thereof, and/or the like. The light source(s) 102 may be optically coupled to the FBG sensor(s) 106). The light source(s) 102 may transmit an optical signal to the FBG sensor(s) 106. The FBG sensor(s) 106 may receive the optical signal from the light source(s) 102 and may generate a reflected optical signal representative of a change in the physical signal (e.g., a change in physical parameters such as strain, vibration, pressure, temperature, etc.). The reflected optical signal may be received at a photodetector 104 optically coupled to the FBG sensor(s) 106. The photodetector 104 may transform the reflected optical signal into an electrical signal. This electrical signal may be indicative of a change in the physical signal. In this manner, the miniaturized FBG interrogation system 100 may measure changes to the physical signal.

In some variations, the miniaturized FBG interrogation system 100 may also include a power management unit (PMU) 109 that may be designed to minimize and/or reduce power consumption of the FBG interrogation system 100. The PMU 109 may be coupled to the light source(s) 102 and/or the photodetector(s) 104. In some variations, the PMU 109 may be coupled one or more powered components (not shown in FIG. 1) such as for example, preamplification component(s) (e.g., associated with the photodetector(s) 104), amplification component(s) (e.g., associated with the photodetector(s) 104), analog-to-digital conversion component(s) (e.g., associated with the photodetector(s) 104), filtering circuitries (e.g., associated with the photodetector(s) 104), and/or the like. In some variations, the miniaturized FBG interrogation system 100 may include one or more conditioning FBG 110 to condition a transmitted spectrum of the light source(s) 102 as further described herein. In some variations, the miniaturized FBG interrogation system 100 may include one or more optical routers 108 that direct or relay optical signals between or among different components (e.g., light source(s) 102, FBG sensor(s) 106, photodetector(s) 104, and conditioning FBG(s) 110) of the system 100. The miniaturized FBG interrogation system 100 may be communicatively and/or operably coupled to a processor 112. For example, the processor 112 may be coupled to the light source(s) 102, the photodetector 104, and the PMU 109 to control the operation(s), including switching on or off of the power supply to one or more of the electrical components of the miniaturized FBG interrogation system 100. For instance, the processor 112 may control the power supply to the light source(s) 102 and the photodetector (104) via the power management unit (109) as further described herein. Additionally or alternatively, the processor 112 may be configured to tune the wavelength spectrum of the light source(s)102 as further described herein. Additionally or alternatively, the processor 112 may be coupled to the photodetector 104 to analyze changes to the physical signal as measured by the miniaturized FBG interrogation system 100.

Light Source(s)

The light source(s) 102 may be configured to generate optical signals that may be transmitted to FBG sensor(s) 106. Some non-limiting examples of light source(s) 102 may include vertical-cavity surface-emitting laser, a doped light-emitting diode (LED) (e.g., an infrared emitter with varying arsenic and/or phosphorous doping compositions, a blue/green emitter with varying indium doping compositions, etc.), LED coated with wavelength filter (e.g., LED coated with phosphor or phosphor plate, etc.), distributed feedback diode, distributed Bragg reflection diode, quantum dot, and/or the like.

The optical signals generated by the light source(s) 102 may lie within a transmitted spectrum of the light source(s) 102. The transmitted spectrum of the light source(s) 102 may comprise one or more spectral segments. These spectral segments may be continuous or discrete. Each spectral segment may include a peak and two slopes, one on each side of the peak. The first slope may be an upward slope on a first side of the peak such that the intensity of the optical signal may increase with an increase in wavelength. The second slope may be a downward slope on a second side opposite to the first side of the peak such that the intensity of the optical signal may decrease with an increase in wavelength. The peak may be a point on the spectral segment. Additionally or alternatively, the peak may be an aggregate of two of more consecutive points that are continuous with one another to form a plateau of the spectral segment. In some variations, the first upward slope and the second downward slope may define a boundary of the spectral segment on two opposite sides of the spectral segment. In some variations, the upward slope and the downward slope of the spectral segment may be symmetrical around the peak. In some variations, the upward slope and the downward slope may be asymmetrical around the peak.

Figure 2A:
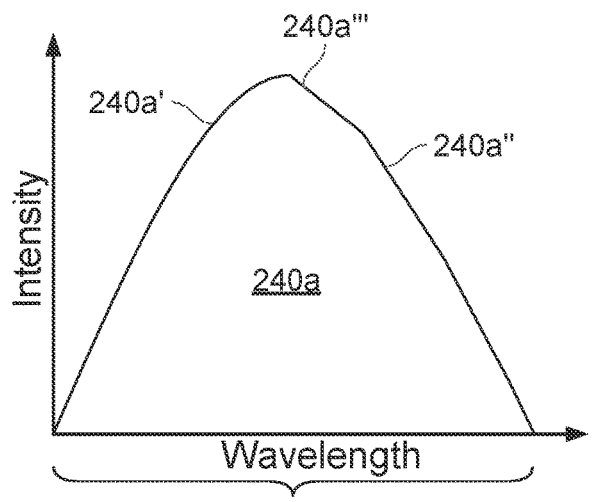
FIG. 2A illustrates an exemplary variation of a transmitted spectrum of a light source with a single spectral segment.

FIG. 2A illustrates an exemplary variation of a transmitted spectrum 232 of a light source (e.g., light source 102 in FIG. 1) with a single spectral segment 240a. As seen in FIG. 2A, the transmitted spectrum of the light source includes only one spectral segment 240a. The spectral segment 240a may include a peak 240a''' and an upward slope 240a' on a first side of the peak 240''' and a downward slope 240a'' on a second side opposite the first side of the peak 240a'''. As discussed above, the peak 240a''' may be a point on the spectral segment 240a or may be an aggregate of two or more consecutive points that are continuous with one another to form a plateau portion of the spectral segment 240a. In some variations, the slopes 240a' and 240a'' may define the boundary of the spectral segment 240a on two opposite sides of the peak 240a'''.

Figure 2B:
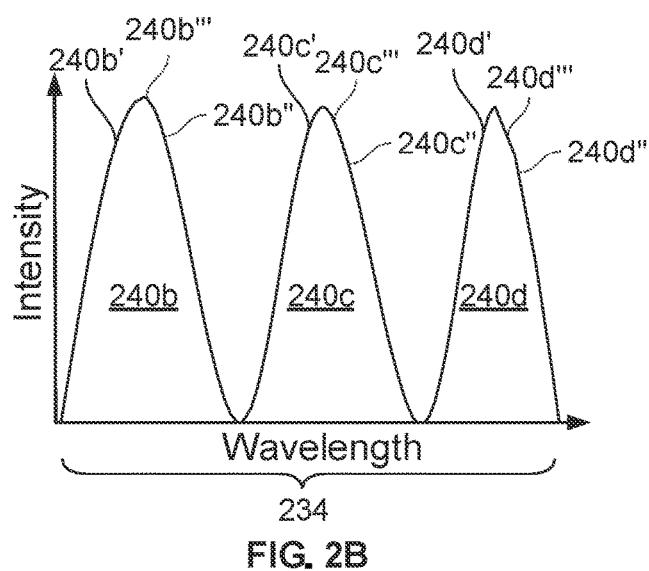
FIG. 2B illustrates an exemplary variation of a transmitted spectrum of a light source with multiple continuous spectral segments.

FIG. 2B illustrates an exemplary variation of a transmitted spectrum 234 of a light source (e.g., light source 102 in FIG. 1) with multiple spectral segments. In some variations, the intensity of the optical signal from the light source may be zero between two adjacent spectral segments. Additionally or alternatively, the intensity of the optical signals from the light source may not be zero between two adjacent spectral segments. For instance, spectral segments 240b, 240c, and 240d that may be continuous or discrete with one another. For example, the light source may be optically coupled to one or more conditioning FBG(s) 110 (described in further detail below). The one or more conditioning FBG(s)110 may split the transmitted spectrum 234 of the light source into multiple spectral segments. As a non-limiting example, the transmitted spectrum 234 of the light source in FIG. 2B includes three spectral segments 240b, 240c, and 240d. Each spectral segment includes a peak and two slopes (e.g., one upward slope and one downward slope) on each side of the peak. For example, spectral segment 240b includes a peak 240b''' and an upward slope 240b' and a downward slope 240b'' on opposite sides of the peak 240b'''. Similarly, spectral segment 240c includes a peak 240c''' and an upward slope 240c' and a downward slope 240c'' on opposite sides of the peak 240c'''. In a similar manner, spectral segment 240d includes a peak 240d''' and an upward slope 240d' and a downward slope 240d'' on opposite sides of the peak 240d'''. As discussed above, the peaks 240b''', 240c''', and 240d''' may be a discrete point on the spectral segment 240b, 240c, and 240d respectively. Alternatively, the peaks 240b''', 240c''', and 240d''' may be an aggregate of two or more consecutive points that are continuous with one another to form a plateau portion of the spectral segment 240b, 240c, and 240d respectively.

Figure 2C:
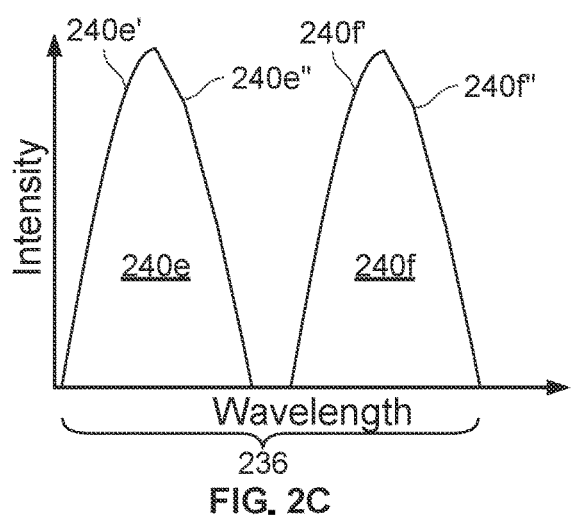
FIG. 2C illustrates an exemplary variation of a transmitted spectrum of a light source with multiple non-continuous spectral segments.

FIG. 2C illustrates an exemplary variation of a transmitted spectrum 236 with multiple spectral segments. As discussed above, the intensity of optical signal between two adjacent spectral segments may be zero or non-zero. For instance, in FIG. 2C spectral segments 240e and 240f may be continuous spectral segment or may be non-continuous spectral segments. For example, the miniaturized FBG interrogation system 100 may include more than one light source (e.g., light source 102 in FIG. 1). For instance, the system 100 may include a first light source with transmitted spectrum 240e and a second light source with transmitted spectrum 240f. The combined transmitted spectra of both the light sources may be transmitted spectrum 236. As a non-limiting example, the transmitted spectrum 236 of the light source in FIG. 2C includes two spectral segments 240e and 240f. Each spectral segment includes a peak and an upward slope and a downward slope on each side of the peak of the spectral segment. For example, spectral segment 240e includes a peak 240e''' and an upward slope 240e' and a downward slope 240e'' on opposite sides of the peak 240e''' of the spectral segment 240e. Similarly, spectral segment 240f includes a peak 240f''' and an upward slope 240f' and a downward slope 240f'' on opposite sides of the peak 240f''' of the spectral segment 240f. As discussed above, the peaks 240e''' and 240f''' may be a discrete point on the spectral segment 240e and 240f respectively. Alternatively, the peaks 240e''' and 240f''' may be an aggregate of two or more consecutive points that are continuous with one another to form a plateau of the spectral segment 240e and 240f respectively.

Referring back to FIG. 1, the transmitted spectrum of the light source(s) 102 may include a single spectral segment (e.g., spectral segment 204a in FIG. 2A) or multiple spectral segments (e.g., spectral segments in FIG. 2B and FIG. 2C).

In some variations, the FBG interrogation system 100 may include a single light source 102. In other variations, the FBG interrogation system 100 may include more than one light source 102. The light source(s) 102 may be configured for integration into small-sized devices such as implantable medical devices. For instance, the light source(s) 102 described herein may have small volumes. Additionally or alternatively, the light source(s) described herein may be small-sized. For instance, the light source(s) 102 may have a small diameter and/or a small length.

In some variations, the light source(s) 102 may be a laser diode. For example, the light source(s) 102 may be a semiconductor laser diode (e.g., vertical-cavity surface-emitting laser or VCSEL, edge emitting laser). In some variations, the light source(s) 102 may be a doped light-emitting diode (LED). An LED may be configured to interact with the FBG sensor(s) 106 over a discriminating spectral domain (described in detail below) by tailoring dopants in the LED. Some example dopants may include arsenic, phosphorous, germanium, indium, etc. In some variations, the light source(s) 102 may include a light source coated with one or more wavelength conversion materials such as an LED coated with a wavelength filter. The light source may be configured to interact with the FBG sensor(s) 106 over a discriminating spectral domain by coating the light source with wavelength conversion material(s). Some example wavelength conversion materials may include phosphor, etc. In some variations, the light source(s) 102 may be a laser diode such as a distributed feedback diode, distributed Bragg reflection diode, etc. In some variations, the light source(s) 102 may be an electrically driven quantum dot.

FBG Sensor(s)

The light source(s) 102 may be optically coupled to the FBG sensor(s) 106. FBG sensor(s) 106 may be formed within an optical fiber. For example, a core of the optical fiber may be exposed to ultraviolet light to inscribe grating planes and introduce periodic variations in the refractive index of the core. The distance or spacing between two adjacent grating planes may define a grating period.

When light is transmitted to the FBG sensor(s) 106, the FBG sensor(s) 106 reflect specific wavelengths of light that are within a reflected spectrum of the FBG sensor(s) 106. Changes in physical signal sensed by the FBG sensor(s) 106 may cause changes in the grating periods of the FBG sensor(s) 106. This in turn may cause a shift in the reflected wavelengths of light, thereby causing a shift in the reflected spectrum.

Figure 3A:
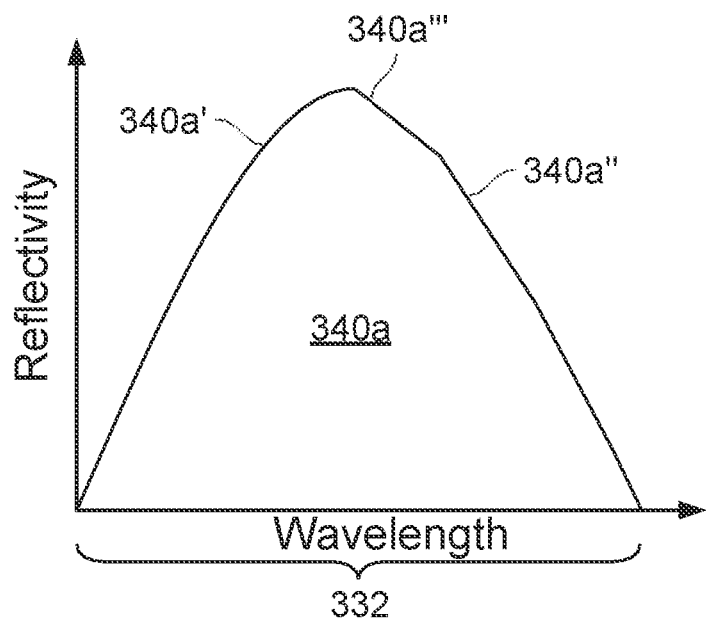
FIG. 3A illustrates an exemplary variation of a reflected spectrum of an FBG sensor with a single spectral segment.
Figure 3B:
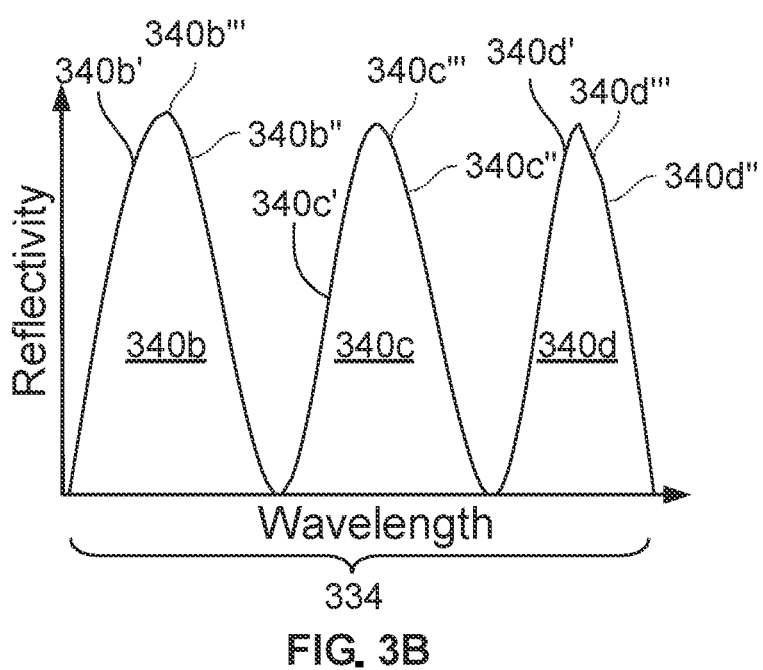
FIG. 3B illustrates an exemplary variation of a reflected spectrum of an FBG sensor with multiple continuous spectral segments.

Similar to the transmitted spectrum of the light source(s) 102, the reflected spectrum of the FBG sensor(s) 106 may comprise one or more spectral segments. For example, the reflected spectrum may comprise a single reflected spectral segment as shown in FIG. 3A. The spectral segment 340*a* may include a peak 340*a*''', corresponding to the center Bragg wavelength where the reflectivity may be at its maximum and two slopes 340*a*' and 340*a*'', one on each side of the peak 340*a*'''. The first slope 340*a*' may be an upward slope on a first side with increasing reflectivity as the wavelength increases and the second slope 340'' may be a downward slope on a second side of the peak (e.g., opposite the first side) with deceasing reflectivity as the wavelength increases. In some variations, the upward slope and the downward slope may be symmetrical around the peak. In some variations, the upward slope and the downward slope may be asymmetrical around the peak. The peak of the reflected spectral segment may be a point. Alternatively, the peak may be an aggregate of two of more consecutive points that are continuous with one another to form a plateau of the reflected spectral segment. In some variations, such plateau may be unsmooth or irregular. For example, the reflected spectrum of chirped FBG sensors may comprise a peak with an irregular plateau. In some variations, the reflected spectrum may comprise multiple reflected spectral segments as shown in FIG. 3B. As a non-limiting example, the reflected spectrum 343 of the FBG sensor(s) 106 may include three spectral segments 340*b*, 340*c*, and 340*d*. Each spectral segment (e.g., 340*b*, 340*c*, and 340*d*) includes a peak (e.g., 340*b*''', 340*c*''', and 340*d*''') and two slopes (e.g., 340*b*' and 340*b*'', 340*c*' and 340*c*'', and 340*d*' and 340*d*''), one on each side of the peak. Each peak, 340*b*''', 340*c*''' or 340*d*''', of the corresponding reflected spectral segment, 340*b*, 340*c* or 340*d*, may be a point. Alternatively, each of the peaks may be an aggregate of two of more consecutive points that are continuous with one another to form a plateau of the corresponding reflected spectral segment. Similar to the spectral segments in the transmitted spectrum of the light source as depicted in FIG. 2C, the reflected spectral segments in the reflected spectrum of the FBG sensors may be continuous spectral segment or may be non-continuous spectral segments.

Referring back to FIG. 1, in some variations, the FBG sensor(s) 106 of the FBG interrogation system 100 may be designed to optimize a width of the upward slope and/or downward slope of the reflected spectral segment over the range of operation of the FBG sensor(s) 106. The range of operation may be determined based on the range of possible values of the physical signal that the FBG sensor(s) 106 is configured to sense. For example, the range of operation may be determined by determining an upper boundary/maximum value and a lower boundary/minimum value for the physical signals that the FBG sensor(s) 106 is configured to sense. The response of the FBG sensor(s) 106 to the upper boundary/maximum value and the lower boundary/minimum value may determine the range of operation for the FBG sensor(s) 106.

The FBG sensor(s) 106 may be designed such that the reflected spectrum of the FBG sensor(s) 106 may be conformed to optimize the gradient of the upward slope and/or downward slope of the reflected spectral segment over the range of operation of the FBG sensor(s) 106. By conforming the reflected spectrum of the FBG sensor(s) 106, the reflected spectrum of the FBG sensor(s) 106 and the transmitted spectrum of the light source(s) 102 may be configured to interact such that the FBG interrogation system 100 may be adequately sensitive to changes in the sensed physical signal over its range of values.

In particular, the FBG sensor(s) 106 may be designed such that a width/gradient of a discriminating spectral domain in the reflected spectrum of the FBG sensor(s) 106 (described in detail below) may be modified to increase the sensitivity of the FBG interrogation system 100. More specifically, the gratings on the FBG sensor(s) 106 may be arranged in a manner to modify the discriminating spectral domain as described herein. That is, the gratings may be formed or inscribed on the optical fiber (e.g., with a laser light) to modify the discriminating spectral domain, for example by increasing the number of gratings for certain wavelengths and decreasing the number of gratings for certain other wavelengths on the FBG sensor(s) 106 in a specific manner and/or by increasing the space between the gratings and decreasing the space between the gratings on the FBG sensor(s) 106 in a specific manner. This is described in further detail below.

In some variations, the sensitivity of the FBG interrogation system 100 may be further increased by designing a discriminating spectral domain (described in detail below) in the transmitted spectral segment of the light source(s) 102 and another discriminating spectral domain (described in detail below) in the reflected spectrum of the FBG sensor(s) 106 such that the discriminating spectral domain of the transmitted spectral segment of the light source(s) 102 interact with the discriminating spectral domain of the reflected spectrum of the FBG sensor(s) 106 over a range of operation of the FBG sensor(s) 106 in response to a change in the physical signal sensed by the FBG sensor(s) 106. This is shown in FIG. 6C and explained in further detail below.

In some variations, the FBG sensor(s) 106 may be chirped FBG sensors. Chirped FBG sensors may be formed with gradually changing periodicity in Bragg grating. This gradually changing periodicity (e.g., grating period) may result in a broad reflection spectrum. The chirped FBG sensor may be designed to increase the width of the discriminating spectral domain in the reflected spectrum of the FBG sensor(s) 106.

The FBG sensor(s) 106 may be configured for integration into small-sized devices. For example, the FBG sensor(s) 106 may have a small diameter and/or a small length. For example, the diameter of the FBG sensor(s) 106 may be about or less than about 250 μm, about or less than about 225 μm, about or less than about 200 μm, about or less than about 175 μm, or about or less than about 150 μm. The length of the FBG sensor(s) 106 may be about or less than about 15 mm, about or less than about 12 mm, about or less than about 10 mm, about or less than about 8 mm, about or less than about 5 mm, or about or less than about 3 mm.

The FBG interrogation system 100 may include one or more FBG sensor(s) 106. In variations with more than one FBG sensor(s) 106, each FBG sensor(s) 106 may be configured to sense the same physical signal, independently at different locations. Alternatively, in variations with more than one FBG sensor(s) 106, at least one or more FBG sensor(s) 106 may be configured to sense different physical signals from the other FBG sensor(s) 106. For instance, a single optical fiber may include multiple FBG sensor(s) 106 (e.g., each grating or two or more gratings in combination may form an individual FBG sensor(s) 106). In some variations, the FBG interrogation system 100 may include multiple optical fibers. Each optical fiber may be designed to include single or multiple FBG sensors 106. More than one FBG sensor(s) 106 may allow for multi-location and/or multi-point sensing. For example, the FBG interrogation system 100 (e.g., a miniaturized FBG interrogation system integrated into an ICD) may include a first FBG sensor to sense a physical signal at a first location and a second FBG sensor to sense a physical signal at a second location. Positioning two or more FBG sensors in different locations of heart chambers (e.g., right atrium, right ventricle, coronary sinus, left ventricle etc.) and/or more than one site at each of the different locations of heart chambers (e.g., different sites in the coronary sinus) may allow the FBG interrogation system 100 to detect dyssynchrony among different sites and/or locations of the heart (e.g., synergy and/or lack of synchrony among sites or locations of the heart). In addition, detecting dyssynchrony may help effectively detect ventricular tachycardia and the associated hemodynamic status. If the two or more FBG sensors are on a single optical fiber, the photodetector 104 may apply wavelength division multiplexing to acquire and measure the response from each FBG sensor to a change in the sensed physical signal or signals as further described below. For example, a first FBG sensor may be positioned in the right ventricle and a second FBG sensor may be positioned in the coronary sinus (e.g., when the miniaturized FBG interrogation system 100 is integrated into an ICD). The first FBG sensor may be configured to sense a change in myocardial strain in the right ventricle and the second FBG sensor may be configured to sense a change in myocardial strain in the left ventricle.

Photodetector(s)

One or more photodetector(s) 104 may be optically coupled to the FBG sensor(s) 106. The photodetector(s) 104 may be configured to measure the change in physical signal sensed by the FBG sensor(s) 106. For example, the FBG sensor(s) 106 may receive an optical signal transmitted from the light source(s) 102. In response to sensing a change in the physical signal, the FBG sensor(s) 106 may generate a reflected optical signal through the interaction between the transmitted spectrum or spectra of the light source(s) and the reflected spectrum or spectra of the FBG sensor(s) over the discriminating spectral domain(s) as further described below. The power of the reflected optical signal may indicate the quantitative change in the physical signal. The photodetector(s) 104 may transform this reflected optical signal into an electrical signal. A measurement of the electrical signal may indicate the change in the physical signal. For example, the photodetector(s) 104 may receive the reflected optical signal from the FBG sensor(s) 106 and may convert the light photons in the reflected optical into current. A measure of the current may indicate a change in the sensed physical signal. The photodetector(s) 104 may be any suitable photodetector. For example, the photodetector(s) 104 may be a semiconductor-based photodetector such as photodiodes, phototransistors, etc. In some variations, the current may be converted into voltage. A measure of the voltage may indicate a change in the sensed physical signal sensed by the FBG sensors(s) 106.

In some variations, the miniaturized interrogation system 100 may include more than one photodetector(s) 104. Each photodetector(s) 104 may be coupled with a respective FBG sensor(s) 106. The FBG sensor(s) 106 may be positioned at different locations on a single optical fiber. Wavelength division multiplexing (WDM) may be applied to couple the photodetector(s) 104 to the FBG sensor(s) 106 such that the photodetector(s) 104 may receive the reflected optical spectra from each of the FBG sensor(s) 106 on the single optical fiber in response to changes in the physical signal(s) sensed by the FBG sensor(s) 106 at their respective locations.

Power Management Unit

The light source(s) 102 and/or the photodetector(s) 104 may be electrically coupled to the power management unit (PMU) 109. In some variations, one or more powered components of the FBG interrogation system 100 such as for example, a preamplification component associated with the photodetector(s) 104, an amplification component associated with the photodetector(s) 104, an analog-to-digital conversion component associated with the photodetector(s) 104, filtering circuitries associated with the photodetector(s) 104, etc., may be electrically coupled to the PMU 109. The term "powered components" may collectively refer to electrically powered components of the FBG interrogation system 100 other than the light source(s) 102 such as but not limited to a preamplification component associated with the photodetector(s) 104, an amplification component associated with the photodetector(s) 104, an analog-to-digital conversion component associated with the photodetector(s) 104, filtering circuitries associated with the photodetector(s) 104, etc.

In some variations, the PMU 109 may be configured to enable continuous operation of the FBG interrogation system 100. In some variations, the PMU 109 may be configured to minimize and/or optimize power consumption of the FBG interrogation system 100. More specifically, the PMU 109 may be configured to switch the FBG interrogation system 100 from an operational state to a dormant state so as to minimize and/or reduce power consumption. For example, in some variations, when the light source(s) 102 is turned on, the FBG interrogation system 100 may be in an operational state. In the operational state, the FBG interrogation system 100 may be configured to acquire and measure one or more physical signals that the FBG sensor(s) 106 is configured to sense (e.g., sensed physical signal). When the light source(s) 102 is turned off, the FBG interrogation system 100 may not measure physical signals that the FBG sensor(s) 106 is configured to sense and may be in a dormant state, thereby conserving power. In some variations, the light source(s) 102 and/or the powered components may be powered on and turned off intermittently via the PMU 109, thereby transitioning the FBG interrogation system 100 from operational state to dormant state and vice versa so as to minimize and/or reduce power consumption. In some variations, the amount(s) of power (e.g., electrical power) supplied to the light source(s) and/or powered components may be adjusted (e.g., adaptively adjusted) via the PMU 109 so as to achieve an optimal balance between the power consumed by the FBG interrogation system 100 and the sensitivity and/or the accuracy of the FBG interrogation system 100 to sense physical signals.

In some variations, the FBG interrogation system 100 described herein may be configured to operate in one or more modes that minimize power consumption (referred to as "mode of power management"). In some variations, the light source(s) 102 and/or the powered components may be turned on via the PMU 109 based on a mode of power management of the FBG interrogation system 100 as further described herein.

In some variations, the PMU 109 may include one or more switches such as ultrarapid switches and one or more power regulation circuits that may be coupled to the light source(s) 102 and, optionally, to the powered components. In some variations, the light source(s) 102 and/or the powered components may be powered on for a determined period of time (e.g., operating period) before being powered off via the one or more switches based on the mode of power management. For example, the miniaturized FBG interrogation system may be integrated into an implantable medical device (e.g., an ICD). The miniaturized FBG interrogation system 100 integrated into the ICD may have an operating period of about or less than about fraction of a microsecond, about or less than about 10 microseconds, about or less than about 100 microseconds, about or less than about a fraction of a millisecond, about or less than about 10 millisecond, about or less than about 100 milliseconds, about or less than a fraction of a second, about or less than 10 seconds, about or less than 100 seconds, about or less than a fraction of a minutes, about less than 10 minutes, about or less than a fraction of an hour, or about or less than a 30 hours. The light sources(s) and/or powered components may be powered on via one or more of the switches for the operating period and may be turned off via the one or more switches after the duration of the operating period based on the mode of power management.

In some variations, the PMU 109 may include one or more power regulation circuits to regulate the amount(s) of electrical power transmitted to the light source(s) 102 and/or to the powered components. For example, the miniaturized FBG interrogation system 100 may be integrated into an implantable medical device for the heart (e.g., an ICD) to sense myocardial strain of the ventricle(s). The amount(s) of electrical power transmitted to the light source(s) 102 may be decreased via the power regulation circuit such that the intensity of the of the transmitted spectrum/spectra of the light source(s) 102 may be reduced while the one or more myocardial strain signals of the ventricles are more than adequately sensed by the miniaturized FBG interrogation system 100 to accurately determine hemodynamical stability of the subject at minimal power consumption. In a similar manner, in some variations, the amount(s) of electrical power transmitted to the powered components may be decreased via the power regulation circuit so that the gain and/or the sampling frequency of the FBG interrogation system 100 may be reduced while the one or more myocardial strain signals of the ventricles are more than adequately sensed by the miniaturized FBG interrogation system 100 to accurately determine hemodynamic stability of the subject at minimal power consumption.

It is to be understood that the physical arrangement or sequence between the switch(es) and the power regulation circuits may vary. In some variations, the switch may be disposed before the power regulation circuit for one light source or for one powered component. In some variations, the power regulation circuit may be disposed before the switch for another light source or for another powered component.

In some variations, the PMU 109 may include one or more processors to control at least some components of the PMU 109 (e.g., switches, power regulation circuits, etc.). In some variations, the PMU 109 may be coupled to one or more processors (e.g., processor 112 in FIG. 1) to control at least some components of the PMU 109 (e.g., switches, power regulation circuits, etc.). In some variations, the processor(s) may control one or more components of the PMU 109 automatically. For example, the processor(s) may control one or more components of the PMU 109 based on a preprogrammed algorithm. Additionally or alternatively, the processor(s) may control one or more components of the PMU 109 based on machine learning techniques. In variations in which the FBG interrogation system 100 is integrated into an implantable medical device, the processor(s) may control one or more components of the PMU 109 based on historical data and/or real-time data collected by the implantable medical device. In some variations, a user may control one or more components of the PMU 109 via the processors wirelessly.

The FBG interrogation system 100 may be configured to operate in at least five modes of power management via the PMU 109 so as to minimize power consumption. For instance, the FBG interrogation system 100 may be configured via the PMU 109 to operate in: a continuous mode, an event-triggered mode, an event-gated mode, a pulse width modulation mode (pulsed mode), and/or an adaptive power mode as further described herein. In the continuous mode, the light source(s) 102 and/or powered components may be turned on continuously. It is to be understood that the terms continuous and continuously as being used herein to describe the continuous mode of power management do not explicitly or implicitly indicate the FBG interrogation system is powered on or turned on without interruption. In some variations, such interruption(s) may occur when the continuous mode is combined with other modes such as the event-gated mode and/or the pulsed mode as described herein below.

In the event-triggered mode, the light source(s) 102 and/or powered components may be turned on (e.g., automatically turned on) by triggering events that include, but are not limited to (1) a physical event as described herein, (2) preprogrammed intervals, and/or (3) a request from a user. For instance, the miniaturized FBG interrogation system 100 may be integrated into ICD as described herein. In some variations, the light source(s) 102 and/or the powered components may be turned on (e.g., automatically turned on) by a triggering event such as a physical event including demand event(s) such as tachycardia, heart failure, ischemia, and/or the like. In some variations, the light source(s) 102 and/or the powered components may be turned on (e.g., automatically turned on) at preprogrammed interrogation intervals. Such preprogrammed interrogation intervals may be daily, weekly, monthly, quarterly or yearly or a fraction thereof. In some variations, the light source(s) 102 and/or the powered components may be turned on (e.g., automatically turned on) by a triggering event such as a request from a user. Such a user may be a physician, nurse practitioner, physician assistant, medical technologist or the like who has the training and professional qualifications to perform such a request. For example, a user may transmit a request to the FBG interrogation system 100 via a wireless interface or other type of I/O device to turn on the light source(s) 102 and/or the powered components.

In some variations, the light source(s) 102 and/or the powered components may remain powered on over a certain period of time (e.g., operating period) before being turned off or powered off automatically. During the operating period, the miniaturized FBG interrogation system 100 may acquire and measure one or more physical signals that the FBG sensor(s) 106 is configured to sense (e.g., sensed physical signals). In some instances, the length or duration of the operating period may be fixed or predetermined. In some variations, the length of the operating period may be determined dynamically based on historical and/or real-time data (e.g., sensed physical signals acquired, sensed, and/or measured by the FBG interrogation system 100) and on the amount(s) of power consumed by the FBG interrogation system 100. In some instances, the length or duration of the operating period may be dynamically determined based at least in part on the analysis of the physical signal sensed by the FBG interrogation system 100 through FBG sensor(s) during the current operating period and/or during prior operating period(s). In some variations, the length of the operating period may be dynamically determined based at least in part on the analysis of the physical signal(s) that may be detected through non-FBG sensor(s) such as cardiac electrogram(s) detected through electrodes disposed in the heart and/or through separate and additional FBG sensor(s). For instance, the duration of the operating period may be the entire duration of cardiac arrhythmia, ischemia, or exacerbation of heart failure or fractions of time thereof or beyond such duration.

In some variations, some physical events may occur at recurring intervals (e.g., cardiac cycles, respiratory cycles, etc.). Such recurring physical events may have periodicities that may vary over time. For example, cardiac cycles and respiratory cycles are recurring events whose periodicities are often stable. However, there may be times when the periodicities of the cardiac cycles and the respiratory cycles vary. In variations in which the FBG interrogation system 100 is integrated into an implantable medical device, recurring physical events that occur at recurring intervals may be detected by the implantable medical device as further described herein. As a nonlimiting example, cardiac cycles as a recurring event may be detected by analyzing cardiac electrographic signals through the electrodes in an implantable medical device. As yet another nonlimiting example, respiratory cycles as a recurring event may be detected by analyzing transthoracic impedance through impedance sensors in an implantable medical device.

In response to a recurring physical event, the FBG interrogation system 100 may be configured via the PMU 109 to operate in the event-gated mode. In the event-gated mode, a processor (e.g., processor internal to the PMU 109 and/or a processor coupled to the PMU 109) may actuate the switch(es) (e.g., ultrarapid switch(es)) in the PMU 109 such that the light source(s) 102 and/or the powered components may be rapidly switched on and off at specific time instance(s) and/or timepoint(s), i.e., gating time point(s), during a recurring cycle of recurring event(s). These gating time point(s) may be predetermined. Additionally or alternatively, these gating time point(s) may be dynamically determined, for example, before, or at, or after the occurrence of the recurring physical event. For example, the light source(s) 102 may be switched on (e.g., automatically switched on) at a specific gating time point (e.g., predetermined and/or dynamically determined) during the recurring event(s). After a certain period of time (e.g., operating period) from switching on the light source(s) 102 and/or the powered component(s), the light source(s) and/or the powered component(s), may be switched off (e.g., automatically switched off). During the operating period when the light source(s) 102 is switched on, the FBG interrogation system 100 may acquire and measure one or more physical signals that the FBG sensor(s) 106 is configured to sense (e.g., sensed physical signals). As discussed above and similar to the event-triggered mode, for the event-gated mode the length of the operating period from switching on the light source(s) to switching off the light source(s) 102 may be hours or a fraction of an hour, minutes or a fraction of a minute, seconds or a fraction of a second, milliseconds or a fraction of a millisecond, microseconds or a fraction of microsecond, etc. In some variations, the length of the operating period for the event-gated mode may be fixed or predetermined. In some variations, the length of the operating period for the event-gated mode may be determined dynamically based historical and/or real-time data (e.g., sensed physical signals acquired, sensed, and/or measured by the FBG interrogation system 100) and amount of power consumed by the FBG interrogation system 100. In some variations, the length of the operating period for the event-triggered mode and/or for the event-gated mode may be dynamically determined based at least in part on the analysis of the sensed physical signals(s) being sensed by the FBG interrogation system 100 through the FBG sensor(s) during the current operating period and/or having recorded during prior operating period(s). In some variations, the length of the operating period for the event-triggered mode and/or for the event-gated mode may be dynamically determined based at least in part on the analysis of the physical signal(s) that may be detected through non-FBG sensor(s) and/or through separate and additional FBG sensor(s). In some variations, the length of the operating period for the event-triggered mode and/or for the event-gated mode may be dynamically determined based at least in part on the analysis of the changes in the recurring physical events, either in the time domain or the frequency domain, that may be detected by the FBG interrogation system 100.

In some variations, the recurring event(s) may occur repetitively, for example, at recurring interval(s). In some variations, the operating period for the event-triggered mode may not exceed the recurring interval of the recurring events. For example, the light source(s) 102 and/or the powered components may be switched on (e.g., automatically switched on) at an end-systole of a cardiac cycle and may be switched off (e.g., automatically switched off) after a preset operating period of 50 or 100 milliseconds. In a similar manner, the light source(s) 102 and/or the powered components may be switched on (e.g., automatically switched on) at an end-diastole of a cardiac cycle and may be switched off (e.g., automatically switched off) after a preset operating period of 50 or 100 milliseconds. In some variations, the operating period for the event-triggered mode may exceed the recurring interval of the recurring events. In some variations, the light source(s) 102 and/or the powered components may be switched on (e.g., automatically switched on) at an end-inspiration of the respiratory cycle and may be switched off after a dynamically determined operating period, for example, dynamically determined operating period that is equal to 2 or 3 cardiac cycles based on the analysis of movement measurement of the part of the heart such as the movement of the ventricular wall(s) sensed by the FBG interrogation system 100 through FBG sensor(s) and/or on the analysis of cardiac electrographic signals through electrodes (non-FBG sensor). In a similar manner, the light source(s) 102 may be switched on (e.g., automatically switched on) at an end-expiration of the respiratory cycle and may be switched off (e.g., automatically switched off) after a dynamically determined operating period, for example, dynamically determined operating period that is equal to 2 or 3 cardiac cycles based on the analysis of movement measurement of the part of the heart such as the movement of the ventricular wall(s) sensed by the FBG interrogation system 100 through FBG sensor(s) and/or on the analysis of cardiac electrographic signal(s) through electrode(s) (non-FBG sensor).

Figure 9:
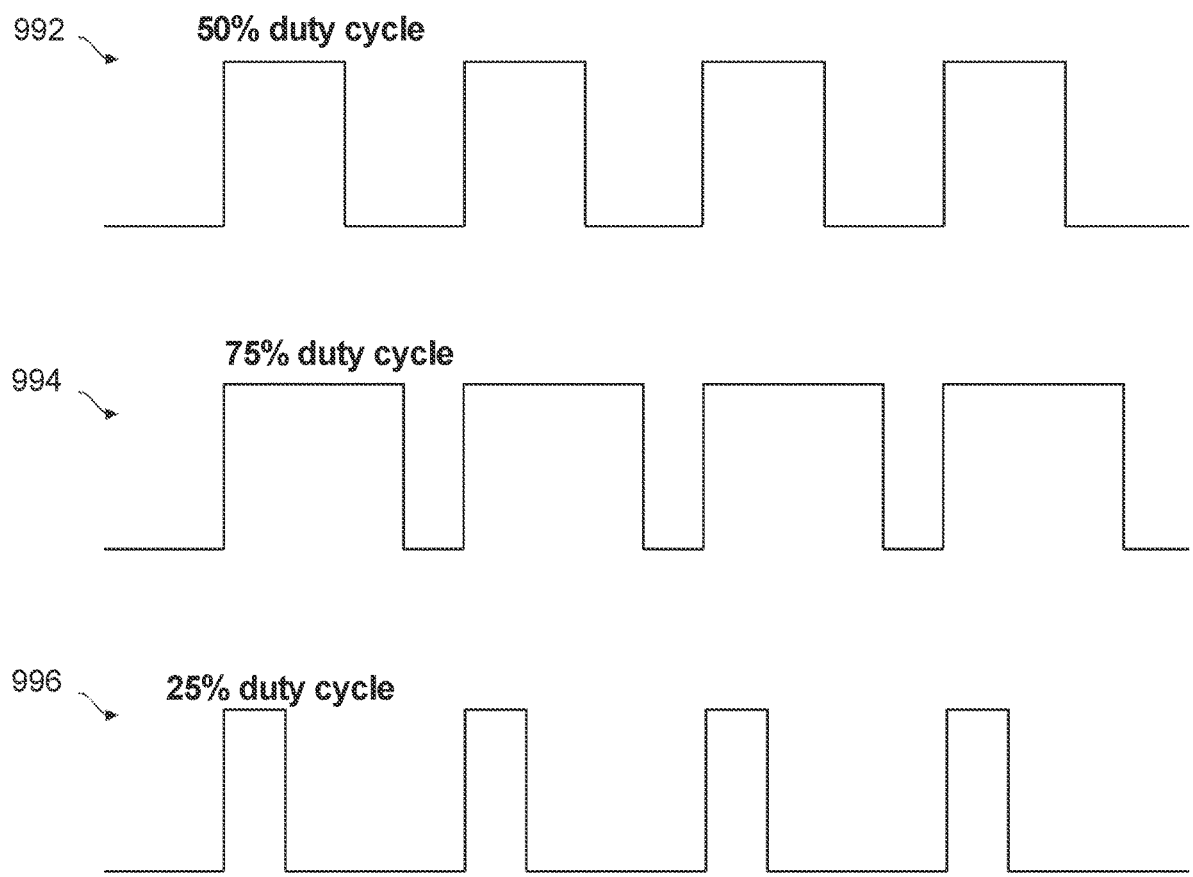
FIG. 9 illustrates exemplary duty cycles of power delivered to the light source(s) and/or powered components when the FBG interrogation system is operating in the pulse width modulation mode of power management to minimize power consumption.

In some variations, the FBG interrogation system 100 may be configured via the PMU 109 to operate in the pulse width modulation mode or pulsed mode. In the pulsed mode, the power delivered to the light source(s) 102 and/or the powered components may be in the form of discrete pulses. These discrete pulses may switch on and/or switch off the light source(s) 102 and/or the powered components in a discrete manner. The discrete manner in which the light source(s) 102 and/or the powered components may be switched on and switched off may be based on a duty cycle of the clock and/or the voltage/current signal(s) that control the power delivered to the light source(s) 102 and/or the powered components. For instance, the power delivered to the light source(s) 102 and/or the powered components may be represented in the form of a duty cycle which may indicate the proportion of time that the light source(s) 102 and/or the powered components may be switched on to the time that the light source(s) 102 may be switched off. FIG. 9 illustrates example duty cycles of power delivered to the light source(s) 102 and/or powered components when the FBG interrogation system 100 is operating in the pulse width modulation mode of power management. For instance, duty cycle 992 has a pulsing time interval of 50 percent. Put differently, the power delivered to the light source(s) 102 and/or the powered components may cause the light source(s) 102 and/or the powered components to switch on 50 percent of the time and cause the light source(s) 102 and/or the powered components to switch off 50 percent of the time. Similarly, duty cycle 994 has a pulsing time interval of 75 percent, thereby causing the power delivered to the light source(s) 102 and/or the powered components to switch on the light source(s) 102 and/or the powered components for 75 percent of the time and switch off the light source(s) 102 and/or the powered components for 25 percent of the time. In a similar manner, duty cycle 996 has a pulsing time interval of 25 percent, thereby causing the power delivered to the light source(s) 102 and/or the powered components to switch on the light source(s) 102 and/or the powered components for 25 percent of the time and switch off the light source(s) 102 and/or the associated powered components for 75 percent of the time. In some variations, the duty cycle may be preprogrammed or, alternatively, dynamically determined based on the analysis of the amplitude of the physical signal sensed by the FBG sensor(s) 106 or the output amplitude of the photodetector 104 as described herein below. It should be readily understood that the amplitude of the physical signal sensed by the FBG sensor(s) 106 and the output amplitude of the photodetector 104 are highly correlated with each other.

In some variations, the discrete form of the pulsed power delivered to the light source 102 and/or the powered components may be of rectangular morphology. In some variations, the discrete form of the pulsed power delivered to the light source 102 and/or the powered components may be modulated into other non-rectangular morphologies such as sinusoidal or nearly sinusoidal. In some variations, the morphology of the pulsed power, the frequency of the pulses and the percentage of the duty cycles may be optimized to minimize power consumption while allowing adequate acquisition of the physical signal(s) and reducing or eliminating the low frequency artifact(s) potentially introduced in the output signal of the miniaturized FBG interrogation system 100 that may overlap with the frequency component(s) in the physical signal(s) sensed by the FBG sensor(s).

In some variations, the FBG interrogation system 100 may be configured via the PMU 109 to operate in the adaptive power mode. In the adaptive power mode, the power transmitted to the light source(s) 102 and/or the powered component(s) may be increased or decreased adaptively (i.e., adjusted adaptively) via the PMU 109 based on the amplitude of the physical signal sensed by the FBG sensor(s) 106. For instance, if the amplitude of the physical signal sensed by the FBG sensor(s) 106 is determined to be greater than a detection threshold, then the power transmitted to the light source(s) 102 and/or the powered component(s) may be adaptively decreased via one or more power regulation circuits included in the PMU 109. The detection threshold may be an amplitude above which accurate data (e.g., accurate changes to parameters such as temperature, pressure, strain, etc.) can be extracted reliably from the physical signals sensed by the FBG sensor(s) 106. Accordingly, adaptively decreasing the power transmitted to the light source(s) 102 and/or the powered component(s) when the amplitude of the physical signal sensed by the FBG sensor(s) 106 is greater than the detection threshold may minimize and/or reduce the power consumed by the FBG interrogation system 100.

In a similar manner, if the amplitude of the physical signal sensed by the FBG sensor(s) 106 is determined to be below a sensitivity threshold, then the power transmitted to the light source(s) 102 and/or the powered component(s) may be adaptively increased via one of more power regulation circuits included in the PMU 109. The sensitivity threshold may be an amplitude below which accurate data (e.g., accurate changes to parameters such as temperature, pressure, strain, etc.) cannot be extracted reliably from the physical signals sensed by the FBG sensor(s) 106. Accordingly, adaptively increasing the power transmitted to the light source(s) 102 and/or the powered component(s) when the amplitude of the physical signal sensed by the FBG sensor(s) 106 is less than the sensitivity threshold may increase the accuracy and sensitivity of the FBG interrogation system 100.

In some variations, the detection threshold for the light source(s) may be the same as the detection threshold for the powered component(s). In some variations, the detection threshold for the light source(s) may be different from the detection threshold for the powered component(s). In some variations, the sensitivity threshold for the light source(s) may be the same as the sensitivity threshold for the powered component(s). In some variations, the sensitivity threshold for the light source(s) may be different from the sensitivity threshold for the powered component(s). In some variations, the detection threshold may be the same as the sensitivity threshold. In some variations, the detection threshold may be different from the sensitivity threshold.

In some variations, the amount(s) of power transmitted to the light source(s) 102 and/or the powered component(s), either individually or in any combination thereof, may be adaptively adjusted based on the analysis of the amplitude of the physical signal sensed by the FBG sensor(s) 106 or the output amplitude of the photodetector 104 as described herein above. In some variations, such adaptive adjustment of power may be in the form of adaptively adjusting (for example, increasing or decreasing) the current, the voltage and/or the duty cycle of the clock and/or the voltage/current signal(s) that control the power transmitted to the light source(s) 102 and/or the powered component(s) as described herein above.

In some variations, the detection threshold and/or the sensitivity threshold may be predetermined. In some variations, the detection threshold and/or the sensitivity threshold may be dynamically determined (e.g., based on historical and/or real-time data from the FBG interrogation system 100). In some variations, the detection threshold and/or the sensitivity threshold may be determined based on input and/or feedback from a user. In some variations, the adaptive adjustment of power to the light source(s) 102 and/or the powered component(s) may be in the form of adjustment of current and/or voltage to the light source(s) 102 and/or the powered component(s). In some variations, the adaptive adjustment of power may be the same among the light source(s) 102 and/or the powered components. In some variations, the adaptive adjustment of power may be different among the light source(s) 102 and/or the powered components. As an example, the miniaturized FBG interrogation system 100 may be integrated into an implantable medical device to sense ventricular myocardial strain to determine hemodynamic status during events such as cardiac arrhythmia, heart failure and/or ischemia. In some variations, the baseline amplitude of the myocardial strain (e.g., as determined during normal rhythm and/or baseline conditions) may vary from one subject to another and from one time instant to another in the same subject, depending on a number of factors including, but not limited to, left ventricular ejection fraction, sufficiency of coronary blood supply, metabolic state, preload and/or afterload of the ventricle(s), etc. If the baseline amplitude of the myocardial strain is reliably and excessively greater than a detection threshold, then one or more power regulation circuits in the PMU 109 may adaptively decrease the amount(s) of electrical power to the light source(s) 102 and/or the powered component(s) to minimize the power consumption. Conversely, if the baseline amplitude of the myocardial strain sensed by the FBG sensor(s) 106 may be determined to be below a sensitivity threshold, then one or more power regulation circuits in the PMU 109 may adaptively increase the amount(s) of electrical power to the light source(s) 102 and/or, the powered component(s) to improve the sensitivity and accuracy of the FBG interrogation system 100.

In some variations, the various modes of power management that minimize or optimize power consumption described herein may be performed separately and/or simultaneously with one or more other modes as further described herein. However, in some variations, the continuous mode and the event-triggered mode may be formed sequentially and not simultaneously. The power management unit and the modes of power management that are described herein in the context of miniaturized FBG interrogation systems may be independent of the specific system(s), device(s) and/or method(s) to miniaturize the FBG interrogator. In some instances, the power management unit (PMU) and associated modes of power management described herein may regulate the power consumption of the light sources and other powered components rather than the optical sensor itself directly. In these instances, the PMU and the modes of power management described herein may be used to minimize and to optimize the power consumption of other sensing systems or devices that employ other optical sensors.

Optional Conditioning FBG

In some variations, the FBG interrogation system 100 may optionally include one or more conditioning FBG(s) 110 to split a transmitted spectrum of a light source(s) 102 into multiple spectral segments. Conditioning FBG(s) 110 may be formed on an optical fiber by inscribing segments on a core of the optical fiber with periodically varying refractive index. However, unlike the FBG sensor(s) 106, the conditioning FBG(s) 110 may be configured to split the transmitted spectrum into multiple spectral segments. For example, when the transmitted spectrum from the light source(s) 102 is transmitted to the conditioning FBG(s) 110, the conditioning FBG(s) 110 may create a notch in the transmitted spectrum, thereby splitting the transmitted spectrum into multiple spectral segments. The conditioning FBG(s) 110 may be optically coupled to the light source(s) 102. If the transmitted spectrum of the light source(s) 102 has a single spectral segment as shown in FIG. 2A, the conditioning FBG(s) 110 may be optically coupled to the light source(s) 102 to split the single spectral segment into multiple spectral segments as shown in FIG. 2B. In some variations, the conditioning FBG(s) 110 may act as a filter (e.g., to optimize width and/or slope of the discriminated spectral domain(s) in the transmitted spectrum or spectra of the light source(s) 102).

Optical Router

In some variations, the FBG interrogation system 100 may include one or more optical router(s) 108 to direct or relay the optical signals between or among two or more components of the FBG interrogation system 100 and/or to distribute the optical signal from one component to two or more components of the FBG interrogation system 100. For example, the optical router(s) 108 may optically couple the light source(s) 102 and the photodetector 104 to the FBG sensor(s) 106. The optical router(s) 108 may be a single optical fiber that includes two separate fiber portion (e.g., a first optical fiber portion and a second optical fiber portion). The optical router(s) 108 may receive optical signal through the single optical fiber that may be split into two separate outgoing optical signals (e.g., a first optical signal and a second optical signal) that are transmitted through the two separate optical fiber portions. For example, a first optical fiber portion may optically couple the FBG sensor(s) 106 to the light source(s) 102. A second optical fiber portion may optically couple the FBG sensor(s) 106 to the photodetector(s) 104. This may be advantageous in making the FBG interrogation system 100 compact and reducing the form factor of the FBG interrogation system 100. More specifically, to transmit optical signals from the light source(s) 102 to the FBG sensor(s) 106, an optical fiber may be necessary to optically couple the light source(s) 102 and the FBG sensor(s) 106. Similarly, to receive reflected optical signals at the photodetector 104 from the FBG sensor(s) 106, an optical fiber may be necessary to optically couple the photodetector(s) 104 and the FBG sensor(s) 106. Instead of using two separate optical fibers that may contribute to making the FBG interrogation system 100 bulky, an optical router 108 with a single optical fiber may be used. Optical router(s) 108 as described herein may include, as nonlimiting examples, optical coupler, optical splitter, optical circulator, or optical switch.

Exemplary Variations of FBG Interrogation System Components

Discriminating Spectral Domain

The FBG sensor(s) 106 and/or the light source(s) 102 may be designed such that the transmitted spectrum of the light source(s) 102 and the reflected spectrum of the FBG sensor(s) 106 are configured to interact over a discriminating spectral domain. The discriminating spectral domain may be a region in the transmitted spectrum of the light source(s) 102 and/or a region in the reflected spectrum of the FBG sensor(s) 106.

Figure 4:
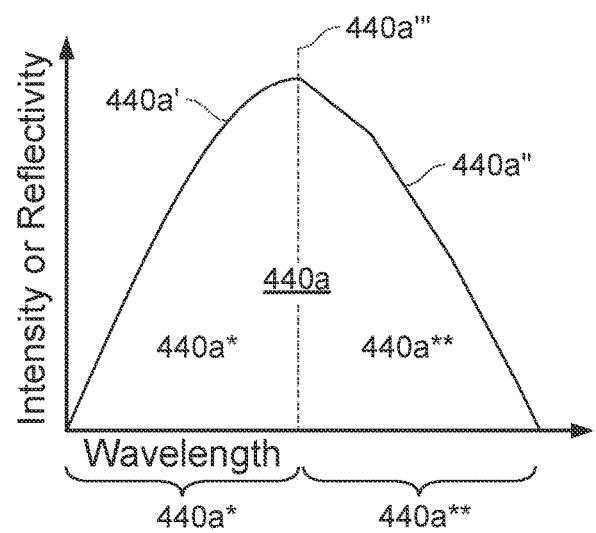
FIG. 4 illustrates an exemplary variation of a discriminating spectral domain.

FIG. 4 illustrates an exemplary variation of discriminating spectral domains 440a\* and **440a\*\*. The discriminating spectral domain may be a region 440a\* and/or a region 440a in a spectral segment 440a. The spectral segment 440a may include a peak 440a''' and one upward slope 440a' and one downward slope 440a'' on each side of the peak 440a'''. The discriminating spectral domain 440a* may be a region under upward slope 440a'. For instance, the discriminating spectral domain 440a* may be the sloped portion (e.g., region under slope 440a') of the spectral segment 440a. Additionally or alternatively, the discriminating spectral domain 440a** may be a region under downward slope 440a''. The spectral segment 440a may be a spectral segment of the transmitted spectrum of the light source (e.g., light source(s) 102 in FIG. 1) and/or a spectral segment of the reflected spectrum of the FBG sensor (e.g., FBG sensor(s) 106 in FIG. 1). Therefore, the discriminating spectral domain 440a* and 440a** may each be defined by a portion of the transmitted spectrum of the light source and/or a portion of the reflected spectrum of the FBG sensor. FIG. 4 represents intensity of the light source versus wavelength when the discriminating spectral domain is defined by the transmitted spectrum of the light source. Put differently, the y-axis in FIG. 4 represents the intensity of the light source when the discriminating spectral domain is defined by the transmitted spectrum of the light source. In a similar manner, the y-axis in FIG. 4 represents reflectivity of FBG sensor versus wavelength when the discriminating spectral domain is defined by the reflected spectrum of the FBG sensor. Put differently, the y-axis in FIG. 4 represents the reflectivity of the FBG sensor when the discriminating spectral domain is defined by the reflected spectrum of the FBG sensor.

In the discriminating spectral domain (e.g., 440a* or 440a**), a power of the reflected optical signal from the FBG sensor may change monotonically (e.g., linearly) in response to a shift in the reflected spectrum of the FBG sensor. As discussed herein, the reflected spectrum of the FBG sensor may shift in response to a change in the physical signal sensed by the FBG sensor. The shift in the reflected spectrum of the FBG sensor may, over the range of operation of the FBG sensor, behave as a monotonic function of the change in the physical signal sensed by the FBG sensor. Therefore, in the discriminating spectral domain (e.g., 440a* or 440a**), the power of the reflected optical signal may change monotonically (e.g., linearly) in response to the change in the physical signal sensed by the FBG sensor. Therefore, when the discriminating spectral domain (e.g., 440a* or 440a**) is wide enough to cover the entire range of operation of the FBG sensor, it may be feasible to indirectly detect a shift in the reflected spectrum of the FBG sensor for low measurement frequency physical signals over the discriminating spectral domain (e.g., 440a* or 440a**). Accordingly, bulky Fabre-Perot interferometers that are currently used for physical signals of a low measurement frequency (e.g., <100 Hz) with relatively greater range of values may be eliminated. In contrast, some variations of the FBG interrogation system 100 described herein may represent the simplest FBG interrogation system with least number of components comprising a FBG sensor 106, at least one light source 102, and a photodetector.

As discussed above, in some variations, the discriminating spectral domain 440a** may be defined by the downward slope 440'' of the spectral segment 440a. The downward slope 440a'' may represent a monotonically decreasing function. For instance, the downward slope 440'' may represent a function such that for shift in wavelength where may represent the power of the reflected optical signal. Therefore, with a shift in the reflected spectrum (and shift in the wavelengths), the power of the reflected optical signal may change monotonically. Accordingly, changes in the physical signal (e.g., a decrease in strain) sensed by the FBG sensor may yield a corresponding change in the power of the reflected optical signal (e.g., an increase in the power of the reflected optical signal). Although the upward slope 440a' and the downward slope 440a'' in FIG. 4 are depicted as smooth curves for the purpose of illustration, it should be readily understood that these slopes may have small irregularities or ripples. These small irregularities or ripples may negatively affect the accuracy, resolution, or sensitivity of the miniaturized FBG interrogation system. In some variations, these small irregularities or ripples may be minimized through the fabrication processes of the light source and/or FBG sensor. Additionally or alternatively, the effects of these small irregularities or ripples may be minimized during the operation of the miniaturized FBG interrogation system by application of signal processing algorithms. In some variations, the gradient of the upward slope 440a' or the downward slope 440a'' may be optimized to allow for an increased sensitivity without compromising the width of the discriminating spectral domain. This may make the miniaturized FBG interrogation system (e.g., FBG interrogation system 100) more sensitive to small changes in the physical signal, thereby increasing the sensitivity of the miniaturized FBG interrogation system 100.

The discriminating spectral domain (e.g., 440a* or 440a**) may be at least wide enough to cover the range of operation of the FBG sensor. More specifically, a minimum width of the discriminating spectral domain may be such that the power of the reflected optical signal changes monotonically over the entire range of operation of the FBG sensor. If the width of the discriminating spectral domain (e.g., 440a* or 440a**) is smaller than the minimum width, the FBG sensor and/or the light source may be designed to expand the width of the discriminating spectral domain as further described below.

Light Source

In some variations, the light source (e.g., light source(s) 102 in FIG. 1) may be designed such that a portion of the transmitted spectrum of the light source may define the discriminating spectral domain (e.g., 440a* or 440a**). For instance, the discriminating spectral domain (e.g., 440a* or 440a**) may be a region in the transmitted spectrum of the light source. As an example, consider that the spectral segment 440a is in the transmitted spectrum of the light source. The y-axis of FIG. 4 represents the intensity of the light source. In some variations, the discriminating spectral domain 440* may be a region under the upward slope 440a'. Additionally or alternatively, the discriminating spectral domain 440** may be an region under the downward slope 440a''. In some variations, the spectral segment 440a may represent the entire transmitted spectrum of the light source as described herein. In other variations, the spectral segment 440a may be a spectral segment in a transmitted spectrum comprising multiple spectral segments (e.g., such as in FIGS. 2B and 2C). In such a scenario, the transmitted spectrum may include multiple discriminating spectral domains. For instance, any number of spectral segments of the transmitted spectrum may include at least one discriminating spectral domain. For example, if the transmitted spectrum of the light source includes three spectral segments, then one spectral segment, any two spectral segments, or all three spectral segments may each include at least one respective discriminating spectral domain such as discriminating spectral domain 440a* or 440a** in FIG. 4.

In some variations, the light source may be designed such that the discriminating spectral domain 440a** has at least a minimum width that may cover the range of operation of the FBG sensor. For example, a LED light source may be designed such that the width of the downward slope 440a" in the transmitted spectrum may be wide enough to cover the range of operation of the FBG sensor. More specifically, a minimum width of the downward slope 440a" in the transmitted spectrum may be determined based on the range of operation of the FBG sensor. The light source may be designed so that the downward slope 440a" of the transmitted spectrum has at least the minimum width.

In some variations, the width of the upward slope 440a' and/or downward slope 440a" of the transmitted spectral segments of the light source 102 may be optimized. For example, the width and the gradient of the upward slope 440a' and/or downward slope 440a" of the transmitted spectral segment(s) may be optimized during the manufacturing process of the light source ("pre-emission fabrication"). Additionally or alternatively, the width and the gradient of the upward slope 440a' and/or downward slope 440a" of the transmitted spectral segment(s) may be optimized after the light source has been manufactured ("post-emission modification").

In some variations, the pre-emission fabrication process may include, as nonlimiting examples, varying dopants (e.g., varying doping concentration) of light sources. For example, the doping concentration and/or dopants may be varied in quantum wells such as Arsenic and/or Phosphorus compositions may be varied for infrared emitters. In a similar manner, Indium doping compositions may be varied from blue emitters and/or green emitters. Varying the concentration or composition of dopants may vary the transmission spectrum of the light sources. The concentration or composition may be varied such that the width and the gradient of the upward slope 440a' and/or downward slope 440a" of the transmitted spectral segment(s) may be optimized.

In some variations, the post-emission modification process may include coating the light source with dye or pigment or wavelength conversion materials such as phosphor and/or quantum dots. For example, the physical dimensions and/or the composition of the dye or pigment or wavelength conversion materials may be varied. Varying the physical dimensions and/or the composition of dye or pigment or wavelength conversion material may vary the transmission spectrum of the light sources. The light sources may therefore be coated with the dye or pigment or wavelength conversion materials such that the width and the gradient of the upward slope 440a' and/or downward slope 440a" of the transmitted spectral segment(s) may be optimized. In some variations, the post-emission modification process may include using one or more optical filters such as conditioning FBGs to modify the transmitted spectrum of the light source such that the width and the gradient of the upward slope 440a' and/or downward slope 440a" of the transmitted spectral segment(s) may be optimized.

In some variations, the light source may be designed to include multiple light source each with a different transmitted spectrum. These multiple light sources may be packaged together in a manner such that the combined transmitted spectrum may include the discriminating spectral domain (e.g., 440a* or 440a**) with the required minimum width (e.g., minimum width that may be determined as discussed above). As another example, the light source may be designed to include multiple LEDs each with a different transmitted spectrum. These multiple LEDs may be packaged together in a manner such that the combined transmitted spectrum may include the discriminating spectral domain (e.g., 440a* or 440a**) of the desired or required minimum width.

Figure 5A:
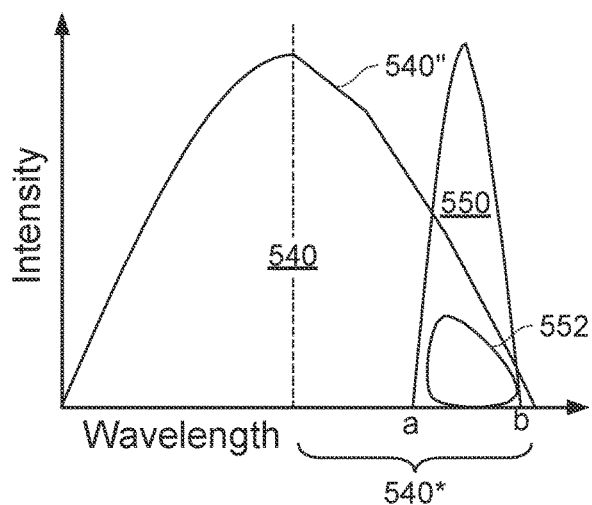
FIG. 5A illustrates an exemplary variation of a transmitted spectrum of a light source and a reflected spectrum of an FBG sensor configured to interact with each other over a discriminating spectral domain defined by the transmitted spectrum of the light source.

FIG. 5A illustrates an exemplary variation of a transmitted spectrum 540 of a light source (e.g., light source(s) 102 in FIG. 1) and a reflected spectrum 550 of a FBG sensor (e.g., FBG sensor(s) 106 in FIG. 1) configured to interact with each other over a discriminating spectral domain 540* defined in the transmitted spectrum 540 of the light source. For example, the transmitted spectrum 540 of the light source and the reflected spectrum 550 of the FBG sensor may be made to interact with each other over the discriminating spectral domain 540* that is in the transmitted spectrum 540. Since the power of the reflected optical signals (e.g., 552 in FIG. 5A) change monotonically in the discriminating spectral domain 540* and the discriminating spectral domain has a minimum width to cover the entire range of operation of the FBG sensor, the FBG interrogation system may be sensitive to changes in the physical signals over the range of operation of the FBG sensor. The sensitivity of the FBG interrogation system may be increased by increasing the gradient of the downward slope 540" defining the discriminating spectral domain 540*. The range of operation of the FBG sensor may be increased by increasing the width of the discriminating spectral domain 540*. In some variations, the power of the reflected optical signals (such as for example, 552 in FIG. 5A) may be defined by where L(wl) represents the transmitted spectrum 540 of the light source in intensity and F(wl) represents the reflected spectrum 550 of the FBG sensor in reflectivity at wavelength wl.

In some variations, the light source may be designed to interact with multiple reflected spectrums of FBG sensors. For example, the FBG interrogation system may include multiple FBG sensors each having a different central wavelength and respective range of operation. The collective reflected spectrum of the multiple FBG sensors may include multiple reflected spectral segments (e.g., such as multiple reflected spectral segments in FIG. 3B) with each reflected spectral segment corresponding to a reflected spectrum of a specific FBG sensor. In some variations, the light source may be designed such that a single transmitted spectrum of the light source may be conditioned to interact with each reflected spectrum of a respective FBG sensor over a respective discriminating spectral domain. For example, the light source may be designed such that the single transmitted spectrum may be split by a conditioning FBG (e.g., conditioning FBG 110 in FIG. 1) such that each split spectral segment may interact with each reflected spectrum of a respective FBG sensor over a respective discriminating spectral domain. In other variations, the light source may include multiple light sources with each individual transmitted spectrum designed to interact with each individual reflected spectrum of the respective FBG sensors over the respective discriminating spectral domain.

FBG Sensors

Referring back to FIG. 4, in some variations, the FBG sensor (e.g., FBG sensor(s) 106 in FIG. 1) may be designed such that a portion of the reflected spectrum of the FBG sensor may define the discriminating spectral domain (e.g., 440a* or 440a**). The y-axis of FIG. 4 may represent the reflectivity of the FBG sensor. For instance, the discriminating spectral domain (e.g., 440a* or 440a**) may be a region in the reflected spectrum of the FBG sensor. As an example, consider that the spectral segment 440a is in the reflected spectrum of the FBG sensor. In some variations, the spectral segment 440a may represent the entire reflected spectrum (e.g., such as in FIG. 3A) of the FBG sensor. In such a scenario, the reflected spectrum may include at least one discriminating spectral domain such as 440a* and/or 440a** described herein. In other variations, the spectral segment 440a may be a spectral segment in a reflected spectrum comprising multiple spectral segments (e.g., such as in FIG. 3B). In such a scenario, the reflected spectrum may include multiple discriminating spectral domains. For instance, each of the spectral segments of the reflected spectrum may include a respective discriminating spectral domain 440a*, 440a** or both.

In some variations, the FBG sensor may be designed such that the discriminating spectral domain (e.g., 440a* or 440a**) has at least a minimum width that may cover the range of operation of the FBG sensor. For example, a FBG sensor may be designed such that the width of the downward slope 440a" in the reflected spectrum may be wide enough to cover the range of operation of the FBG sensor. More specifically, a minimum width of the downward slope 440a" in the reflected spectrum may be determined based on the range of operation of the FBG sensor. The FBG sensor may be designed so that the downward slope 440a" of the reflected spectrum has at least the minimum width.

In some variations, the width of the discriminating spectral domain (e.g., 440a* or 440a**) may be optimized by varying a grating period of the FBG sensor, varying a number of gratings of a given grating period of the FBG sensor, varying a pattern of distribution of gratings with different grating period along the core of the optical fiber of the FBG sensor, varying a tilt or an angle of the grating planes, changing a time of exposure to ultraviolet light during the inscription of the gratings on the optical fiber, changing the chemical composition of the core of the optical fiber so as to change the refractive index, introducing a gradient in the refractive index of the core of the optical fiber (e.g., by varying the tilt or angle of grating planes and/or changing a time exposure to ultraviolet light), a combination thereof, and/or the like.

For example, the FBG sensor may be designed such that the number of gratings may be increased for reflected optical signals at wavelengths where a higher power is desirable and the number of gratings may be decreased for reflected optical signals at wavelengths where a lower power is desirable. For instance, in FIG. 4, the number of gratings of the FBG sensor may be increased for reflected optical signals at wavelengths closer to the peak 440a. The power of the reflected optical signals for a FBG sensor may be proportional to the number of gratings. Therefore, greater number of gratings for reflected optical signals at wavelengths closer to the peak 440a may increase the power of the reflected optical signals at these wavelengths. In contrast, the number of gratings of the FBG sensor may be decreased as the wavelengths of the reflected optical signals start moving away from the peak 440a. For example, the number of gratings of the FBG sensor may be the least for reflected optical signals at wavelengths that are farthest away from the peak 440a. The lesser number of gratings may decrease the power of these reflected optical signals. This increased power closer to the peak 440a and decreased power away from the peak 440a may in turn increase the gradient of the downward slope 440a", thereby adjusting the sensitivity of the FBG interrogation system as desirable. Additionally, this may increase the width of the slope (e.g., downward slope 440a"), thereby increasing the width of the discriminating spectral domain (e.g., 440a**) so as to conform the discriminating spectral domain to a desired range of operation of the FBG sensor, thereby enabling the FBG sensor to sense physical signals with low measurement frequency but greater range of values.

Additionally or alternatively, the FBG sensor may be designed such that the grating period (e.g., space between the gratings) may be changed such that the discriminating spectral domain (e.g., 440a* or 440a**) has at least the minimum width. For example, the FBG sensor may be designed such that the grating period may be increased for reflected optical signals at wavelengths where higher power is desired and the grating period may be decreased for reflected optical signals at wavelengths where lower power is desired. In this manner, the number of gratings and/or the grating period of the FBG sensors may be changed to expand the width of the discriminating spectral domain (e.g., 440a* or 440a**) without having to increase the overall width of the transmitted spectrum of the light source or the reflected spectrum of the FBG sensor. Increasing the transmitted spectrum of the light source may increase the power consumption of the FBG interrogation system and the physical size of the FBG interrogation system.

In some variations, the FBG sensors may be chirped FBG sensors, that may be formed with gradually changing grating periods. The grating periods of the chirped FBG sensors may be changed in a manner such that the width of the discriminating spectral domain 440* may at least cover the range of operation of the FBG sensor.

Figure 5B:
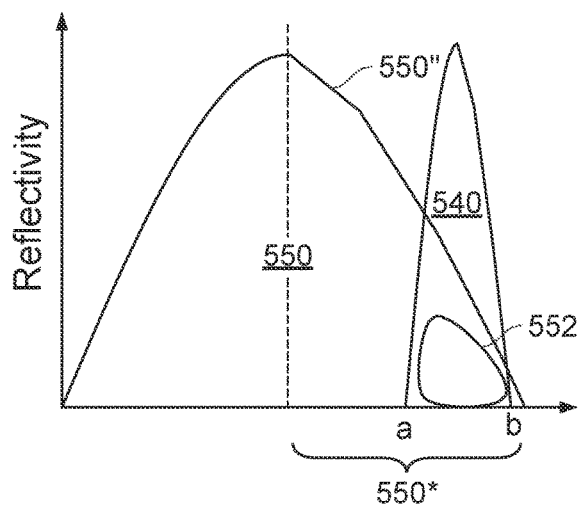
FIG. 5B illustrates an exemplary variation of a transmitted spectrum of a light source and a reflected spectrum of an FBG sensor configured to interact with each other over a discriminating spectral domain defined by the reflected spectrum of the FBG sensor.

FIG. 5B illustrates an exemplary variation of a transmitted spectrum 540 of a light source (e.g., light source(s) 102 in FIG. 1) and a reflected spectrum 550 of a FBG sensor (e.g., FBG sensor(s) 106 in FIG. 1) configured to interact with each other over a discriminating spectral domain 550* defined by the downward slope 550" in the reflected spectrum 550 of the FBG sensor. For example, the transmitted spectrum 540 of the light source and the reflected spectrum 550 of the FBG sensor may be made to interact with each other over the discriminating spectral domain 550* that is in the reflected spectrum 550. Since the power of the reflected optical signals (e.g., 552 in FIG. 5B) change monotonically in the discriminating spectral domain 550* and discriminating spectral domain has a minimum width to cover the entire range of operation of the FBG sensor, the FBG interrogation system may be sensitive to changes in the physical signals over the range of operation of the FBG sensor. The sensitivity of the FBG interrogation system may be increased by increasing the gradient of the downward slope defining the discriminating spectral domain 550*. Furthermore, by increasing the width of the discriminating spectral domain 550*, the reflected spectrum 550 of the FBG sensor may be conformed to the range of operation of the FBG sensor. In some variations, the power of the reflected optical signals (such as for example, 552 in FIG. 5B) may be defined by where L(wl) represents the transmitted spectrum 540 of the light source in intensity and F(wl) represents the reflected spectrum 550 of the FBG sensor in reflectivity at wavelength wl.

In some variations, the FBG interrogation system may include multiple FBG sensors. For example, a single optical fiber may include more than one FBG sensor. Alternatively, the FBG interrogation system may include multiple optical fibers, thereby including multiple FBG sensors.

Examples of Interactions Between FBG Sensors and Light Sources

To sense and acquire all possible values of the physical signal that the FBG sensor may be configured to sense, the transmitted spectrum of the light source and the reflected spectrum of the FBG sensor may be configured to interact over a discriminating spectral domain. For example, the transmitted spectrum of the light source and the reflected spectrum of the FBG sensor may be made to overlap over the discriminating spectral domain. The discriminating spectral domain may be defined by a portion of the transmitted spectrum of the light source and/or a portion of the reflected spectrum of the FBG sensor. A minimum width for the discriminating spectral domain may be determined based on the range of operation of the FBG sensor, which is further defined by the range of possible values of the physical signal that the FBG sensor may be configured to sense. A change in a physical signal sensed by the FBG sensor may cause a shift in the reflected spectrum of the FBG sensor. A power of the reflected optical signal (reflected by the FBG sensor) may change monotonically in the discriminating spectral domain in response to a wavelength shift in the reflected spectrum, thereby making it possible to exclude Fabry-Perot interferometer(s). This in turn enables miniaturization of the FBG interrogation system for lower measurement frequency of sensed physical signals with relatively large range of values.

The FBG sensor and/or the light source may be designed such that the discriminating spectral domain may have the minimum width to cover the entire range of operation of the FBG sensor. Additionally, the FBG sensor and/or the light source may be designed such that the slopes, either upward or downwards slopes, in the transmitted spectrum of the light source or in the reflected spectrum of the FBG sensor defining the discriminating spectral domain may have an increased gradient, thereby increasing the sensitivity of the FBG interrogation system.

In some variations, the FBG interrogation system may include a single light source with a transmitted spectrum. The transmitted spectrum may have a single spectral segment. In some variations, to sense physical signals using the single light source, the FBG interrogation system may condition the single light source such that the transmitted spectrum comprises multiple spectral segments. For example, the FBG interrogation system may include a single light source such that the transmitted spectrum of the light source may be conditioned (e.g., using one or more conditioning FBGs) to split into multiple spectral segments. Alternatively, the FBG interrogation system may include multiple light sources each with a respective transmitted spectrum. In such a scenario, when the transmitted spectrum includes multiple spectral segments and the reflected spectrum includes a single spectral segment, the FBG sensors may be designed so that the corresponding reflected spectrum of the each FBG sensor may be configured to interact with one spectral segment of the multiple spectral segments of the transmitted spectrum of the light source over a respective discriminating spectral domain.

In some variations, the FBG interrogation system may include multiple FBG sensors. Each FBG sensor may have a respective reflected spectrum. Therefore, the collective reflected spectra of the FBG sensors may include multiple reflected spectral segments. In such a scenario, the light source of the FBG interrogation system may be designed to include multiple transmitted spectral segments that may interact with each of the multiple reflected spectral segments of the FBG sensors over the respective discriminating spectral domain.

Figure 10:
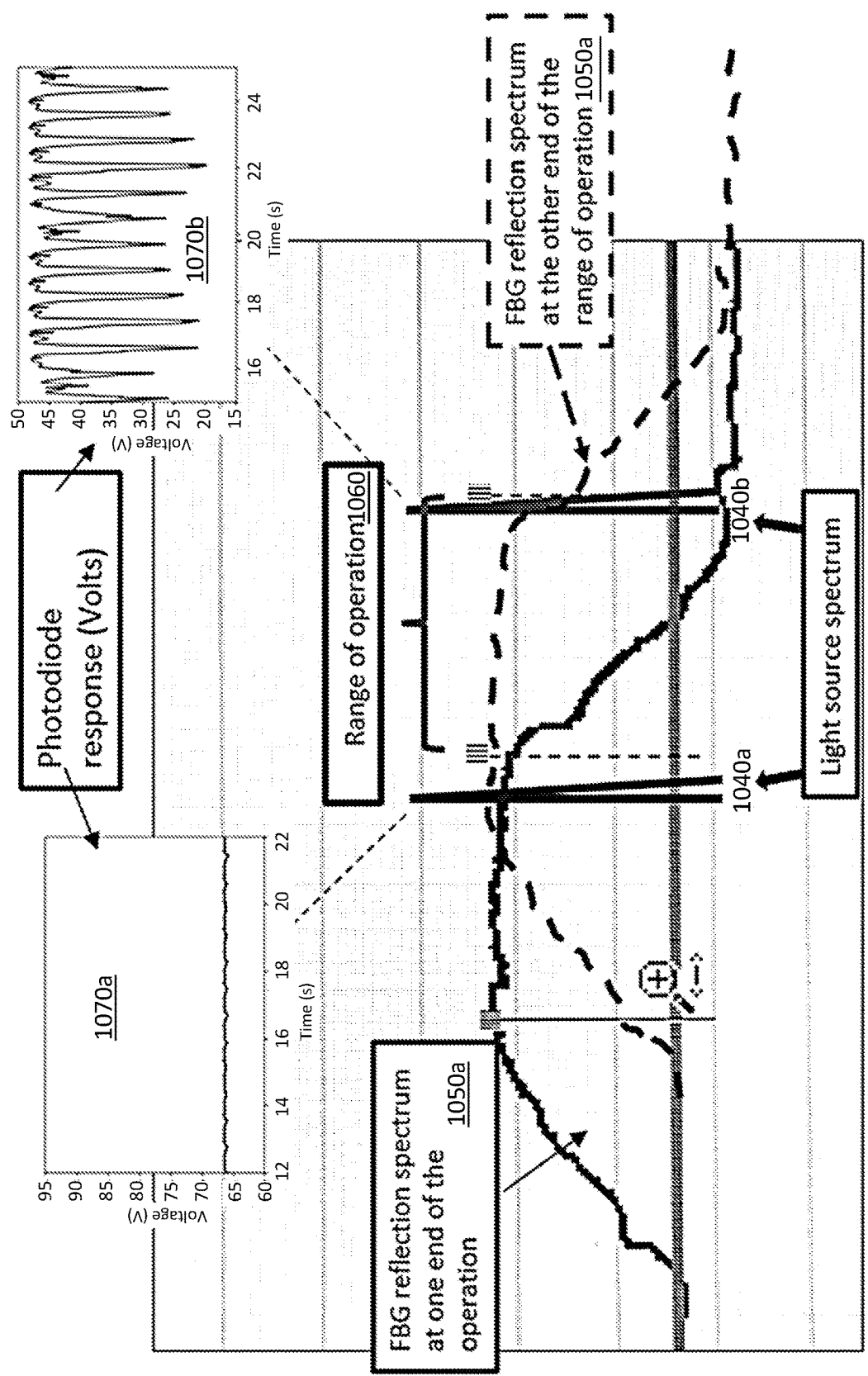
FIG. 10 illustrates exemplary interactions between a reflected spectrum of a FBG sensor and transmitted spectrum of two light sources.

FIG. 10 illustrates example interactions between a reflected spectrum of a FBG sensor (e.g., FBG sensor(s) 106 in FIG. 1) and transmitted spectrum of two light sources (e.g., light source(s) 102 in FIG. 1). The light sources can be any suitable light source, such as for example, a light source with narrow bandwidth. The reflected spectrum 1050a may represent the reflected spectrum at one end of the range of operation of the FBG sensor. As the FBG sensor is exposed to a change in physical signal (e.g., strain), the reflected spectrum 1050a of the FBG sensor may be shifted. For instance, the reflected spectrum 1050a' may represent a shift in reflected spectrum 1050a when the FBG sensor is exposed to a change in the physical signal. Accordingly, as an example, reflected spectrum 1050a' may represent the reflected spectrum at the other end of the range of operation of the FBG sensor. The range of operation of the FBG sensor is shown as 1060.

The transmitted spectrum 1040a may represent a transmitted spectrum of a first light source. As seen in FIG. 10, the transmitted spectrum 1040a of the first light source may be outside the range of operation of the FBG sensor 1060. The output or the power of the reflected optical signal of the interaction between transmitted spectrum 1040a and reflected spectrum 1050a is represented as 1070a. As seen in FIG. 10, since the transmitted spectrum 1040a is outside the range of operation 1060 of the reflected spectrum 1050a, the changes to the physical signal may not be detected from the output or the power of the reflected optical signal 1070a of the FBG interrogation system.

In contrast, the transmitted spectrum 1040b may represent a transmitted spectrum of a second light source different from the first light source. As seen in FIG. 10, the transmitted spectrum 1040b of the second light source is within the range of operation 1060 of the FBG sensor. Furthermore, the transmitted spectrum 1040b of the second light source interact with the reflected spectrum 1050a' of the FBG sensor over a portion of the discriminating spectral domain of the reflected spectrum 1050a' of the FBG sensor. For example, the transmitted spectrum 1040b of the second light source interacts with the reflected spectrum 1050a' of the FBG sensor such that the power of the reflected optical signal changes monotonically in response to a wavelength shift in the reflected spectrum 1050a'. Therefore, the output or the power of the reflected optical signal 1070b of such interaction may be sensitive to changes in the physical signal.

The representative data in FIG. 10 was derived from a typical in vivo experiment in pigs where the FBG sensor was incorporated in an ICD lead that was inserted in the right ventricle. The output or the power of the reflected optical signal is indicative of the contractions and relaxations during the cardiac cycles at a low measurement frequency and relatively large strain changes.

Figure 6A:
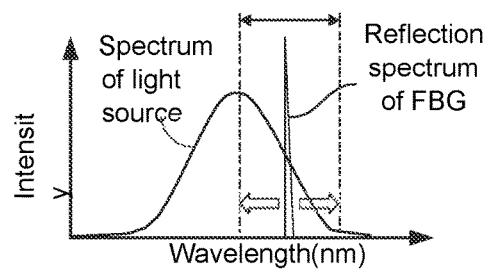
FIGS. 6A-6E illustrate interaction between exemplary transmitted spectrum of light sources and exemplary reflected spectrum of FBG sensors over discriminating spectral domains.
Figure 6B:
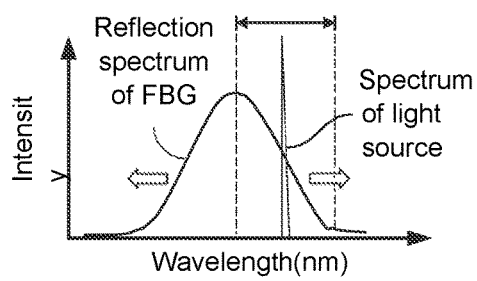
Figure 6C:
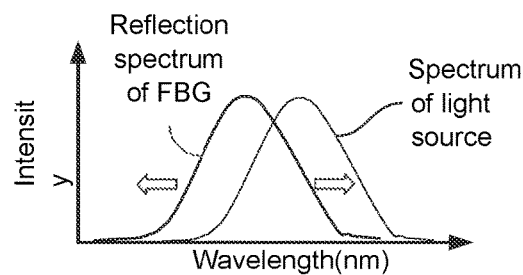

FIGS. 6A-6E illustrate interactions between exemplary transmitted spectrum of light sources (e.g., light source(s) 102 in FIG. 1) and exemplary reflected spectrum of FBG sensors (e.g., FBG sensor(s) 106 in FIG. 1) over discriminating spectral domains. In FIG. 6A, the reflected spectrum of the FBG sensor is narrow. For example, the FBG sensor may be a standard FBG sensor with standard gratings (e.g., type IA) and a narrowband reflected spectrum. The range of operation of the FBG sensor may be determined based on the possible values for the physical signal (e.g., possible values for strain in the heart, possible values for mechanical movement of the heart, etc.) that the FBG sensor is configured to sense. In FIG. 6A, the light source may be a LED light source. The LED light source and the standard FBG sensor may be designed to interact over a discriminating spectral domain. For example, in FIG. 6A, the discriminating spectral domain may be defined by the downward slope of the transmitted spectrum of the LED light source. The transmitted spectrum of the LED light source and the reflected spectrum of the FBG sensor may be configured to interact over the discriminating spectral domain. Since the portion of the downward slope of the transmitted spectrum defining the discriminating spectral domain is overall monotonic, a change in the physical signal sensed by the FBG sensor may be quantitively reflected by a corresponding change in the power of the reflected optical signal.

In FIG. 6B, the reflected spectrum of the FBG sensor is wide. For example, the FBG sensor may be a modified chirped FBG sensor. The light source may be narrowband light source such as a distributed feedback diode (DFB). The DFB and/or the chirped FBG sensor may be designed to interact over a discriminating spectral domain. In FIG. 6B, the discriminating spectral domain may be defined by the downward slope of the reflected spectrum of the modified chirped FBG. Since a portion of the downward slope of the reflected spectrum defining the discriminating spectral domain is overall monotonic, a change in the physical signal sensed by the FBG sensor may be quantitively reflected by a corresponding change in the power of the reflected optical signal.

In FIG. 6C, the reflected spectrum of the FBG sensor is wide. For instance, the FBG sensor may be a modified chirped FBG sensor. However, unlike FIG. 6B, the light source in FIG. 6C may be a light source such as LED with a broader transmitted spectrum. In FIG. 6C, a discriminating spectral domain may exist in both the upward or downward slope of the reflected spectrum of the FBG sensor and of the transmitted spectral segment of the light source such that a wavelength shift in the reflected spectrum of the FBG sensor may result in the interaction between the transmitted spectrum of the light source and the reflected spectrum of the FBG sensor over two discriminating domains, thereby increasing the total discriminating spectral domain width and the sensitivity of the EBG interrogation system in response to a change in the physical signal sensed by the FBG sensor.

Figure 6D:
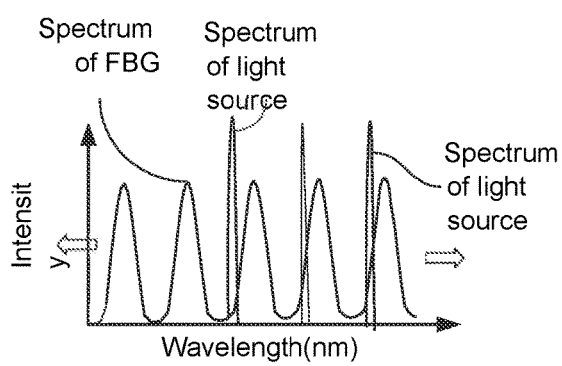

As discussed herein, the FBG interrogation system may include multiple FBG sensors. These multiple FBG sensors may be formed on a single optical fiber. This may save space and make the FBG interrogation system less bulky, thereby miniaturizing the FBG interrogation system for integration into implantable medical devices while preserving the capacity to sense multiple physical signals and/or the ability to sense physical signals at multiple locations. The transmitted spectrum of the light source may be configured to interact with each individual reflected spectrum of the multiple FBG sensors. FIG. 6D illustrates the collective reflected spectra of multiple FBG sensors multiplexed on a single optical fiber. The light source may be a narrowband light source. The transmitted spectrum of the light source may be configured to interact with a reflected spectrum of a specific FBG sensor over a discriminating spectral domain. In some variations, the FBG interrogation system may include multiple such light sources each interacting with a different FBG sensor. In some variations, a small fiber optic switch may be included in the FBG interrogation system to toggle between/among the light sources so that only one light source may be active at a time.

Figure 6E:
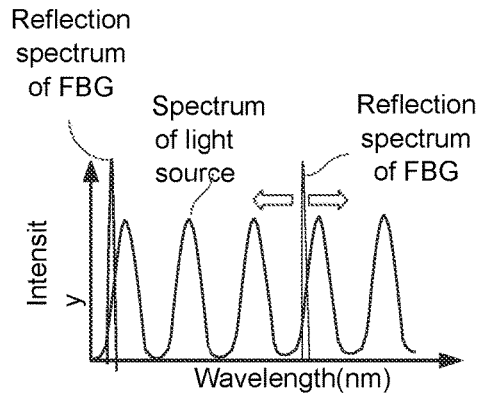

FIG. 6E illustrates a transmitted spectrum of a light source split into multiple spectral segments. Each spectral segment may be configured to interact with a respective reflected spectrum of a FBG sensor. In some variations, a light source with a single spectral segment in its transmitted spectrum may be coupled to a conditioning FBG to generate multiple spectral segments. The light source may be optically coupled to at least one conditioning FBG to split the transmitted spectrum of the light source into at least two spectral segments, each designed to interact with a respective FBG sensor.

Photodetector

In variations in which the miniaturized FBG interrogation system 100 includes more than one FBG sensor (e.g., FBG sensor(s) 106 in FIG. 1) on a single optical fiber, the photodetector (e.g., photodetector(s) 104) may be designed such that the change in physical signal sensed by each FBG sensor on the single optical fiber is acquired and measured. For example, the photodetectors may be designed such that there may be more than one photodetector with each photodetector being coupled to a respective FBG sensor. To receive the reflected optical spectra from each FBG sensor, wavelength division multiplexing (WDM) may be applied to the photodetectors. Applying WDM to couple the photodetectors to the FBG sensors may allow each of the photodetectors to receive the reflected optical signal from its respective FBG sensor in response to a physical signal sensed by the respective FBG sensor.

Power Management Unit

In some variations, the power management unit (PMU) 109 may include at least one or more switches (e.g., ultrafast switches) and at least one or more power regulation circuits. As discussed above, the power supply to the light source(s) and/or the powered components may be enabled and/or disabled via the switch(es) (e.g., 1208 in FIG. 12A) and the amount(s) of power transmitted to the light source(s) and/or the powered components may be adjusted (e.g., increased or decreased) via the power regulation circuit(s) (e.g., 1206 in FIG. 12A). In some variations, the power regulation circuit(s) and the switch(es) may be packaged together as a single unit and may be integrated into the FBG interrogation system 100. Additionally or alternatively, the at least one or more power regulation circuit(s) and the at least one or more switch(es) may be integrated into the FBG interrogation system 100 separately as individual units. In some variations, the one or more switch(es) may be coupled to one or more light source(s) and/or powered component(s) and integrated into the FBG interrogation system 100, structurally or physically, together with the lights(s) and/or powered components that the one or more switch(es) are coupled to. In a similar manner, the at least one or more power regulation circuit(s) may be coupled to one or more light source(s) and/or powered component(s) and integrated into the FBG interrogation system 100, structurally or physically, together with the light source(s) and/or powered components that the one or more power regulation circuit(s) are coupled to. In some variations, the switch(es) and the power regulation circuit(s) may be designed in other structural or physical arrangements such that the physical size of the FBG interrogation system 100 is reduced, the power consumed by the FBG interrogation system 100 is minimized, and/or the heat generated from the FBG interrogation system 100 is diminished.

In some variations, the switch(es) in the PMU 109 may include at least one or more ultrafast power switches to enable and disable the power transmitted to the light source(s) 102 and/or the powered component(s) in the FBG interrogation system 100. In some variations, the switch(es) may comprise off-chip off-the-shelf circuit components, such as for example, ADG901, ADG918 by Analog Device®. In some variations, the switch(es) may comprise custom-designed onboard switching circuits consisting of one or more packaged transistors, such as for example, complementary metal-oxide-semiconductor (CMOS) transistors, bipolar junction transistors (BJT), and Gallium Nitride (GaN) transistors. In some variations, the switch(es) may comprise custom-designed on-chip circuits based on CMOS, BJT, and GaN on-chip technologies, etc. The design of the on-chip switch may include one or more transistors, one or more on-chip resistors, and/or other logic circuits to achieve improved switching performance. In some variations, each mode of power management described herein may have a dedicated power switch, respectively. In some other variations, the one or more switch(es) may be used for more than one mode of the power management.

It is to be understood that the physical arrangement or sequence between the switch(s) 1208 and the power regulation circuits 1206 may vary. In some variations, the switch may be disposed before the power regulation circuit for one light source or for one powered component. In some variations, the power regulation circuit may be disposed before the switch for another light source or for another powered component.

In some variations, the PMU 109 may include at least one or more clock generation circuits to control the timing of the switch(es), individually or collectively. In some variations, the clock generation circuit may be used to control the switch(es) for pulse mode. In some variations, the clock generation circuit may also be used to control the sampling rate or frequency of one or more powered components in the FBG interrogation system 100 for the one or more modes (e.g., for the adaptive power mode) of power management mode. The clock generation circuit may be realized with various circuit components such as phase lock loop (PLL) and voltage control oscillator (VCO), and delay-lock-loop (DLL), and/or the like. In some variations, the clock frequency may need to be changed in the one or more modes (e.g., for the pulsed or adaptive power mode) of power management mode. In some variations, the clock frequency may be identical or different for among modes (e.g., for the pulsed or adaptive power mode) of power management mode. The frequency may be changed by tuning the circuit parameters that include, but are not limited to, voltage, current, Inductance, and capacitance. In some variations, the clock generation circuit may also include one or more other associated circuits, such as a Johnson counter and a phase interpolator, to change the phase and/or the duty cycle of the clock output(s). In some variations, the clock circuit(s) in the processor(s) (e.g., processor 112 in FIG. 1) coupled to the PMU 109 may be used instead.

In some variations, the PMU 109 may include at least one or more programmable power regulation circuits to regulate the amount(s) of power transmitted to the light source and/or one or more powered components in the FBG interrogation system 100 in the adaptive power management mode as described herein. It may include, as nonlimiting examples, on-chip/off-chip AC (Alternating Current)-DC (Direct Current) converter, DC (Direct Current)-DC (Direct Current) converter, or Linear and low-dropout (LDO) regulators. In some variations, the voltage and/or current may be controlled by an associated on-chip/off-chip programmable voltage or current converter, digital to analog converter (DAC) that may include, as nonlimiting examples, on-chip/off-chip switched-resistor DAC, switched-capacitor DAC, and/or switched-current source array(s).

In some variations, the PMU 109 may include one or more processors to actuate the switch(es) and the power regulation circuit(s). In some variations, the PMU 109 may be coupled to one or more processors (e.g., processor 112 in FIG. 1) to actuate the switch(es) and the power regulation circuit(s).

Processor

Referring back to FIG. 1, the miniaturized FBG interrogation system 100 may be communicatively and/or operably coupled to a processor 112. The processor 112 (e.g., central processor unit, CPU, or microprocessor unit, MPU) described herein may process data and/or other signals to control one or more components of the miniaturized FBG interrogation system 100. The processor 112 may be configured to receive, process, compile, compute, store, access, read, write, and/or transmit data and/or other signals. In some variations, the processor 112 may be configured to access or receive data and/or other signals from the FBG sensor(s) 106 and/or the photodetector 104 and a storage medium (e.g., memory, flash drive, memory card). The processor 112 may be configured to run and/or execute application processes and/or other modules, processes and/or functions associated with the miniaturized FBG interrogation system 100.

In some variations, the processor 112 may be communicatively coupled (e.g., wired or wirelessly) to a user interface. For example, the user interface may be a display on the processor 112 itself. In some variations, the user interface may be a display on any suitable computing device (e.g., computer, smartphone, tablets, etc.) communicatively coupled to the processor 112. The user interface may comprise an input device (e.g., touch screen, keyboard, or voice activated input device) and output device (e.g., display device) and be configured to receive inputs from a user. In some variations, an input device may comprise a touch surface for a user to provide input (e.g., finger contact to the touch surface) to the miniaturized FBG interrogation system 100.

In variations in which the miniaturized FBG interrogation system 100 is integrated into an implantable medical device, the processor 112 may be internal and/or external to the implantable medical device. The processor may include instructions to automatically switch the miniaturized FBG interrogation system 100 from a power-off state to a power-on state via the power management unit 109. In the power-off state, the FBG interrogation system 100 may be dormant. For example, the light source(s) 102 and/or the powered components in the FBG interrogation system 100 may be switched off. Additionally or alternatively, the FBG interrogation system 100 may not acquire, measure, and/or sense physical signals in the power-off state. In the power-on state, the FBG interrogation system may be operational. For example, the light source(s) 102 and/or the powered components in the FBG interrogation system 100 may be switched on. Additionally, the FBG interrogation system 100 may be configured to sense, measure, and/or acquire physical signals in the power-on state.

The processor 112 may be configured to switch the FBG interrogation system 100 from a power-off state to a power-on state and then back to a power-off state based on a mode of power management of the FBG interrogation system 100 via the PMU 109. For example, the mode of power management may be such that the power consumption of the FBG interrogation system 100 may be minimized. That is, the processor 112 may be configured to manage power of the FBG interrogation system 100 via the PMU 109 based on the mode(s) of power management. In some variations, the processor 112 may be configured to operate the FBG interrogation system 100 continuously (i.e., continuous mode). In some variations, when the FBG interrogation system 100 is in the power-off state, the light source(s) 102 and/or the powered components of the FBG interrogation system 100 may be switched off (e.g., switched off by the processor 112 through PMU 109). The FBG interrogation system 100 may not acquire or measure physical signals that the FBG sensor(s) 106 is configured to sense in the power-off state. That is, the FBG interrogation system 100 may be in dormant state in the power-off state. In the power-on state, the light source(s) 102 and/or the powered components of the FBG interrogation system 100 may be switched on (e.g., switched on by the processor 112 via the PMU 109). The FBG interrogation system may acquire and measure physical signals that the FBG sensor(s) 106 is configured to sense in the power-on state. That is, the FBG interrogation system 100 may be in the active state in the power-on state. In some variations, the processor 112 may be configured to operate the FBG interrogation system 100 via the PMU 109 in at least five modes to minimize and/or manage power consumption such as a continuous mode, an event-trigger mode, an event-gated mode, a pulse width modulation mode and an adaptive power mode of power management. In the continuous mode, the processor 112 may be configured to operate the FBG interrogation system 100 continuously.

In the event-trigger mode, the processor 112 may be configured to trigger the power-on state upon detection of a physical event, at preprogrammed intervals, and/or upon a request from a user. For example, in the event-trigger mode of power management, the processor 112 may be configured to automatically trigger the power-on state in response to a triggering physical event (e.g., detection of tachyarrhythmia, heart failure, ischemia, etc.) in a subject. The triggering physical event may be detected by the implantable medical device (e.g., with electrodes and/or other sensor(s) in the implantable medical device monitoring the subject) and/or by other devices that may be communicatively coupled to the implantable medical device (e.g., remote monitoring platforms that remotely monitor pulmonary artery pressure, wearable devices, etc.). For instance, the processor 112 may receive electrocardiogramaignals (e.g., from one or more electrodes disposed in the subject) from a subject. The processor 112 may analyze these ECG signals. If the processor 112 identifies arrhythmia such as tachyarrhythmia based on the analysis, the processor may automatically trigger the power-on state for the miniaturized FBG interrogation system 100 via the PMU 109 to enable the assessment of the hemodynamic status of a subject through the data recorded from the miniaturized FBG interrogation system. For example, the miniaturized FBG interrogation system may be powered on when the analysis of ECG signals (e.g., by the processor 112) indicates the possibility of abnormally increased heart rate (tachyarrhythmia) and perform analysis of FBG parameters that are indicative of the mechanical movement of the heart, such as myocardial strain of the ventricles, to assess hemodynamic status of the subject. If the analysis of such parameters indicates that the value or values of the FBG parameters may be reaching a threshold value and/or a threshold range, the hemodynamic status may be deemed unstable. In response to detecting that the hemodynamic status is unstable, the processor 112 may automatically command the implantable medical device to perform further diagnostic tasks and/or therapeutic intervention such as cardiac pacing and cardioversion/defibrillation or, additionally or alternatively, the processor 112 may alert the subject by audible warning and/or vibration and by telemetry to summon professional help including that of emergency medical services. Additionally or alternatively, the processor 112 may include instructions to automatically switch on or off one or more of the other components (e.g., powered components associated with the photodetector) via the PMU 109 in the miniaturized FBG interrogation system 100 in a similar manner to reduce power consumption.

In some variations, the processor 112 may be configured to analyze intrathoracic or pulmonary impedance measurements received from the subject. Intrathoracic or pulmonary impedance measurements that reach a threshold value and/or a threshold range may be indicative of a worsening heart condition (e.g., heart failure). In response to detecting a worsening heart failure, the processor 112 may automatically trigger the power-on mode for the miniaturized FBG interrogation system 100 via the PMU 109. Additionally or alternatively, the processor 112 may be configured to analyze pulmonary artery pressure that reflects the left atrium. In response to detecting that the pulmonary artery pressure is above a threshold value and/or a threshold range which may be indicative of worsening heart condition (e.g., heart failure), the processor 112 may automatically trigger the power-on state for the miniaturized FBG interrogation system 100 via the PMU 109. In some variations, the processor 112 may be configured to detect ischemia which may be reflected in abnormalities in strain parameter during diastole and/or systole. In other variations, the subject or a user or may notify the processor 112 (e.g., via a user interface) that the FBG interrogation system 100 is to be activated (e.g., when the subject is experiencing pain in the chest or shortness of breath or syncope or when the user determines such activations is likewise indicated). In response to such notification, the processor 112 may trigger the power-on state for the miniaturized FBG interrogation system 100 via the PMU 109.

In some variations, in the event-trigger mode, the processor 112 may automatically trigger the power-on state for the miniaturized FBG interrogation system 100 at preprogrammed interrogation intervals via the PMU 109. For instance, the processor 112 may include instructions to automatically trigger the power-on state at specific interrogation intervals via the PMU 109. As a nonlimiting example, the power-on state may be automatically triggered one or more times a day or week to monitor the hemodynamic status in a subject. As yet another nonlimiting example, the power-on state may be automatically triggered one or more times a month or several months to monitor the hemodynamic status in a subject and/or to monitor the functional status of the miniaturized FBG interrogation system. In some variations, the processor 112 may be configured to trigger the power-on state based on a request from the user (e.g., via a user interface that may be operated wirelessly through telemetry or Bluetooth as nonlimiting examples) via the PMU 109.

In some variations, some physical events may occur at recurring intervals. Recurring physical events that occur at recurring intervals may be detected by the processor 112 by analyzing additional physical signal(s) (e.g., triggering physical signals). For example, the processor 112 may be configured to regulate the power-on and power-off states of the miniaturized FBG interrogation system by analyzing electrocardiogramals representative of cardiac electrical activity, signals representative of transthoracic and/or intrathoracic/pulmonary impedance measurements, signals representative of pulmonary or systemic artery pulse measurements, a combination thereof, and/or the like. In response to detecting the recurring events, the processor 112 may operate the miniaturized FBG interrogation system 100 in event-gated mode of power management via the PMU 109. In the event-gated mode, the processor 112 may rapidly switch the miniaturized FBG interrogation system 100 from a power-off state to a power-on state at specific time instance(s) (e.g., gating points) during a cycle of the recurring event and back to a power-off state after a short period of time or operating period that may be preset or dynamically determined via PMU 109. This operating period may be hours or a fraction of an hour, minutes or a fraction of a minute, seconds or a fraction of a second, milliseconds or a fraction of a millisecond, microseconds or a fraction of microsecond, etc. For example, the processor 112 may analyze signals (e.g., triggering physical signals) that are representative of physiologic conditions of the subject (e.g., ECG signals, transthoracic and/or intrathoracic impedance signals, etc.) and detect a cardiac cycle and/or a respiratory cycle. In some variations, the processor 112 may transition the miniaturized FBG interrogation system 100 from a power-off state to a power-on state at end-systole and/or end-diastole of a cardiac cycle via the PMU 109. The processor 112 may then transition the miniaturized FBG interrogation system 100 from the power-on state back to the power-off state after a preset or dynamically determined operating period as described above via the PMU. In a similar manner, the processor may transition the miniaturized FBG interrogation system 100 from a power-off state to a power-on state at end-inspiration and/or end-expiration of a respiratory cycle. The processor 112 may then transition the miniaturized FBG interrogation system 100 from the power-on state back to the power-off state after a preset or dynamically determined operating period (e.g., for 3 cardiac cycles).

In some variations, the miniaturized FBG interrogation system 100 may be configured to operate in the pulse width modulation mode. In the pulse width modulation mode, the processor 112 may be configured to enable and disable the power transmitted to the light source(s) 102 and/or the powered components (e.g., powered components associated with the photodetector(s) 104, etc.) of the miniaturized FBG interrogation system 100 via the PMU 109 in discrete pulses at ultra-high frequencies such that the power consumption of the FBG interrogation system may be further minimized. For example, the light source(s) 102 in the miniaturized interrogation system 100 may be a pulsed light source. The power delivered to the light source may be such that the processor 112 may transition the light source(s) 102 from a power-off state to the power-on state in a discrete manner at ultra-high frequencies via the PMU 109. For example, the discrete pulses of power may be represented in the form of a duty cycle (e.g., 50% duty cycle 992, 75% duty cycle 994, and 25% duty cycle 996 in FIG. 9) indicative of the proportion or percentage of time that the light source(s) 102 is to be switched on over the duration of the duty cycle which is the sum of the time that the light source(s) 102 is to be switched on and the time that the light source(s) 102 is to be switched off during a duty cycle.

In some variations, the miniaturized FBG interrogation system 100 may be configured to operate in the adaptive power mode. In the adaptive power mode, the processor 112 may be configured to analyze the output amplitude (that is highly correlated with the amplitude of the physical signal sensed by the FBG sensor(s) 106) of the photodetector 104 and adjust or regulate the amount(s) of power transmitted to the light source 102 and/or the powered components via the PMU 109 to optimize the power consumption of the FBG interrogation system. For example, the processor 112 may be configured to reduce the amount(s) of power transmitted to the light source 102 and/or the powered components via the PMU 109 if the analysis of output amplitude from the photodetector 104 exceeds a detection threshold. Conversely, the processor 112 may be configured to increase the amount(s) of power transmitted to the light source 102 and/or the powered components via the PMU 109 if the analysis of the output amplitude from the photodetector falls below a sensitivity threshold.

It should be readily understood that the miniaturized FBG interrogation system 100 may be configured to operate in the event-trigger mode, the event-gated mode, the pulse width modulation mode or the adaptive power mode independently or simultaneously. For example, the processor 112 may be configured to transition the miniaturized FBG interrogation system 100 from a power-off state to a power-on state (e.g., by switching on the light source(s) 102) in response to detecting tachycardia. For instance, in response to determining that a heart rate of a subject has exceed 150 per minute, the processor may detect the tachycardia. The processor 112 may then transition the miniaturized FBG interrogation system 100 from the power-off state to the power-on state. The miniaturized FBG interrogation system 100 may therefore operate in the event-trigger mode. Additionally, the processor 112 may cause this transition only during the end-systole and the end-diastole of a regular cardiac cycle for a short gating period of (e.g., about 50 milliseconds or about 100 milliseconds) because the cardiac cycle is a recurring event. Therefore, once the processor 112 detects the tachycardia, the processor 112 may transition the miniaturized FBG interrogation system 100 from the power-off state to a power-on state during the end-systole and the end-diastole of the cardiac cycle of the subject for a short operating period of about 50 milliseconds as a nonlimiting example. The miniaturized FBG interrogation system 100 may therefore simultaneously operate in the event-triggered and event-gated modes. Additionally, during the power-on state of the FBG interrogation system 100, the processor 112 may deliver power to the light source(s) 102 in the form of discrete pulses with a duty cycle of 75 percent. Additionally, the amount(s) of the power (e.g., in the form of current to the light source) transmitted to the light source(s) 102 and/or the powered components of the FBG interrogation system may be adaptively adjusted to balance between the power consumption and the sensitivity/accuracy of the FBG interrogation system as described herein above. The miniaturized FBG interrogation system 100 may therefore simultaneously operate in event-triggered mode, event-gated mode, the pulse width modulation mode and the adaptive power mode. Similarly, the miniaturized FBG interrogation system 100 may be configured to operate simultaneously in the continuous mode, event-gated mode, pulsed width modulation mode and the adaptive power mode or in a combination of the modes thereof. In some variations, only the continuous mode and the event-triggered mode may be mutually exclusive and may not be operative simultaneously. In some variations, the continuous mode and the event triggered mode may be operative sequentially. The utilization of these modes of power management may effectively and significantly reduce power consumption by the miniaturized FBG interrogation system.

The modes of power management to manage, to minimize or to optimize power consumption described herein are non-limiting examples. The miniaturized FBG interrogation system 100 may be configured to operate in other suitable modes. Additionally or alternatively, the modes of power management described herein may also be implemented to control the power to the various components of the miniaturized FBG interrogation system 100 (not just the light source). In addition, it is understood that the modes of power management described herein above may be used to manage, minimize, or optimize power consumption of system(s)

or device(s) with optical sensors (FBG sensors or non-FBG optical sensors) other than the miniaturized FBG interrogation system described herein.

In some variations, temperature changes associated with the operation of an implantable medical device should be below a certain threshold (e.g., less than 0.02-0.03 degree Celsius) to eliminate not only damage to biological tissues and/or the implantable medical device but also subjective discomfort of the subject. The FBG interrogation system 100 described herein may generate minimum heat due to the modes of power management and, optionally, the utilization of narrowband light source(s), thereby preventing the temperature surrounding the FBG interrogation system 100 from rising significantly.

In this manner, the miniaturized FBG interrogation system 100 may be operational and switched-on only in response to a physical event, during preprogrammed interrogation intervals, in response to requests from a user, and/or may be gated to recurring events. Accordingly, the light source(s) 102 and/or the powered components of the FBG interrogation system are switched on only when necessary. Additionally, with the adaptive power mode, the power consumption may be further optimized. This may reduce power consumption and extend the life of the implantable medical device that is typically battery-powered. The modes of power management to manage, to minimize or to optimize power consumption may increase the durability or life span of the implantable medical device with which a miniaturized FBG interrogation system 100 may be integrated into. In some variations, such implantable medical devices (e.g., battery powered implantable medical device) may have a lifetime of at least 5 or at least 10 years. Additionally, with minimized power consumption, the heat generated by the light source(s) 102 may be diminished(since they are switched on only when necessary) to avoid adversely affecting the surrounding tissues and organs where the miniaturized FBG interrogation system is implanted or causing discomfort of the subject or to adversely affecting the implanted medical device itself.

Methods

Figure 7:
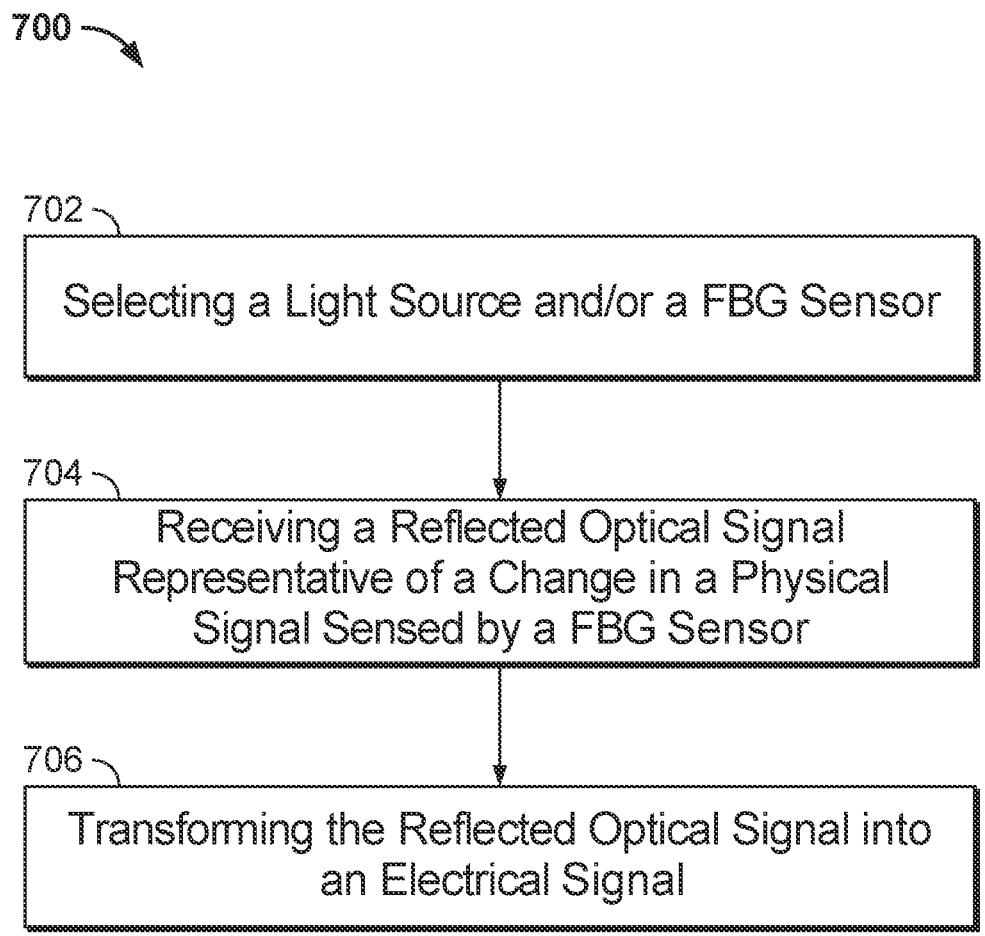
FIG. 7 is a flow chart illustrating an exemplary method of miniaturizing an FBG interrogation system.

Methods employing or relating to the FBG Interrogation systems are also described herein. Referring to FIG. 7, a flow chart illustrating an exemplary method 700 of miniaturizing a FBG interrogation system (e.g., structurally and/or functionally similar to FBG interrogation system 100 in FIG. 1) is shown. The method 700 may include at 702 selecting a light source (e.g., structurally and/or functionally similar to light source(s) 102 in FIG. 1) and/or a FBG sensor (e.g., structurally and/or functionally similar to FBG sensor(s) 106 in FIG. 1). In some variations, selecting a light source and/or a FBG sensor may include determining a range of operation for the FBG sensor. Selecting a light source and/or a FBG sensor may include identifying a discriminating spectral domain (e.g., discriminating spectral domain 440a* in FIG. 4) defined in a transmitted spectrum of the light source and/or a reflected spectrum of the FBG sensor with at least a width that may cover or be conformed to the range of operation of the FBG sensor. In some variations, selecting a light source and/or a FBG sensor may include configuring the transmitted spectrum of the light source and the reflected spectrum of the FBG sensor to interact over a discriminating spectral domain where the power of the reflected optical signal from the FBG sensor is a monotonic function of the shift in its wavelength spectrum.

In some variations, selecting the light source may include optimizing the light source either during the pre-emission fabrication (e.g., by varying the composition of dopants such as varying arsenic and/or phosphorous compositions for infrared emitters, by varying the composition of indium for blue/green emitters) or through post-emission modification (e.g., by including wavelength filters such as dye, pigment, or wavelength conversion materials such as phosphor or by conditioning FBG(s)) of the light source such that the transmitted spectrum of the light source and the reflected spectrum of the FBG sensor interact over the discriminating spectral domain.

In some variations, selecting the FBG sensor may include varying a grating period of the FBG sensor, varying a number of gratings of a given grating period of the FBG sensor, varying a pattern of distribution of gratings with different grating period along the core of the optical fiber of the FBG sensor, varying a tilt or an angle of the grating planes, changing a time of exposure to ultraviolet light during the inscription of the gratings on the optical fiber, changing the chemical composition of the core of the optical fiber so as to change the refractive index, introducing a gradient in the refractive index of the core of the optical fiber (e.g., by varying the tilt or angle of grating planes and/or changing a time exposure to ultraviolet light), a combination thereof, and/or the like such that the discriminating spectral domain has at least a width that may cover or be conformed to the entire range of operation of the FBG sensor. In some variations, selecting the FBG sensor may include selecting a non-uniform FBG sensor. In some variations, selecting the FBG sensor may include selecting a chirped FBG sensor.

In some variations, the method may also include splitting a transmitted spectrum of the light source into multiple spectral segments. For instance, coupling one or more conditioning FBGs (e.g., conditioning FBG 110 in FIG. 1) to the light source may result in splitting the transmitted spectrum of the light source into multiple spectral segments. One or more spectral segments of the multiple spectral segments may each be conformed to interact with a respective FBG sensor over the operating range of that FBG sensor.

In some variations, the method 700 may include operating the miniaturized FBG interrogation system continuously. In some variations, the method 700 may include automatically triggering a power-on state based on the modes of operation for power management (e.g., to minimize and/or manage power consumption) of the miniaturized FBG interrogation system. For instance, in an event-trigger mode, the method 700 may include automatically triggering the power-on state based on a physical event. The physical event may be determined based at least in part on a physical signal (e.g., triggered physical signal) representative of a physical condition. For example, the FBG interrogation system may be integrated into an implantable device. The method may include receiving ECG signals at the implantable device from a subject and assessing the presence of a tachyarrhythmia (the physical event). In response to detecting a tachyarrhythmia, the method may include automatically switching on the light source and/or the powered components of the miniaturized FBG interrogation system to assess hemodynamic status of the subject. In some variations, in the event-trigger mode, the method 700 may include automatically triggering a power-on state at preprogrammed intervals. In some variations, in the event-trigger mode, the method 700 may include automatically triggering a power-on state in response to a request (e.g., interrogation request) from a user. In some variations, in the event-gated mode, the method 700 may include automatically triggering the power-on state at specific time points or period(s) during a recurring physical event. Additionally, the method 700 may include switching the power-on state to a power-off state after a certain time period. In some variations, the method 700 may include transmitting a pulsed power to the light source and/or the powered components of the miniaturized FBG interrogation system. In some variations, the method 700 may include adaptively adjusting the amount(s) of power transmitted to the light source(s) and/or the powered component(s) via the PMU to optimize the power consumption of the FBG interrogation system 100.

Powering on and/or turning on the light source may cause the light source to transmit an optical signal to the FBG sensor. At 704, the method may include receiving from the FBG sensor a reflected optical signal representative of a change in a physical signal sensed by the FBG sensor. At 706, the method may include transforming the reflected optical signal into an electrical signal. A measurement of the electrical signal may be indicative of a change in the physical signal. In some variations when the miniaturized FBG interrogation system may be integrated into an implantable medical device such as an ICD, the method 700 may include issuing commands or instructions to illicit and/or regulate the response of an implantable medical device to perform diagnostic and/or therapeutic functions such as pacing and cardioversion/defibrillation.

Integrating Miniaturized FBG Interrogation System into Implantable Medical Devices Since the FBG interrogation system (e.g., FBG interrogation system 100 in FIG. 1) described herein may sense and measure a physical signal of lower measurement frequency without bulky optical components such as optical Fabry-Perot interferometer, the size of the FBG interrogation system may be significantly reduced. Additionally, the light source and/or the FBG sensors may be small in size and in volume with optoelectrical co-packaging techniques. Therefore, the miniaturized FBG interrogation system may be integrated into a small-sized device. Described herein as a non-limiting example is the integration of the miniaturized FBG interrogation system into an implantable medical device such as implantable pacemaker (IPM), cardioverter/defibrillator (ICD), implantable cardiac monitors (ICM), etc. In the implantable medical device, the miniaturized FBG interrogation system may be configured to assess a physical signal, such as strain, pressure, temperature, etc. The physical signal may be indicative of a physiological and/or pathophysiological status of a subject. For example, the physical signal may be indicative of a hemodynamic status of a subject. For instance, an end diastolic strain of the ventricle may be indicative of the end diastolic volume of the ventricle. Similarly, an end systolic strain of the ventricle may be indicative of the end systolic volume of the ventricle. In some variations, the difference between the end diastolic strain and the end systolic strain may be indicative of a stroke volume (FIG. 12E). In some variations, a rate of change of strain during systole may be indicative of the rate of contraction or the systolic function of the ventricle. Similarly, a rate of change of strain during diastole may be indicative of the rate of relaxation or the diastolic function of the ventricle. The hemodynamic status of the subject may be determined during various conditions such as rest, sleep, ambulation, exercise, cardiac arrhythmias, heart failure (e.g., systolic, diastolic), myocardial ischemia, etc. Additionally, the miniaturized FBG interrogation system may be configured to reduce and/or minimize power consumption. This is important due to limited supply of power in implantable medical devices. Furthermore, the miniaturized FBG interrogation system may be configured to minimize the heat generated from the implantable medical device (e.g., with reduced power consumption and narrowband light source). Heat above a certain threshold may have adverse effects on the subject (e.g., damage to neighboring tissues and muscles or discomfort) and/or on the implantable medical device.

Determining the physiological and/or pathophysiological status of a subject with the FBG interrogation system may help cause and/or regulate a response of the implantable medical device, alert medical professionals involved in the care of the subject, prompt timely medical diagnosis and treatment, etc.

Figure 8:
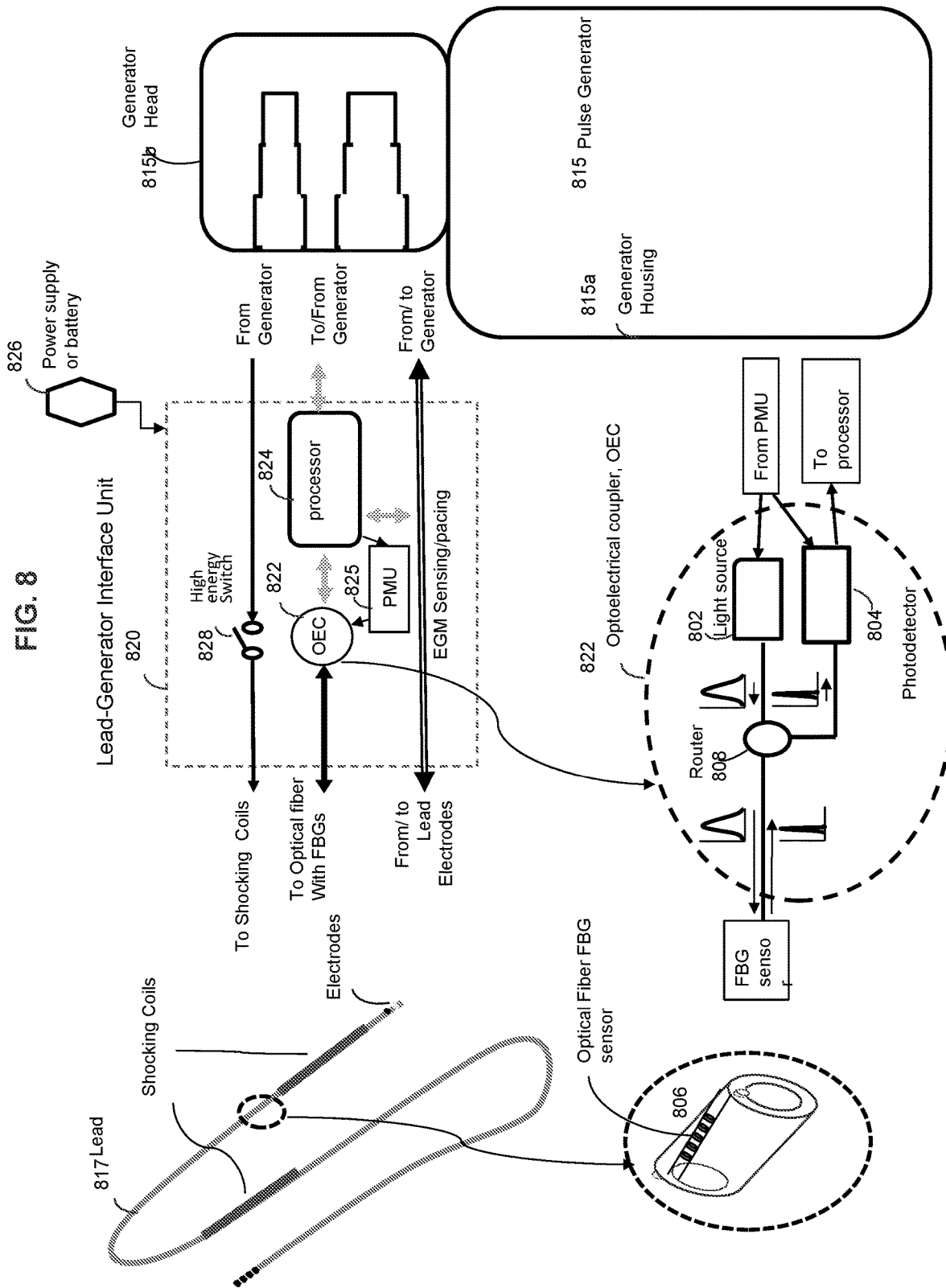
FIG. 8 illustrates an exemplary integration of the miniaturized FBG interrogation system into an implantable medical device.

FIG. 8 illustrates an integration of the miniaturized FBG interrogation system (e.g., structurally and/or functionally similar to FBG interrogation system 100 in FIG. 1) into an implantable medical device. The implantable medical device may include, as nonlimiting example, a pulse generator 815 and one or more leads 817. The pulse generator 815 may include a housing portion 815*a* and a header portion 815*b*. The housing portion 815*a* of the pulse generator 815 may include integrated circuits (ICs) (e.g., one or more processors, memory, analog circuits, digital circuits, hybrid circuits, etc.), a battery, and, if the implantable device is designed to discharge high energy electrical shocks (e.g., an ICD), a capacitive element (e.g., a capacitor) for storing electrical charge prior to the delivery of a shock, and/or other hardware components (e.g., signal processing components) for detecting arrhythmia and delivering electrical shocks or pacing stimulation. The pulse generator 815 may be implanted in any suitable area within a subject. For instance, the generator 815 may be implanted subcutaneously in either the left or the right pectoral area. In some variations, the pulse generator 815 may be substantially similar to the generator described in US Publication No. US20200037895 (referred to as '895), published on Feb. 6, 2020, and entitled "Non-barometric Determination of Hemodynamic Effects of Cardiac Arrhythmias Using Signals Sensed by an Implantable Device." It should be readily understood that the term generator and pulse generator may be used interchangeably herein throughout.

The one or more leads 817 may be connected to the pulse generator 815 at the header portion 815*b*. In some variations, the lead(s) 817 may be directly connected to the header portion 815*b* at a first end. Alternatively, in some variations, the first end of the lead 817 may be connected through the lead-generator interface unit 820 and then coupled with the pulse generator 815. The second end opposite the first end of the lead 817 may be inserted into the one of the heart chambers, the coronary sinus, and/or pericardial space around the heart. The lead 817 may include one or more electrodes to deliver electric current for example, either to deliver low energy electrical stimulation to excite the tissue (e.g., the heart muscle similar to a pacemaker) or one or more shocking coils to terminate or reset an arrhythmia with high electrical energy (i.e., cardioversion and defibrillation or ICD shocks). At least some of the electrodes on the lead(s) 817, may be used to sense the electrical activities (e.g., electrocardiogram) of the heart. In some variations, the electrodes configured to sense the electrical activities may be the same electrodes/shocking coil(s) that may be used to deliver low/high electric current/energy for pacing or for cardioversion/defibrillation. In other variations, the electrodes configured to sense the electrical activities may be different from the electrodes/shocking coil(s) configured to deliver low/high electric current/energy for pacing or for cardioversion/defibrillation.

In some variations, the implantable medical device may detect cardiac arrhythmias from abnormal electrical activities sensed from one or more of these electrodes based on existing techniques (e.g., electrocardiogram-based technology). In some variations, the leads 817 may be substantially similar to the leads described in the '895 publication incorporated herein by reference in its entirety. In some variations, the lead 817 may be any suitable lead (e.g., existing lead) used for an implantable medical device. Additionally, the implantable medical device may include any suitable number of leads 817. For example, a single chamber ICD may include one lead in the right ventricle. A dual chamber ICD may include two leads, one in the right atrium and the other in the right ventricle. A biventricular ICD may include three leads, one in the right atrium, one in the right ventricle, and one in the coronary sinus.

A FBG sensor 806 (e.g., structurally and/or functionally similar to FBG sensor 106 in FIG. 1) may be embedded into one or more leads 817 of the implantable medical device. For example, the leads 817 may include an optical fiber on which the FBG sensor 806 may be formed. That is, the optical fiber may be a part of the lead 817. Additionally or alternatively, the leads 817 may be attached to, integrated with, and/or coupled to the optical fiber on which the FBG sensor may be formed. The FBG sensor 806 may be embedded into any existing suitable lead 817 that may be used in implantable medical devices. For instance, in the single chamber ICD and the dual chamber ICD, the FBG sensor 806 may be embedded in the lead(s) that may be positioned in the right ventricle and/or both right atrium and right ventricle. Similarly, in the biventricular ICD, the FBG sensor 806 may be embedded in the lead(s) positioned in the coronary sinus, the right atrium and/or the right ventricle. In some variations, the lead 817 (e.g., lead 817 with FBG sensor 806 embedded into the lead 817) may include high energy shocking coils. Alternatively, the lead 817 (e.g., lead 817 with FBG sensor 806 embedded into the lead 817) may not include shocking coils. For example, a lead in the coronary sinus, the pulmonary arterial system, the right atrium or the pericardial space may include the FBG sensor 806 but may not include shocking coils. In some variations, there may be one or more FBG sensors 806 embedded in one lead 817. Additionally, there may be one or more FBG sensors 806 embedded in more than one leads 817. In some variations, there may be one or more optical fibers, each with one or more FBG sensors, embedded in each of the one or more leads 817.

The lead 817 embedded with the FBG sensor 806 may be coupled to the generator 815 through a lead-generator interface unit 820. The lead-generator interface unit may include an optoelectrical coupler 822, a power management unit 826 (e.g., structurally and/or functionally similar to power management unit 109 in FIG. 1), and a processor 824 (e.g., structurally and/or functionally similar to processor 112 in FIG. 1). The optoelectrical coupler (OEC) 822 may comprise a light source 802 (e.g., structurally and/or functionally similar to light source 102 in FIG. 1), a photodetector 804 (e.g., structurally and/or functionally similar to photodetector 104 in FIG. 1), and an optical router 808 (e.g., structurally and/or functionally similar to optical router 108 in FIG. 1). The lead-generator interface unit 820 may include a power management unit 825 (further detailed in FIG. 12) that may be electrically coupled to the optoelectrical coupler 822 and optionally the power components. The lead-generator interface unit may also include a processor 824 (e.g., structurally and/or functionally similar to processor 112 in FIG. 1) communicatively coupled to the optoelectrical coupler 822 and to the power management unit 825. The lead-generator interface unit may also include a power source 826 communicatively coupled to the processor and/or electrically coupled to the light source 802. In some variations, the lead-generator interface unit may instead draw power supply from the pulse generator 815. In other variations, the lead-generator interface unit has its own dedicated power supply or battery 826. Additionally or alternatively, the lead-generator interface unit may include integrated circuits such as memory, analog circuits, digital circuits, hybrid circuits, analog-to-digital converter, digital-to-analog converter.

The optical signal from the light source 802 may be transmitted to an FBG sensor 806 embedded in lead 817 through an optical router 808. The photodetector 804 may transform the reflected optical signal from the FBG sensor 806, through the optical router 808, into an electrical signal. The processor 824 (e.g., structurally and/or functionally similar to processor 112 in FIG. 1) may receive the electrical signal from the photodetector 804 and analyze the electrical signal. Based on this analysis, the processor 824 may control the function of the implantable medical device. The power supply or battery 826 may power the light source 802 via the power management unit (PMU) 825 so that the light source 802 may transmit optical signals to the FBG sensor 806. The power supply or battery 826 may also power the powered components associated with the photodetector 804, via PMU 825, such as a preamplification component associated with the photodetector(s) 104, an amplification component associated with the photodetector(s) 104, an analog-to-digital conversion component associated with the photodetector(s) 104, filtering circuitries associated with the photodetector(s) 104, etc. It should be readily understood that the power supply or battery 826 may also power the powered components in the optoelectrical coupler 822 not associated with the photodetector 804, via PMU 825. In some variations, the power supply or battery 826 may be disposed inside the lead-generator interface unit 820.

The individual components of the Lead-Generator Interface Unit or LGIU 820 (e.g., optoelectrical coupler 822, light source 802, photodetector 804, optical router 808, processor 824, high energy switch 828 and PMU 825) may be disposed at any suitable position in the implantable medical device. For instance, in some variations, the individual components of LGIU 820 may be disposed on, attached to, integrated with, or otherwise coupled to the lead 817. In some variations, individual components of LGIU 820 may be disposed on, attached to, integrated with, or otherwise coupled to the header portion 815b of the generator 815. In some variations, the individual components of the LGIU 820 may be disposed on, attached to, integrated with, enclosed within, or otherwise coupled to the housing 815a of the pulse generator 815. In some variations, some component, or some element(s) of the component thereof, of the LGIU 820 may be positioned in a first position within the implantable medical device while the rest of the components, or the element(s) thereof, may be positioned in a second, a third or a fourth position etc. It should be readily understood that LGIU 820 may refer to the individual components of the LGIU 820 (e.g., optoelectrical coupler, the light source, the optical router or the photodetector or the PMU) or the individual elements that the components of the LGIU 820 may be composed of. For example, the light source 804 may be disposed on, attached to, integrated with, or otherwise coupled to the lead 817 while the photodetector may be disposed on, attached to, integrated with, or otherwise coupled to the header portion 815b of the pulse generator 815.

In some variations, the power management unit 825 of the lead-generator interface unit 820 may be disposed on, attached to, integrated with, or otherwise coupled to the lead 817. In some variations, the power management unit 825 may be disposed on, attached to, integrated with, or otherwise coupled to the header portion 815b of the generator 815. In some variations, the power management unit 825 may be disposed on, attached to, integrated with, enclosed within, or otherwise coupled to the housing 815a of the generator 815. In some variations, some portion of the power management unit 825 may be positioned in a first position within the implantable medical device with the rest of the portion of the power management unit 825 positioned in a second position within the implantable medical device. For example, the light source 802 may be coupled to, attached to and/or otherwise integrated with one or more switch(es) and/or power regulation circuits (e.g., switch(es) and/or power regulation circuits of a power management unit). The light source 802 along with the coupled switch(es) and/or power regulation circuits may be positioned within the header portion 815b or the housing portion 815a of the generator 815 of the implantable medical device. In a similar manner, the powered components of the photodetector 804 may be coupled to, attached to and/or otherwise integrated with one or more switch(es) and/or power regulation circuits (e.g., switch(es) and/or power regulation circuits of the power management unit). The photodetector 804 along with the coupled switch(es) and/or power regulation circuit(s) may be positioned within the header portion 815b or the housing portion 815a of the generator of the implantable medical device.

In some variations, the processor 824 of the lead-generator interface unit 820 may be disposed on, attached to, integrated with, or otherwise coupled to the lead 817. In some variations, the processor may be disposed on, attached to, integrated with, or otherwise coupled to the header portion 815b of the generator 815. In some variations, the processor may be disposed on, attached to, integrated with, enclosed within, or otherwise coupled to the housing 815a of the generator 815. In some variations, the power supply to the lead-generator interface unit may be provided from a battery or a set of batteries disposed inside the generator 815 (e.g., inside the housing 815a or the header 815b). Additionally or alternatively, the lead-generator interface may be powered by a battery or a set of batteries disposed outside the generator 815.

In some variations, the processor 824 of the lead-generator interface unit 820 may be configured to assess the hemodynamic status of a subject. For example, the processor may assess the hemodynamic status of the subject based on analysis of a signal or signals received from the optoelectrical coupler that may be indicative of a change in the physical signal(s). In response to determining that the hemodynamic status of the subject is stable, the processor may be configured to block the discharge of electrical energy from the capacitor included in the pulse generator 815 during non-fatal cardiac tachyarrhythmias such as sinus tachycardia or atrial fibrillation or during normal cardiac rhythm with electrical or electromagnetic noises or device oversensing. For example, this blocking may prevent erroneous delivery of electrical charges from the capacitor to the leads 817 (e.g., by turning off a high energy switch 828). In some variations, the high energy switch 828 may be disposed in the generator housing 815a, generator header 815b or lead 817, either separately or together with the other individual components of the lead-generator interface unit. Additionally or alternatively, in response to determining that the hemodynamic status of the subject is stable, the processor may be configured to prevent charging the capacitor included in the generator 815 during non-fatal cardiac tachyarrhythmias such as sinus tachycardia or atrial fibrillation or during normal cardiac rhythm with electrical or electromagnetic noises or device oversensing. In this manner, the processor prevents the implantable medical device from erroneously delivering shocks.

FIGS. 12A-12E illustrate the elements (FIG. 12A) and the operation of the power management unit 1200 (FIG. 12B-E) (structurally and/or functionally similar to PMU 825 in FIG. 8 and PMU 109 in FIG. 1) to automatically turn on and off the power supply 1270 to the light source and/or the other powered components and to regulate the amount(s) of power transmitted to the light source and/or the powered components in order to achieve accurate and reliable assessment of hemodynamical status at the minimum power consumption, i.e., optimized power consumption. In some variations, the operation of PMU 1200 may be controlled by the processor 1202 (structurally and/or functionally similar to processor 824 in FIG. 8 and processor 112 in FIG. 1) based on preprogrammed algorithm(s) or instruction(s) stored in the processor 1202 and, additionally or alternatively, based on the analyses of physiological signals received from sensors disposed in the subject that may include, but are not limited to, the cardiac electrograms sensed by electrodes disposed on the lead (817 in FIG. 8), transthoracic and/or intrathoracic impedance measurement that may indicate respiration and/or pulmonary water content in the lungs as an index for heart failure, myocardial strain signal (e.g., the output of the optoelectrical coupler 822 in FIG. 8) from the miniaturized FBG interrogation system itself. In some variations, the processor 1202 in FIG. 12A may be configured to turn on switches 1208 to enable the power supply 1270 to the light source and the powered components to assess the hemodynamic status and/or mechanical functions of the heart in the subject in the continuous mode as described herein above. In some variations, interruptions in the power transmitted to the light source and the powered components may occur when the continuous mode is operative simultaneously with the event-gated mode and/or pulsed mode as described herein below.

Figure 12A:
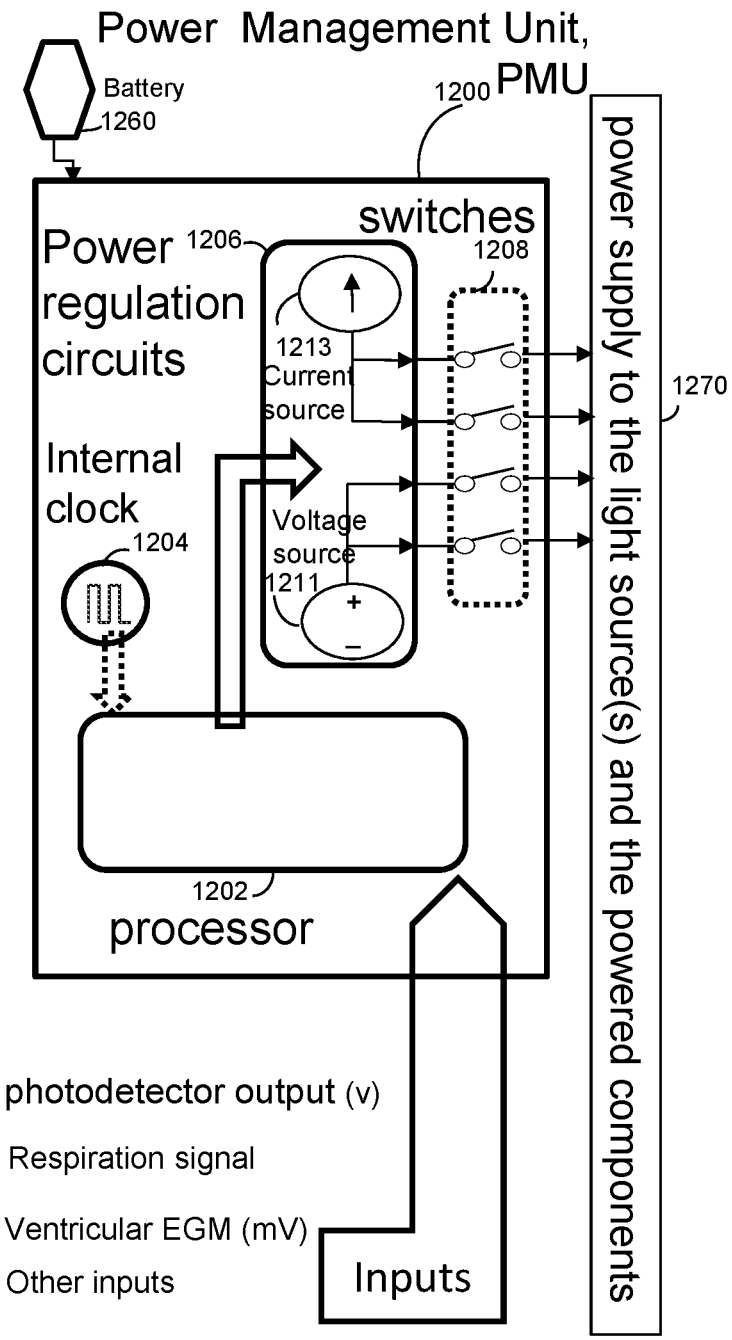
FIGS. 12A-12E illustrate the operation of an exemplary power management unit of the miniaturized FBG interrogation system.
Figure 12B:
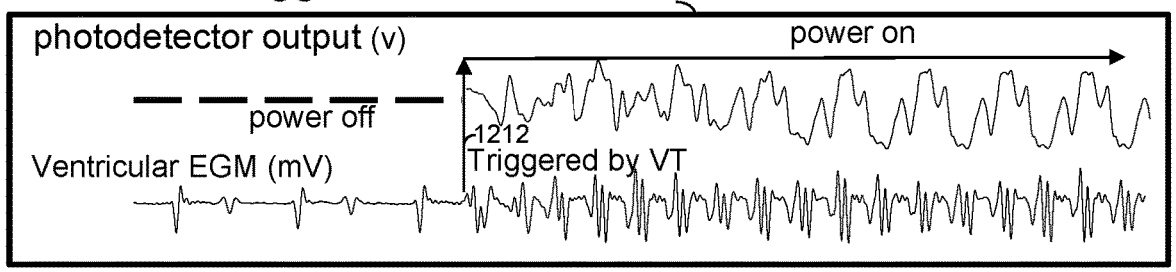
Figure 12C:
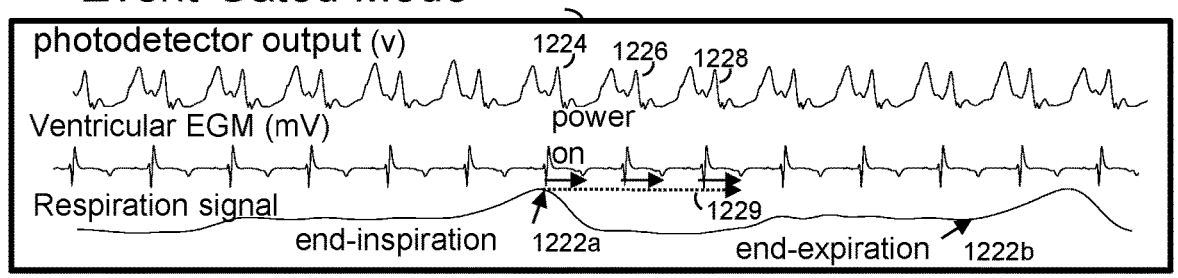
Figure 12D:
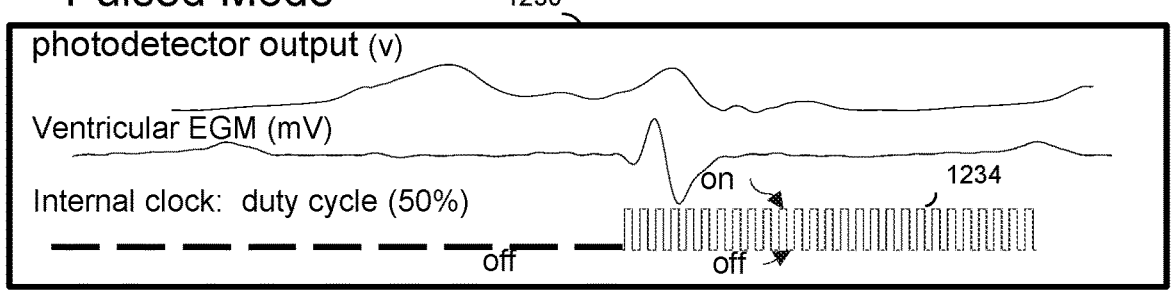
Figure 12E:
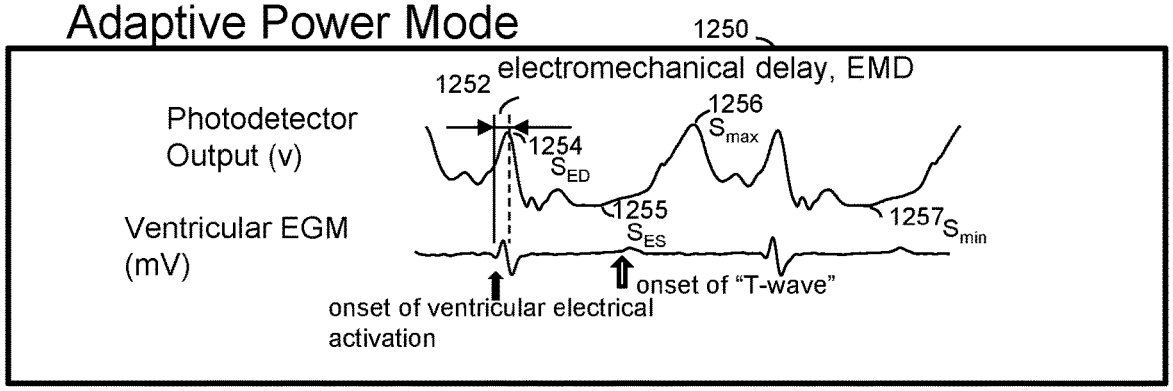

In some variations, the processor 1202 in FIG. 12A may be configured to turn on the switches 1208 to enable the power supply to the light source and the powered components 1270 via PMU 1200 to assess the hemodynamic status and/or mechanical functions of the heart in the subject when the need arises, i.e., the PMU 1200 may operate in the event-triggered mode (1210 in FIG. 12B) to reduce the power consumption based on communications and/or instructions from a processor (e.g., processor 1202 in FIG. 12A, processor 824 in FIG. 8, or processor 112 in FIG. 1). For instance, the processor 1202 may analyze an electrogram(s) from one or more electrodes (e.g., those in the lead 817 in FIG. 8), that are disposed in either the ventricle(s), epicardial space or coronary sinus, and sense ventricular electrograms (ventricular EGM) and, optionally, from the electrodes disposed in the atria (atrial EGM). If the processor 1202 detects possible tachycardia or tachyarrhythmia based on this analysis that may indicate the heart rate or ventricular rate has reached a certain rate threshold, the processor may automatically enable the power supply 1270 to the light source and the powered components 1270 via PMU 1200 so as to assess the hemodynamic status and/or mechanical functions of the heart in the subject (FIG. 12B). For example, the switches 1208 are turned off until a ventricular tachyarrhythmia (VT) 1212 is detected by such analysis, triggering the processor 1202 to turn on the switches 1208 via the PMU 1200 to enable the power supply 1270 to the light source and the powered components 1270 so as to assess the hemodynamic status and/or mechanical functions of the heart in the subject during VT, as marked by the solid horizontal arrow in FIG. 12B starting at 1212. In some variations, this rate threshold may be preset by a user or, additionally or alternatively, be determined based on the stored data on the output signal of the optoelectrical coupler collected during previous episode(s) of normal sinus rhythm, sinus tachycardia (e.g., during exercise) and/or previous episode(s) of non-fatal tachyarrhythmias, optionally in conjunction with further analysis of the ventricular EGMs during the current tachycardia episode, with or without analysis of concurrent atrial EMGs. In some variations, analysis of EGM may include, but is not limited to, the analyses of ventricular EGM morphology, sudden or gradual onset of tachycardia, and association or dissociation between the atrial and ventricular EGMs and may affect determination of the aforementioned rate threshold and aid in the differential diagnosis of VT. Such VT may include monomorphic or polymorphic ventricular tachycardia and ventricular fibrillation. In some variations, the stored data on the output of the optoelectrical coupler may be collected during previous episode(s) of normal rhythm, sinus tachycardia (e.g., during exercise) and/or previous episode(s) of non-fatal tachyarrhythmias may include the certain features (e.g., electromechanical delay 1252 in FIG. 12E) or the output amplitudes of the optoelectrical coupler at certain time events (e.g., end diastole and end-systole) as described herein below and their timing or phase thereof (1250 in FIG. 12E). Once the switches 1208 are turned on, the miniaturized FBG interrogation system integrated in the implantable medical device (e.g., an ICD) may enter into an operating period to acquire or measure ventricular myocardial strain through the FBG sensor (106 in FIGS. 1 and 806 in FIG. 8) as to assess the hemodynamic status and/or mechanical functions of the heart in the subject. As discussed above, the operating period may refer to a time period during which the power supply to the light source and/or the powered components may be enabled. At the end of the operating period, the switches may be automatically turned off and the miniaturized FBG interrogation system integrated in the implantable medical device such as an ICD may no longer acquire or measure output of the optoelectrical coupler (822 in FIG. 8) or photodetector (108 in FIGS. 1 and 804 in FIG. 8) that represents changes in ventricular myocardial strain. The duration of the operating period may be preprogrammed (e.g., seconds, minutes or hours) or dynamically determined by the processor 1202 based on real-time analyses of ventricular EMGs, with or without additional atrial EGMs and of the output of the optoelectrical coupler (822 in FIG. 8) or the photodetector (108 in FIGS. 1 and 804 in FIG. 8). In some variations, such analyses may also include analysis on other input(s) to the PMU 1200 such as transthoracic and/or intrathoracic impedance measurement(s). The operating period may end when the processor determines the VT is terminated based on the analysis of ventricular EGM and, optionally, additional atrial EGM. Additionally or alternatively, the operating period may end prior to the termination of the detected possible VT if the analysis of the output of the photodetector by the processor, optionally combined with further EMG analysis, indicates normal or stable hemodynamic status consistent with a normal or an abnormal but non-fatal cardiac rhythm that may have been misdiagnosed as potentially fatal VT. In some variations, such misdiagnosis may occur due to electrical noises or EGM oversensing. In some variations, such electrical noises may include, but are not limited to, electrical noise resulting from lead fracture or electromagnetic interference. In some variations, such EGM oversensing may include T-wave oversensing. In some variations, such abnormal non-fatal cardiac rhythm may include, but are not limited to, sinus tachycardia, supraventricular tachycardia and atrial fibrillation with rapid ventricular response. In some variations, such abnormal non-fatal cardiac rhythm may have a ventricular rate equal to or greater than 110, 120, 150, 180, 200, 220 or 250 beats per minute. Additionally and alternatively, the operating period may be extended beyond the termination of the detected VT if the analysis of the output of optoelectrical coupler or the photodetector by the processor indicates significantly compromised hemodynamic status such as acute new-onset or acute exacerbation of heart failure to provide continued hemodynamic monitoring of the subject after the VT is terminated, either spontaneously or successfully by tachycardia therapy that may include anti-tachycardia pacing, synchronized cardioversion and/or defibrillation. The duration of this extended operating period may be preprogrammed (e.g., seconds, minutes or hours) or dynamically determined based on the analysis of the inputs to the PMU 1200 by the processor 1202. In some variations, such anti-tachycardia therapy may be delivered through ICD or by external device such as an external defibrillator.

In some variations, the processor (1202 in FIG. 12A, 824 in FIGS. 8 and/or 112 in FIG. 1) may control the function of the implantable medical device (e.g., ICD) based on the analysis of the output of the optoelectrical coupler measured or acquired during the operating period that is triggered by detected possible tachycardia as described herein above. For example, the processor may communicate or instruct the ICD to prevent or to abort the anti-tachycardia therapy if the analysis of the output of the optoelectrical coupler measured or acquired during the operating period indicates that a stable hemodynamic status is present and, optionally in combination of analysis of ventricular EGMs, that the detected arrhythmia by EGM analysis represents a misdiagnosis caused by electrical noises or EGM oversensing. In some variations, prevention of the anti-tachycardia therapy may include prevention of anti-tachycardia pacing (ATP) and/or charging the capacitor(s) in the ICD in anticipation of high energy shock(s). In some variations, abortion of the anti-tachycardia therapy may blockage of the already charged capacitor(s) from discharging the high energy to the subject (i.e., aborted ICD discharge) by switching off the high energy switch (828 in FIG. 8). As yet another example, the processor may communicate or instruct the ICD to perform ATP but avoid high energy ICD shocks if the analysis of the output of the optoelectrical coupler measured or acquired during the operating period indicates that a stable hemodynamic status is present and, optionally in combination of analysis of ventricular EGMs, that the detected arrhythmia by EGM analysis represents a true ventricular tachycardia (VT). In some variations, the processor may communicate or instruct the ICD to continue the ATP without high energy ICD shock(s) as long as hemodynamic status remains stable based on the analysis of the output of the optoelectrical coupler during the detected VT. It should be readily understood that the output of the photodetector and the output of the optoelectrical coupler are the two terms which may be used interchangeably herein throughout.

In a similar manner, the processor 1202 may analyze water content or impedance across the lungs/thorax or left atrial pressure of a subject. If based on this analysis, the processor detects possible worsening heart failure, the processor 1202 may automatically turn on the switches 1208 of the PMU 1200 to enable the power supply to the light source and/or the powered components 1270 so as to assess the hemodynamic status and/or mechanical functions of the heart in the subject. In a similar manner, the processor may detect an evidence for ischemia in response to being notified of an episode of chest pain by the subject. The processor 1202 may automatically turn on the switches 1208 of the PMU 1200 to enable the power supply to the light source and/or the powered components 1270 so as to assess the hemodynamic status and/or mechanical functions of the heart in the subject. Additionally, the processor 1202 may automatically turn on the switches 1208 of the PMU 1200 to enable the power supply to the light source and/or other powered components 1270 at regularly scheduled intervals so as to monitor the hemodynamic status and/or mechanical functions of the heart in the subject. Additionally, the processor 1202 may automatically turn on the switches 1208 of the PMU 1200 to enable the power supply to the light source and/or the other powered components 1270 upon commend or request by a user through a wireless user interface (e.g., Bluetooth or telemetry as nonlimiting examples) so as to assess the hemodynamic status and/or mechanical functions of the heart in the subject. It should be readily understood that the mechanical functions of the heart include both systolic and diastolic functions of the heart. In some variations, the processor may communicate with or instruct the implantable medical device to alert the subject by audible warning and/or vibration and/or by telemetry to summon professional help including that of emergency medical services, according to the assessment of hemodynamic status and/or mechanical function of the heart in the subject based on the analysis of the output of the optoelectrical coupler.

In some variations, the processor 1202 may be configured to turn on the switches 1208 in FIG. 12A of the PMU 1200 to enable the power supply to the light source and/or the powered components 1270 to assess the hemodynamic status and/or mechanical functions of the heart in the subject during certain portion of a recurrent event or events, i.e., the PMU 1200 may operate in the event-gated mode (1220 in FIG. 12C) to reduce the power consumption. Therefore, the individual operating period may be gated to one or more recurrent event(s). In some variations, such recurrent events may include, but are not limited to, cardiac and respiratory cycles. For instance, the processor 1202 may be configured to turn on the switches 1208 of the PMU 1200 to enable the power supply to the light source and/or the powered components 1270 for a certain operating period, as marked by the horizontal shorter solid arrows, of each of the first three cardiac cycles, 1224, 1226 and 1228 in FIG. 12C, after the end-inspiration 1222a as marked by the horizontal longer dashed arrow 1229. In some variations, the durations of the operating period for each of the first three cardiac cycles may be the same or different. In some variations, such durations of the operating period may be preprogrammed to be about 0 msec, at least 20 msec, at least 50 msec, at least 100 msec, at least 150 msec or at least 200 msec from the onset of the ventricular EGM. Additionally or alternatively, such durations of the operating period may be dynamically determined and gated to a certain time interval during an individual cardiac cycle based on the analysis of the output of the optoelectrical coupler or the photodetector, as described further herein below. In some variations, such a certain time interval may be determined by or as a function of the electromechanical delay (1252 in FIG. 12E). In some variations, such certain time interval may begin a few msec or tens of msec before, at or a few msec or tens of msec after the onset of end-diastole (e.g., $S_{ED}$ 1254 in FIG. 12E). In some variations, such certain time interval may end a few msec or tens of msec before, at or a few msec or tens of msec after the onset of end-systole (e.g., SES 1255 in FIG. 12E). In some variations, such certain time interval may begin a few msec or tens of msec before, at or a few msec or tens of msec after the onset of ventricular EGM end-diastole and end a few msec or tens of msec before, at or a few msec or tens of msec after the onset of T-wave (as marked by vertical upward arrows respectively in FIG. 12E). It should be readily understood that such certain time interval may begin or end based on any combinations of these time makers derived by analysis of the cardiac EGM and/or of the output of the optoelectrical coupler or the photodetector, depending on the specific application.

In some variations, the processor 1202 may be configured to regulate the power to the light source and/or the powered components 1270 via the PMU 1200 in a pulsed manner during the operating period to assess the hemodynamic status and/or mechanical functions of the heart in the subject during certain portion of a recurrent event or events, i.e., the PMU 1200 may operate in the pulsed mode (1230 in FIG. 12D) to reduce the power consumption. The duty cycle of the pulsed power may be 25%, 50% or 75% as nonlimiting examples. The frequency of the pulsed power may be at least a few hundred Hz, at least a few KHz, at least a few hundred KHz, at least few MHz, at least few tens of MHs, at least a few hundreds of MHz at least a few GHz, or a few tens of GHz. The duty cycle and its frequency may be preprogrammed or be adaptively adjusted based on the output of the optoelectical coupler (822 in FIG. 8) as described herein below to further optimize the power consumption (FIG. 12E).

In some variations, the processor 1202 may be configured to adaptively regulate the amount(s) of power transmitted to the light source and/or the powered components 1270 via the PMU 1200 based on the output amplitude of the optoelectrical coupler (822 in FIG. 8) to assess the hemodynamic status and/or mechanical functions of the heart in the subject during certain portion of a recurrent event or events, i.e., the PMU 1200 may operate in the adaptive power mode (1250 in FIG. 12E) to optimize the power consumption. In some variations, the output amplitude of optoelectrical coupler may be defined by the difference between the maximal and minimal value ($S_{max}$ 1256 and $S_{min}$ 1257 in FIG. 12E, respectively) of the optoelectrical coupler or the difference between the end-diastolic and end-systolic values ($S_{ED}$ 1254 and SES 1255 in FIG. 12E, respectively) or the difference between the end-diastolic and minimal values ($S_{ED}$ 1254 and $S_{min}$ 1257 in FIG. 12E, respectively) during a given cardiac cycle. In some variations, SES 1255 and $S_{min}$ 1257 may be the same in timing and in value. In some variations, $S_{ED}$ 1254 and $S_{max}$ 1256 may typically be different in timing and in value. In some variations, $S_{ED}$ 1254 may occur after a certain delay (electromechanical delay or EMD 1252 in FIG. 12E) which may be about 10, 20, 50, 100 or 120 msec after the onset of the ventricular electrical activation (marked by the up-pointing solid arrow). In some variations, EMD 1252 may be determined based on the analysis of the ventricular myocardial strain data extracted from the output of the optoelectrical coupler during normal heart rhythm and/or during previous episodes of cardiac arrhythmias. In some variations, SES 1255 may occur at the onset of the T-wave (as marked by the up-pointing hollow arrow). In some variations, the processor 1202 may be configured to decrease the amount(s) of power transmitted to the light source and/or the powered component 1270 via the PMU

1200 if the output amplitude of the optoelectrical coupler exceeds a certain detection threshold in the form of decreased voltage through the voltage source 1211 in FIG. 12A or in the form of decreased current through the current source 1213 in FIG. 12A or in the form of decreased duty cycle or in any combination(s) thereof as described herein above. In some variations, the detection threshold may be defined as an output amplitude above which adequate hemodynamic status (e.g., adequate stroke volume) can be assessed accurately and reliably. In some variations, the processor 1202 may be configured to increase the amount(s) of power transmitted to the light source and/or the powered component 1270 via the PMU 1200 if the output amplitude of the optoelectrical coupler approaches or falls below a certain sensitivity threshold in the form of increased voltage through the voltage source 1211 or in the form of increased current through the current source 1213 or in the form of increased duty cycle or in any combination(s) thereof as described herein above. The sensitivity threshold may be defined as an output amplitude of the optoelectrical coupler below which adequate hemodynamic status (e.g., adequate stroke volume) may not be assessed accurately and reliably. In some variations, the detection threshold may be greater than or equal to the sensitivity threshold. In some variations, the detection threshold and the sensitivity threshold may be preprogrammed or be dynamically determined based on the analysis of the data on the output amplitude of the optoelectrical coupler during normal heart rhythm and/or during previous recorded episode(s) of abnormal rhythm. In some variations, such analysis may be performed with preprogrammed algorithm(s) and/or machine learning based on data from the same subject or from a population of similar subjects with implantable medical devices such as an ICD. It should be understood that the light source described herein may include at least one light source or a plurality of light sources.

As discussed above, the lead-generator interface unit 820 may include a power management unit (e.g., structurally and/or functionally similar to power management unit (PMU) 109 in FIG. 1) to reduce and/or minimize power consumption and heat generation. In some variations, the PMU may include a processor 1202 in FIG. 12A to actuate one or more switches and/or one or more power regulation circuits included in the PMU. Alternatively or additionally, the PMU may be coupled with processor 824 in FIG. 8 or processor 102 in FIG. 1 to actuate the one or more switches and/or the one or more power regulation circuits in the PMU. In some variations, the processor may be configured, via the PMU, to switch on the light source and/or powered components in response to or triggered by a physical condition (e.g., tachycardia, heart failure, ischemia) meeting a threshold criterion. In some variations, the processor may be configured, via the PMU, to automatically switch on the light source and/or powered components at predetermined time intervals. In some variations, a user may interact with the processor via a suitable wireless user interface device (e.g., telemetry or Bluetooth device as nonlimiting examples). The processor may be configured, via the PMU, to automatically enable the power supply to the light source and/or powered components in response to a request from a user. In some variations, the light source and/or the powered components may be gated to a recurring physical event (e.g., cardiac cycle). Additionally or alternatively, the processor may be configured, via the PMU, to rapidly enable and disable the power supply to the light source and the powered component(s) based on certain duty cycle. Additionally or alternatively, the processor may be configured, via the PMU, to adaptively regulate the amount(s) of power transmitted to the light source(s) and the powered components to minimize and/or optimize power consumption while ensuring sensitivity and accuracy of the miniaturized FBG interrogation system incorporated into the implantable medical device.

Figure 11A:
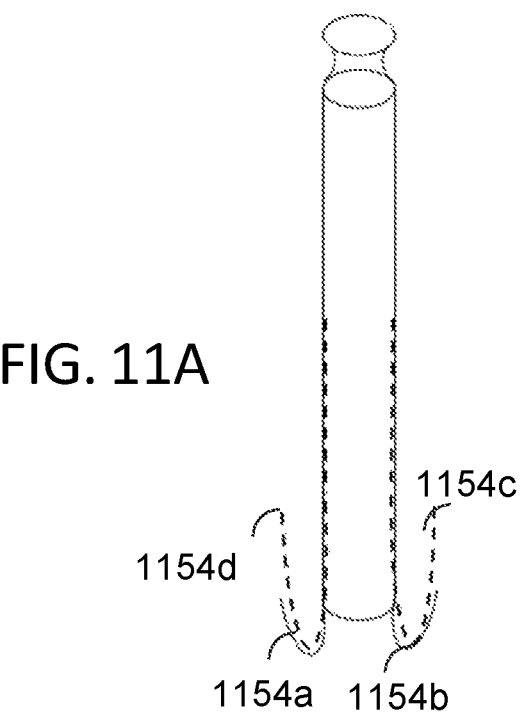
FIGS. 11A-11C illustrate an exemplary integration of the miniaturized FBG interrogation system into an implantable medical device without lead(s).

Although FIG. 8 describes the implantable medical device as including leads 817, it should be readily understood that the miniaturized FBG interrogation system described herein may be integrated into a leadless implantable medical device. FIG. 11A illustrates a leadless implantable medical device with splines such as, for example, 1154a, 1154b, 1154c, 1154d, collectively referred to as splines 1154. The splines 1154 may be configured to hold the implantable medical device in place (i.e., passive fixation device) in the subject (e.g., in the right ventricle as a nonlimiting example). In some variations, one or more splines 1154 of the implantable medical device that are configured to hold the device in place may be embedded with one or more FBG sensors (e.g., structurally and functionally similar to FBG sensor(s) 106 in FIG. 1). In some variations, one or more separate releasable splines 1154 may be attached to, coupled with, and/or accommodated into one or more grooves or indents on the body of the leadless implantable medical device and only be released to be in close contact with surrounding tissues after implantation in the subject as described further herein below. Such separate splines may be embedded with one or more optical fibers, each with one or more FBG sensors. Accordingly, some or all splines of the implantable medical device may be embedded with FBG sensor(s) and may hold the device in place, or sense the physical signals, or perform both functions.

Figure 11B:
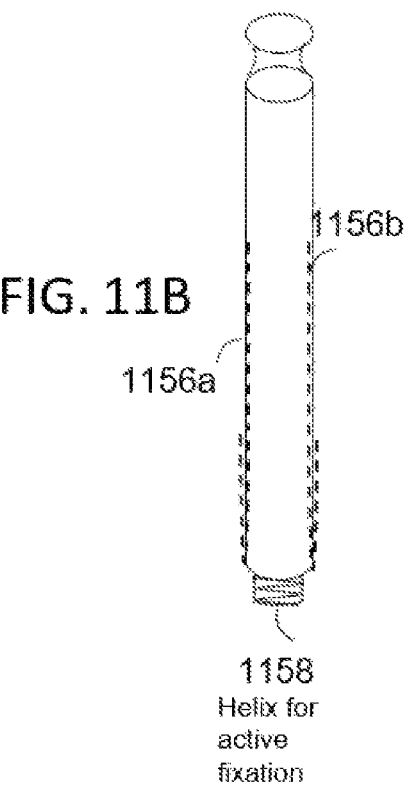
Figure 11C:
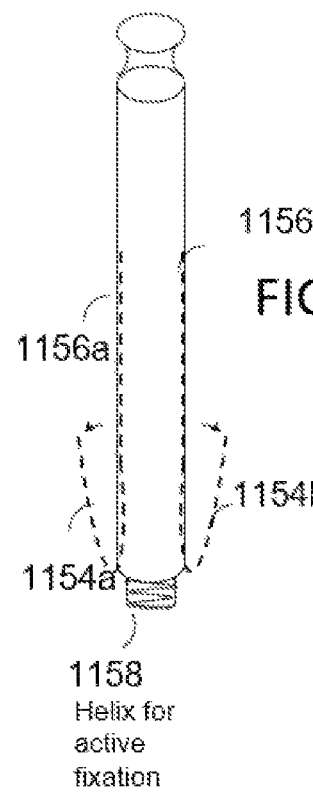

Additionally or alternatively, some leadless implantable medical device may include one or more grooves and/or indents on the body of the implantable medical device to accommodate releasable spline(s) coupled to the device. For example, in FIGS. 11B and 11C, the leadless implantable medical device may include grooves and/or indents such as, for example, 1156a and 1156b along the length, or portion of the length, of the body of the implantable medical device. This variation is particularly suited for leadless implantable medical devices with active fixation, typically with a helix 1158 to hold the leadless device in place (i.e., active fixation device) in the subject (e.g., in the right ventricle as a nonlimiting example). The grooves may include a releasable mechanism (e.g., spring, etc.) for the coupled spline(s) such as 1154a and 1154b in FIG. 11C to the groove 1156a and 1156b respectively. During implantation of the leadless implantable medical device into a subject and/or shortly thereafter (e.g., minutes, hours or days thereafter), the releasable mechanism within the groove may release the splines such that the splines 1154a and 1154b are released to engage the surrounding tissue such as the endomyocardial tissue of the right ventricle, as a nonlimiting example, as shown in FIG. 11C. These splines may be embedded with the FBG sensor to sense the physical signal. Additionally or alternatively, splines may be releasably held in the grooves on the body of the leadless implantable device via biodegradable material so that the splines are embedded entirely in the body of the leadless implantable medical device before the implantation and released only after a desirable exposure or contact time to the body fluid such as blood during and/or after implantation. In some variations, the remaining components (e.g., the light source, the photodetector, the powered components, the PMU, etc.) of the miniaturized FBG interrogation system may be disposed in the body of the leadless implantable system. In some variations, the miniaturized FBG interrogation system may communicate wirelessly or through telemetry with another implantable medical device in the subject and/or a medical device external to the subject.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

The invention claimed is:

1. A power management unit for an implantable medical device comprising an optical sensor system that is configured to measure one or more physical signals, the power management unit comprising:
    at least one of a switch or a power regulation circuit to:
        transition the optical sensor system from an operational state to a dormant state, or
        transition the optical sensor system from the dormant state to the operational state; and
    a processor coupled to the at least one of the switch or the power regulation circuit, the processor configured to operate the optical sensor system in at least one of:
    a continuous mode,
    an event-triggered mode,
    an event-gated mode,
    a pulse width modulation mode, or
    an adaptive power mode.

2. The power management unit of claim 1, wherein in the event-triggered mode, the processor is configured to automatically transition the optical sensor system from the dormant state to the operational state in response to a triggering physical event.

3. The power management unit of claim 2, wherein the triggering physical event comprises one or more of arrhythmia, heart failure, or ischemia.

4. The power management unit of claim 1, wherein in the event-triggered mode, the processor is configured to automatically transition the optical sensor system from the dormant state to the operational state at predetermined time intervals.

5. The power management unit of claim 1, wherein in the event-triggered mode, the processor is configured to automatically transition the optical sensor system from the dormant state to the operational state in response to a request from a user.

6. The power management unit of claim 1, wherein in the event-gated mode, the processor is configured to automatically transition the optical sensor system from the dormant state to the operational state and from the operational state to the dormant state based on a recurring physical event.

7. The power management unit of claim 6, wherein the recurring physical event is a respiratory cycle or a cardiac cycle.

8. The power management unit of claim 7, wherein the processor is configured to transition the optical sensor system from the dormant state to the operational state at one or more of:
    an end-systole of a cardiac cycle,
    an end-diastole of a cardiac cycle,
    an end-inspiration of a respiratory cycle, or
    an end-expiration of a respiratory cycle.

9. The power management unit of claim 8, wherein after transitioning the optical sensor system to the operational state, the processor is configured to maintain the optical sensor system in the operational state for a preset amount of time.

10. The power management unit of claim 8, wherein after transitioning the optical sensor system to the operational state, the processor is configured to maintain the optical sensor system in the operational state for a dynamically determined amount of time.

11. The power management unit of claim 1, wherein in the pulse width modulation mode, the processor is configured to automatically transition the optical sensor system from the dormant state to the operational state and from the operational state to the dormant state based on a duty cycle of the power delivered to the optical sensor system.

12. The power management unit of claim 1, wherein in the adaptive power mode, the processor is configured to adaptively increase or decrease a power transmitted to the optical sensor system based on an amplitude of the one or more physical signals measured by the optical sensor system.

13. The power management unit of claim 1, wherein the processor is configured to operate the optical sensor system in at least two of the continuous mode, the event-triggered mode, the event-gated mode, the pulse width modulation mode, or the adaptive power mode simultaneously.

14. The power management unit of claim 1, wherein the processor is configured to operate the optical sensor system in the continuous mode and the event-triggered mode sequentially.

15. The power management unit of claim 1, wherein the optical sensor system includes a Fiber Bragg Gratings sensor.

16. The power management unit of claim 1, wherein the optical sensor system includes a Fiber Bragg Gratings interrogation system.

17. The implantable medical device comprising the power management unit as recited in claim 1.

* * * * *